US012527257B2

(12) United States Patent
Hiraoka et al.

(10) Patent No.: US 12,527,257 B2
(45) Date of Patent: Jan. 20, 2026

(54) AGRICULTURAL ROBOT

(71) Applicant: KUBOTA CORPORATION, Osaka (JP)

(72) Inventors: Minoru Hiraoka, Sakai (JP); Tomoyoshi Sakano, Sakai (JP); Jumpei Miyamoto, Sakai (JP); Junichi Ishikawa, Sakai (JP); Takuya Tamai, Sakai (JP); Shunsuke Edo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 842 days.

(21) Appl. No.: 17/746,115

(22) Filed: May 17, 2022

(65) Prior Publication Data

US 2022/0272900 A1    Sep. 1, 2022

Related U.S. Application Data

(63) Continuation of application No. PCT/JP2020/044634, filed on Dec. 1, 2020.

(30) Foreign Application Priority Data

Dec. 2, 2019 (JP) ................................ 2019-218337

(51) Int. Cl.
  *A01D 46/30* (2006.01)
  *B60G 17/0165* (2006.01)
  (Continued)

(52) U.S. Cl.
  CPC ......... *A01D 46/30* (2013.01); *B60G 17/0165* (2013.01); *G06T 7/70* (2017.01);
  (Continued)

(58) Field of Classification Search
  CPC ................... A01D 46/30; G06T 7/70; G06T 2207/30188; G06T 2207/30252;
  (Continued)

(56) References Cited

U.S. PATENT DOCUMENTS

| 2019/0050948 A1* | 2/2019 | Perry ..................... G06Q 30/02 |
| 2020/0017152 A1 | 1/2020 | Ishikawa et al. |
| 2021/0188378 A1 | 6/2021 | Ishikawa et al. |

FOREIGN PATENT DOCUMENTS

| CA | 3077400 A1 * | 4/2019 | ......... B60G 17/0165 |
| CN | 202895220 U * | 4/2013 | |

(Continued)

OTHER PUBLICATIONS

Max Schwarz, David Droeschel, Marius Beul, and Michael Schreiber, "NimbRo Rescue: Solving Disaster-Response Tasks through Mobile Manipulation Robot Momaro," Mar. 2017, Journal of Field of Robotics, whole document. (Year: 2017).*

(Continued)

*Primary Examiner* — Tiffany P Young
(74) *Attorney, Agent, or Firm* — Keating & Bennett,

(57) ABSTRACT

An agricultural robot includes a machine body, a wheeled traveling device to support the machine body such that the machine body is capable of traveling, the traveling device including at least three wheels, a manipulator including an arm and a robot hand, the arm being attached to the machine body, the robot hand being attached to the arm and capable of holding an object, and a balance controller to control positions of the at least three wheels, respectively, to achieve a balance between the machine body and the manipulator.

10 Claims, 45 Drawing Sheets

(51) Int. Cl.
*G06T 7/70* (2017.01)
*G06V 20/10* (2022.01)
*G06V 20/56* (2022.01)
(52) U.S. Cl.
CPC ............ *G06V 20/188* (2022.01); *G06V 20/56* (2022.01); *B60G 2300/08* (2013.01); *G06T 2207/30188* (2013.01); *G06T 2207/30252* (2013.01)
(58) Field of Classification Search
CPC .. G06V 20/188; G06V 20/56; B60G 17/0165; B60G 2300/08
USPC .......................................................... 701/50
See application file for complete search history.

(56) References Cited

FOREIGN PATENT DOCUMENTS

| | | |
|---|---|---|
| CN | 106142050 A | 11/2016 |
| CN | 107567823 A | 1/2018 |
| CN | 108994847 A | 12/2018 |
| EP | 4 173 464 A1 | 5/2023 |
| JP | 2011-229406 A | 11/2011 |
| JP | 2018-167692 A | 11/2018 |
| KR | 10-2015-0052433 A | 5/2015 |
| WO | 2019/131522 A1 | 7/2019 |

OTHER PUBLICATIONS

Official Communication issued in corresponding European Patent Application No. 20895584.9, mailed on Dec. 4, 2023.
Official Communication issued in International Patent Application No. PCT/JP2020/044634, mailed on Jan. 19, 2021.
Iida et al., "Studies on Aricultural Hydraulic Manipulator (Part 3)—Application for Watermelon Harvesting—" Journal of the Japanese Society of Agricultural Machinery, vol. 58, No. 4, 1996, 11 pages.
Official Communication issued in corresponding European Patent Application No. 20895584.9, mailed on Oct. 16, 2025, 11 pages.

\* cited by examiner

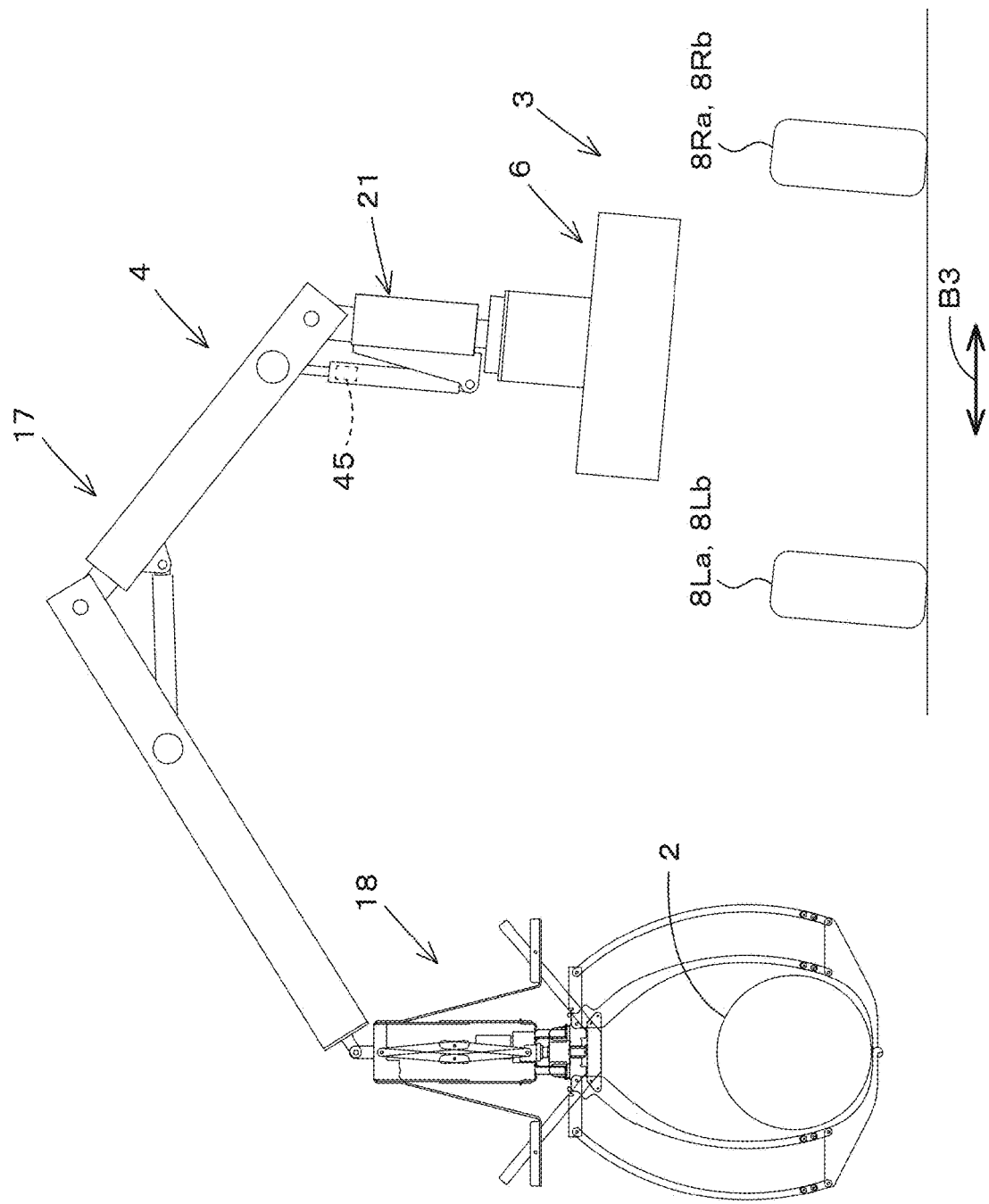

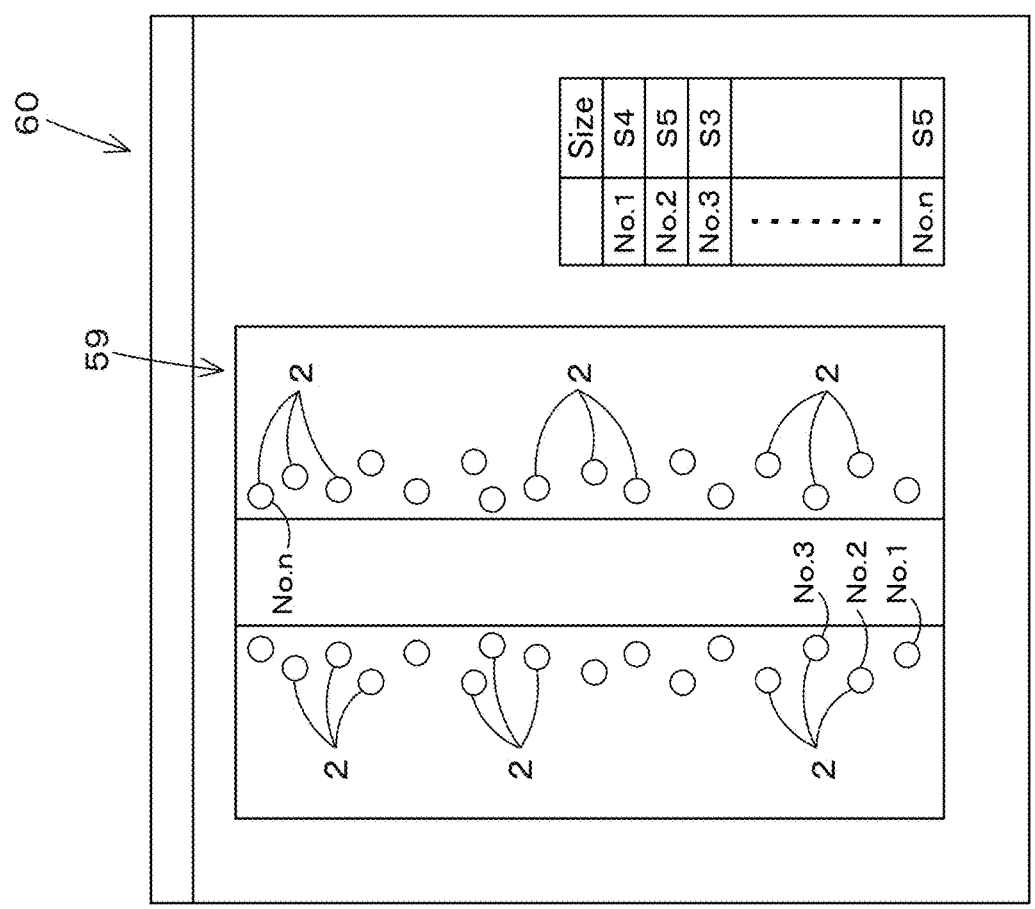

AGRICULTURAL ROBOT

CROSS REFERENCE TO RELATED APPLICATIONS

This application is a continuation application of International Application No. PCT/JP2020/044634, filed on Dec. 1, 2020, which claims the benefit of priority to Japanese Patent Application No. 2019-218337, filed on Dec. 2, 2019. The entire contents of each of these applications are hereby incorporated herein by reference.

BACKGROUND OF THE INVENTION

1. Field of the Invention

The present invention relates to an agricultural robot.

2. Description of the Related Art

An agricultural robot disclosed in Japanese Unexamined Patent Application Publication No. 2011-229406 is known.

The agricultural robot disclosed in Japanese Unexamined Patent Application Publication No. 2011-229406 includes a manipulator which is provided on a machine body of a traveling body and which is capable of harvesting crops.

SUMMARY OF THE INVENTION

It is noted that, in the case of an agricultural robot for harvesting heavy vegetables such as watermelons, melons, and pumpkins as crops, it is necessary to take into consideration the balance between the machine body and the manipulator when harvesting the crops.

Preferred embodiments of the present invention provide agricultural robots in each of which a machine body and a manipulator can be balanced when harvesting crops.

An agricultural robot according to an aspect of a preferred embodiment of the present invention includes a machine body, a wheeled traveling device to support the machine body such that the machine body is capable of traveling, the traveling device including at least three wheels, a manipulator including an arm and a robot hand, the arm being attached to the machine body, the robot hand being attached to the arm and capable of holding an object, and a balance controller to control positions of the at least three wheels, respectively, to achieve a balance between the machine body and the manipulator.

The balance controller is configured or programmed to control the positions of the at least three wheels, respectively, to control a posture of the machine body.

The at least three wheels of the traveling device include a first wheel at a front left of the machine body, a second wheel at a front right of the machine body, a third wheel at a rear left of the machine body, and a fourth wheel at a rear right of the machine body, the first to fourth wheels are supported on the machine body such that each of the first to fourth wheels is independently capable of being raised and lowered, and the balance controller is configured or programmed to control the posture of the machine body by causing one or more of the first to fourth wheels to be raised or lowered.

The manipulator includes a mounting assembly to have the arm attached thereto such that the arm is swingable up and down, and the mounting assembly is detachably attached to the machine body.

The agricultural robot further includes a controller to control the manipulator, wherein the mounting assembly includes a mount detachably attached to the machine body, a rotating shaft supported on the mount such that the rotating shaft is rotatable about a vertical axis, a rotary motor to drive the rotating shaft to rotate, and a rotating frame to rotate together with the rotating shaft, the arm includes a first arm assembly pivoted on the rotating frame such that the first arm assembly is swingable up and down, and a second arm assembly swingably pivoted on the first arm assembly, the arm is capable of being bent by swinging movement of the second arm assembly relative to the first arm assembly, the robot hand is attached to a distal portion of the second arm assembly, and the controller is configured or programmed to control a position of the robot hand by controlling swinging movement of the first arm assembly and the second arm assembly and rotation of the rotating frame.

The agricultural robot further includes an imager to acquire information about a surrounding area of the machine body by capturing an image, and a map generator to automatically generate a map of a position and a growth state of at least one individual crop based on the information acquired by the imager before harvesting.

The agricultural robot further includes a determiner to determine, based on the information acquired by the imaging device, whether the at least one crop is in a proper stage for harvest from a characteristic specific to a type of the at least one crop.

The traveling device includes wheel supports to support the respective wheels, each of the wheel supports includes a main support supported on the machine body, a swing frame supported on the main support such that the swing frame is swingable up and down, a wheel frame which is supported on the swing frame such that the wheel frame is swingable up and down and which supports a corresponding one of the wheels, a first lift cylinder to cause the swing frame to swing up and down, and a second lift cylinder to cause the wheel frame to swing up and down.

A combination of upward or downward swinging movement of the swing frame caused by the first lift cylinder and upward or downward swinging movement of the wheel frame caused by the second lift cylinder allows a corresponding one of the wheels to be raised and lowered independently in a parallel manner.

Each of the wheel supports includes a steering cylinder disposed between the machine body and the main support, the main support is supported on the machine body such that the main support is rotatable about a vertical axis, and rotation of the main support about the vertical axis caused by extension or retraction of the steering cylinder allows orientation of a corresponding one of the wheels to be independently changed.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 14E is a back view showing how the posture of a traveling body is controlled.
FIG. 14F illustrates a map of the positions and growth states of crops.

DETAILED DESCRIPTION OF THE PREFERRED EMBODIMENTS

Figure 1:
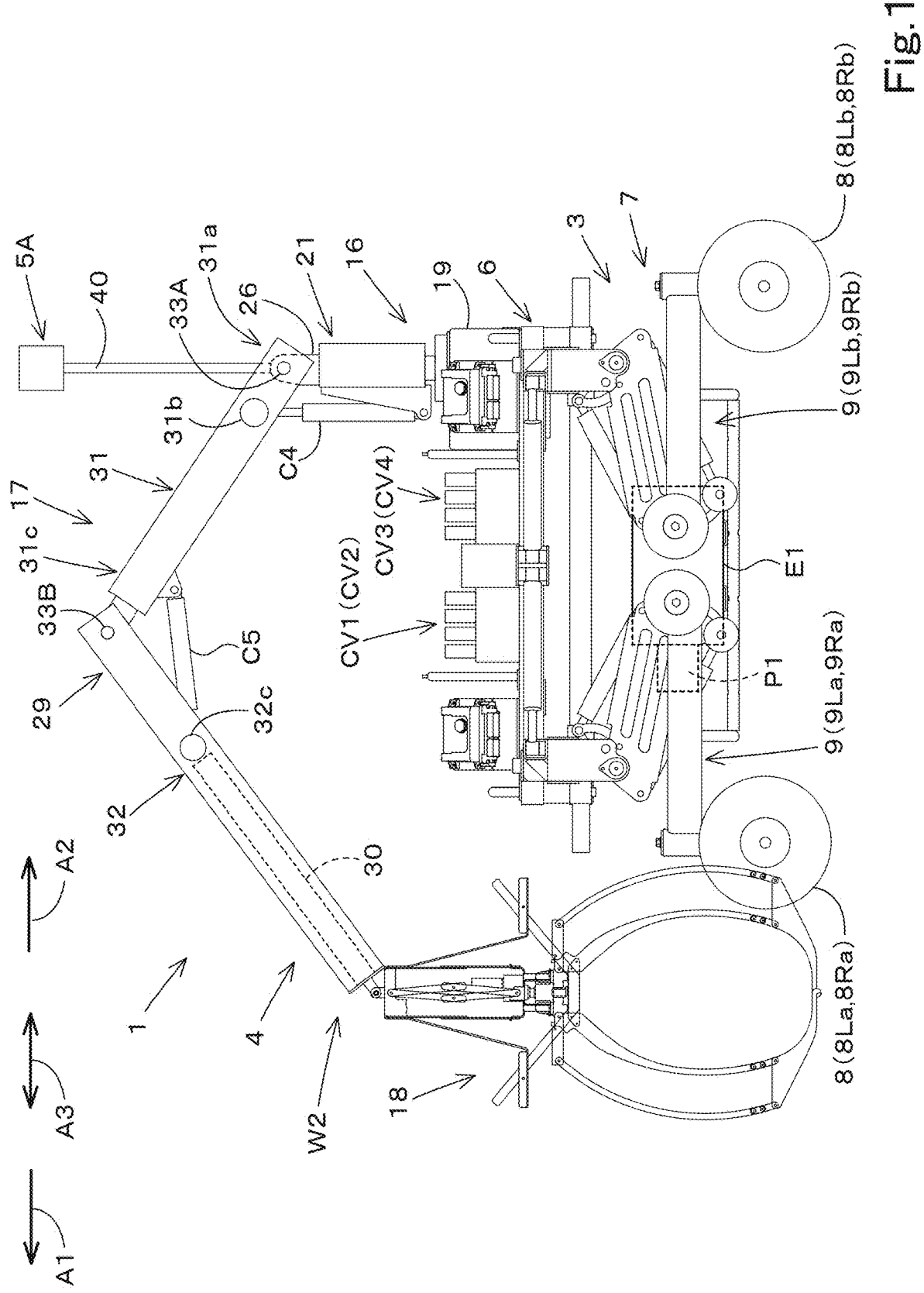
FIG. 1 is a side view of an agricultural robot.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description describes preferred embodiments of the present invention with reference to drawings as necessary.

Figure 2:
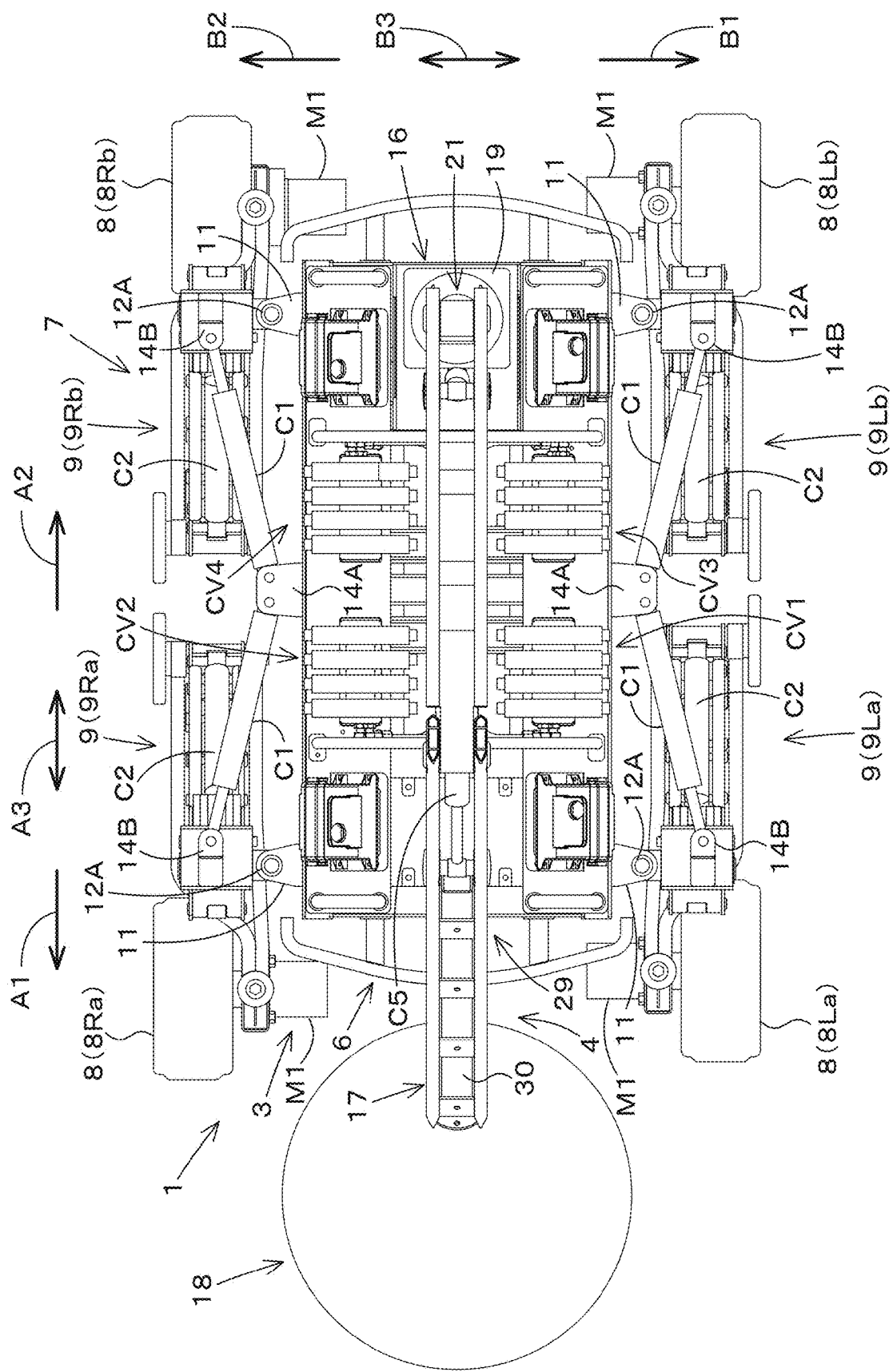
FIG. 2 is a plan view of the agricultural robot.

FIGS. 1 and 2 illustrate an example of an agricultural robot 1 for harvesting crops 2. The agricultural robot 1 is used to harvest, for example, heavy vegetables and/or fruits which are relatively heavy crops 2 such as watermelons, melons, and/or pumpkins. The agricultural robot 1 is an autonomous harvesting robot. That is, the agricultural robot 1 travels in an autonomous manner, autonomously determines which crop 2 should be harvested, and harvests that crop 2.

Note that the crops 2 to be harvested are not limited to the above-listed crops 2. The agricultural robot 1 may be used to do work other than harvesting, such as, for example, spreading an agricultural chemical and/or fertilizer.

In the following description, the direction indicated by arrow A1 in FIGS. 1 and 2 is a forward direction, the direction indicated by arrow A2 in FIGS. 1 and 2 is a rearward direction, and the directions indicated by arrows A3 in FIGS. 1 and 2 are front-rear directions. Therefore, the direction indicated by arrow B1 in FIG. 2 (near side in FIG. 1) is a leftward direction, and the direction indicted by arrow B2 in FIG. 2 (far side in FIG. 1) is a rightward direction. Furthermore, in the description, horizontal directions orthogonal to the front-rear directions A3 are machine body width directions (directions of arrows B3 in FIG. 2).

As illustrated in FIG. 1, the agricultural robot 1 includes a traveling body 3 which travels in an autonomous manner, a manipulator 4 attached to the traveling body 3, and an imaging device (first imaging device) 5A.

The traveling body 3 includes a machine body 6 and a traveling device 7 which supports the machine body 6 such that the machine body 6 can travel.

Figure 3:
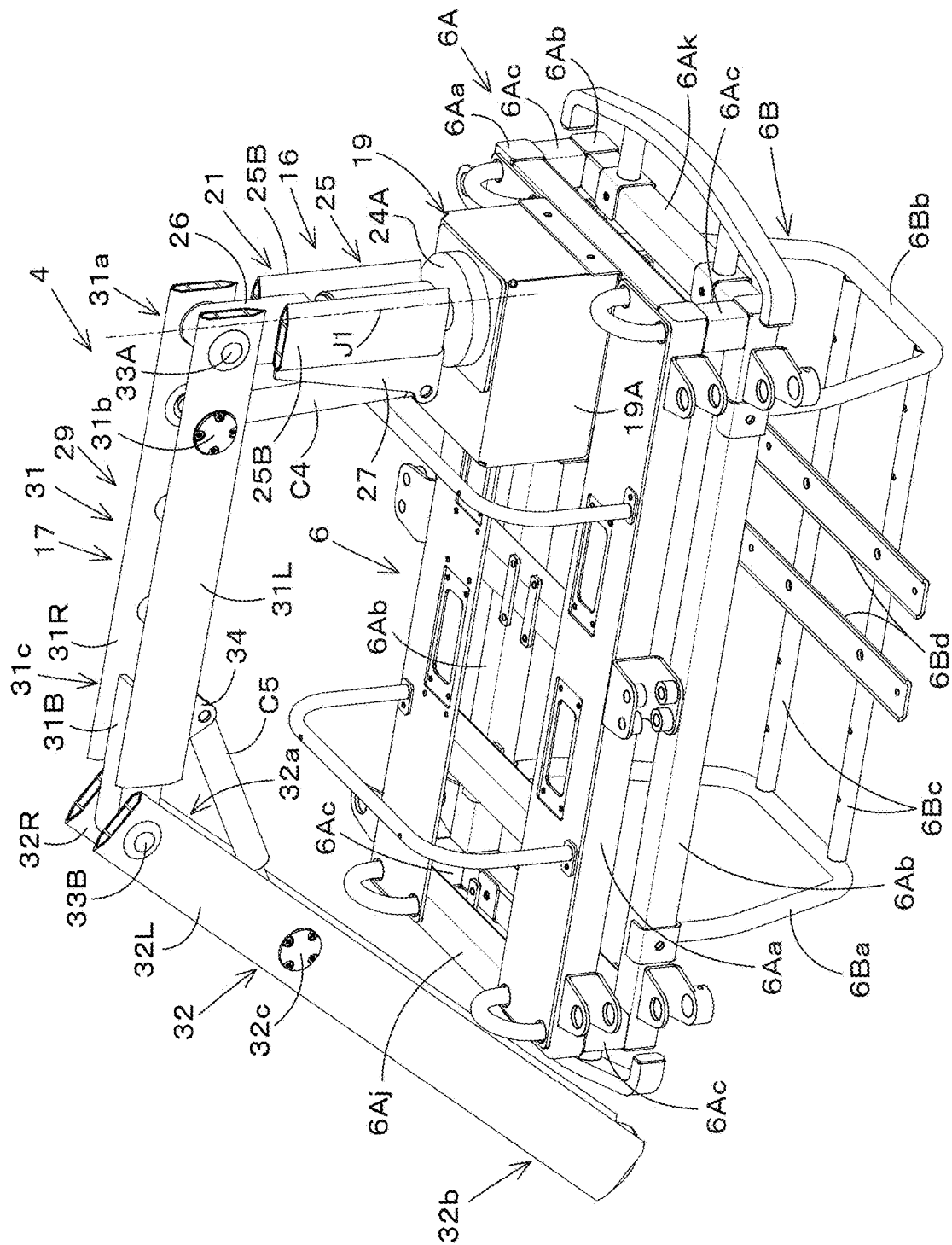
FIG. 3 is a perspective view of a machine body and a manipulator.
Figure 4:
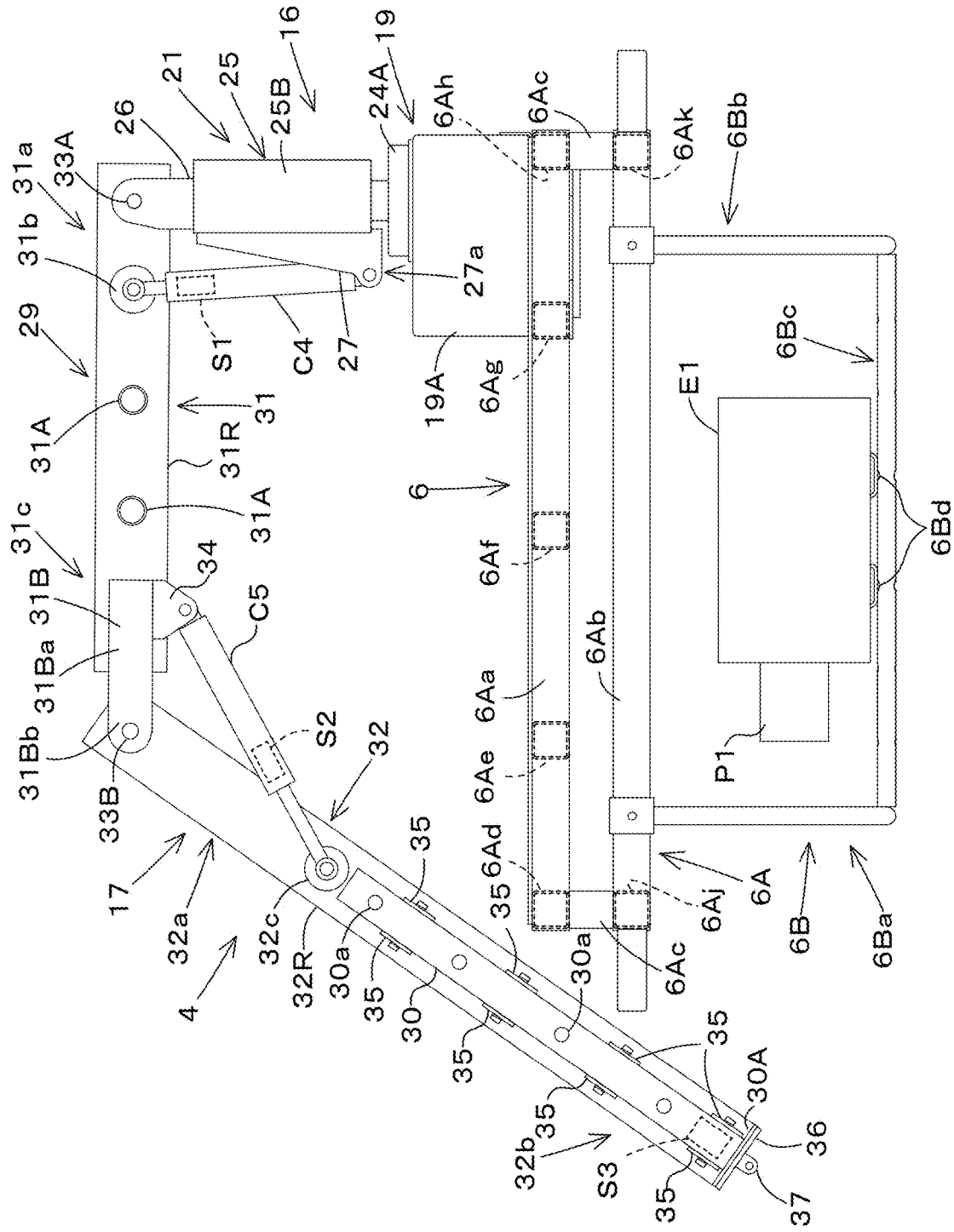
FIG. 4 is a side view of the machine body and the manipulator.

As illustrated in FIGS. 3 and 4, the machine body 6 includes a main frame 6A and a prime mover frame 6B. The main frame 6A includes a pair of first frames 6Aa which are arranged with a space therebetween along a machine body width direction B3, and a pair of second frames 6Ab which are disposed below the respective first frames 6Aa and are arranged with a space therebetween. The first frames 6Aa and the second frames 6Ab are connected by a plurality of vertical frames 6Ac. The vertical frames 6Ac are provided between front portions of the left first frame 6Aa and the left second frame 6Ab, between front portions of the right first frame 6Aa and the right second frame 6Ab, between rear portions of the left first frame 6Aa and the left second frame 6Ab, and between rear portions of the right first frame 6Aa and the right second frame 6Ab.

The left first frame 6Aa and the right first frame 6Aa are connected by first to fifth transverse frames 6Ad to 6Ah disposed between the first frames 6Aa. The first to fifth transverse frames 6Ad to 6Ah are arranged in parallel to each other along a front-rear direction A3 at intervals from the front ends of the first frames 6Aa to the rear ends of the first frames 6Aa.

Front portions of the second frames 6Ab are connected by a sixth transverse frame 6Aj, and rear portions of the second frames 6Ab are connected by a seventh transverse frame 6Ak.

The prime mover frame 6B is disposed below the main frame 6A. The prime mover frame 6B includes a front frame 6Ba, a rear frame 6Bb, a plurality of connector frames 6Bc, and a plurality of mount frames 6Bd. The front frame 6Ba has upper portions attached to the front portions of the left and right second frames 6Ab. The rear frame 6Bb has upper portions attached to the rear portions of the left and right second frames 6Ab. The plurality of connector frames 6Bc connect together lower portions of the front frame 6Ba and the rear frame 6Bb. The plurality of mount frames 6Bd are fixed to a middle portion of each of the connector frames 6Bc in a front-rear direction A3.

As illustrated in FIG. 4, a prime mover (engine) E1 is attached to the mount frames 6Bd. A hydraulic pump P1 is attached to the prime mover E1. The hydraulic pump P1 is driven by the prime mover E1. Furthermore, the prime mover frame 6B is equipped with a hydraulic fluid tank (not illustrated) for storing hydraulic fluid to be discharged from the hydraulic pump P1.

As illustrated in FIG. 2, the main frame 6A (machine body 6) is equipped with a plurality of control valves (first to fourth control valves CV1 to CV4) to control the traveling device 7.

As illustrated in FIGS. 1 and 2, the traveling device 7 includes a wheeled (four-wheel) traveling device 7 including four wheels 8. Specifically, the traveling device 7 includes a first wheel 8La (left front wheel) disposed at the front left of the machine body 6, a second wheel 8Ra (right front wheel) disposed at the front right of the machine body 6, a third wheel 8Lb (left rear wheel) disposed at the rear left of the machine body 6, and a fourth wheel 8Rb (right rear wheel) disposed at the rear right of the machine body 6. Note that the traveling device 7 may include a wheeled traveling device including at least three wheels 8. The traveling device 7 may be a crawler traveling device.

The traveling device 7 includes wheel supports 9 which support the wheels 8. The number of the wheel supports 9 provided corresponds to the number of the wheels 8. Specifically, the traveling device 7 includes a first wheel support 9La which supports the first wheel 8La, a second wheel support 9Ra which supports the second wheel 8Ra, a third wheel support 9Lb which supports the third wheel 8Lb, and a fourth wheel support 9Rb which supports the fourth wheel 8Rb.

Figure 5:
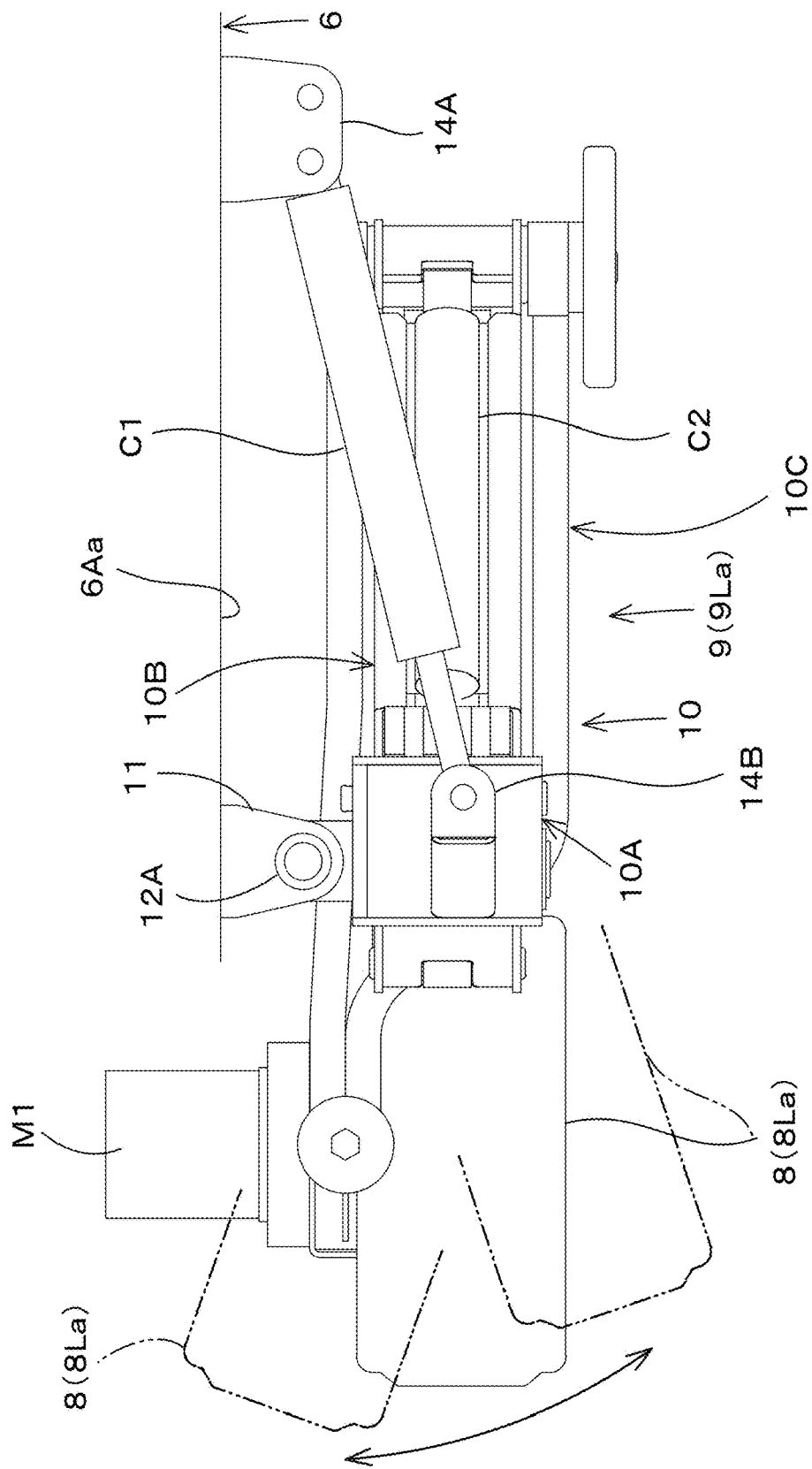
FIG. 5 is a plan view of a traveling device.
Figure 6:
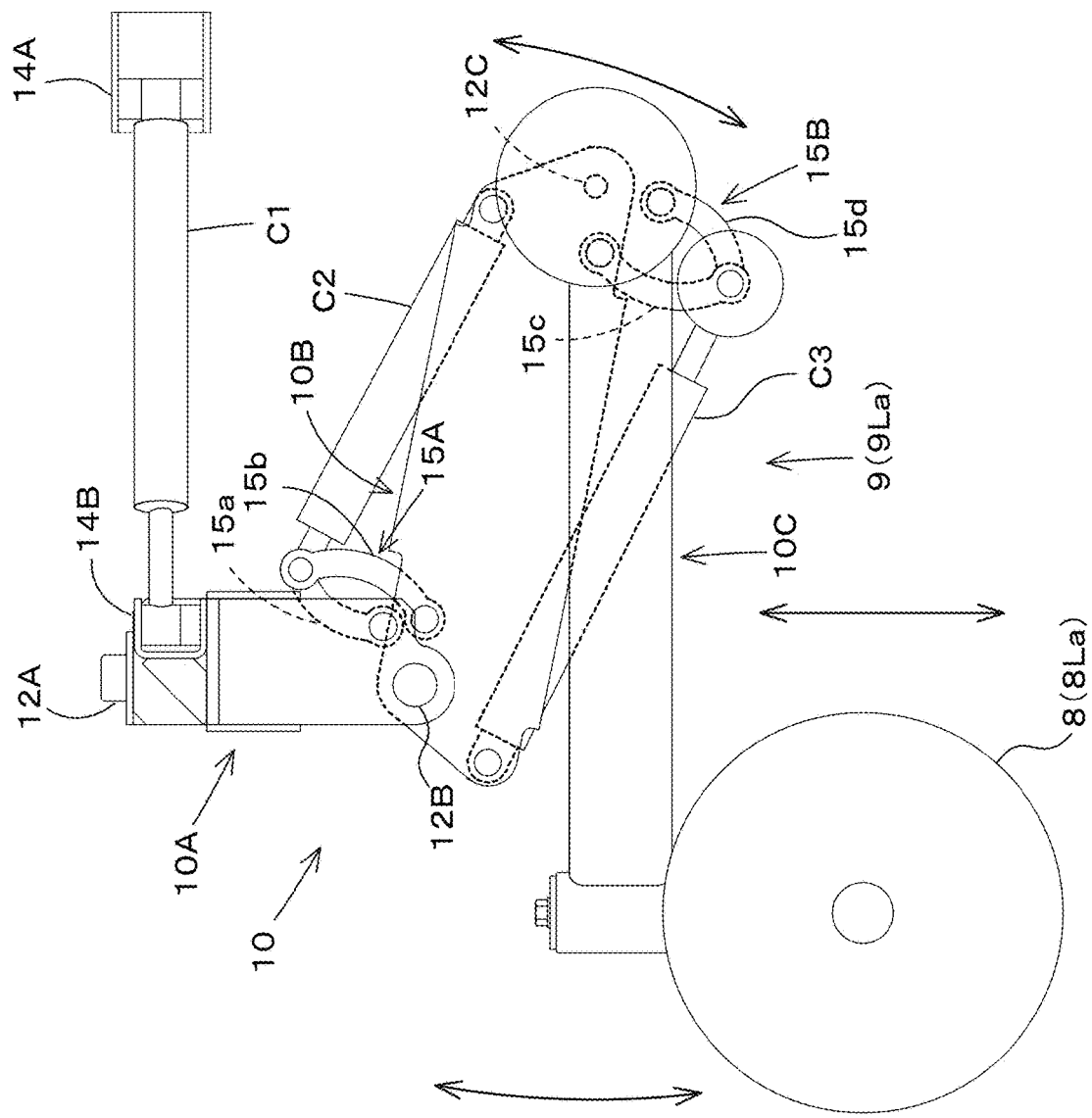
FIG. 6 is a side view of the traveling device.

As illustrated in FIGS. 5 and 6, each of the wheel supports 9 includes a travel frame 10, a steering cylinder C1, a first lift cylinder C2, a second lift cylinder C3, and a travel motor M1.

The travel frame 10 includes a main support 10A, a swing frame 10B, and a wheel frame 10C. The main support 10A is supported on the machine body 6 such that the main support 10A is rotatable about a vertical axis (axis extending along a top-bottom direction). Specifically, the main support 10A is supported on a support bracket 11 fixed to the machine body 6 such that the main support 10A is rotatable about a first support shaft 12A having an axis extending along the top-bottom direction.

As illustrated in FIG. 2, the support bracket 11 which pivotably supports the first wheel support 9La is provided at the front left of the machine body 6, the support bracket 11 which pivotably supports the second wheel support 9Ra is provided at the front right of the machine body 6, the support bracket 11 which pivotably supports the third wheel support 9Lb is provided at the rear left of the machine body 6, and the support bracket 11 which pivotably supports the fourth wheel support 9Rb is provided at the rear right of the machine body 6.

The swing frame 10B is supported on the main support 10A such that the swing frame 10B is swingable up and down. Specifically, the swing frame 10B has an upper portion supported on the main support 10A via a second support shaft 12B such that the swing frame 10B is pivotable about a horizontal axis (axis extending along a machine body width direction B3).

The swing frame 10B of each of the first and second wheel supports 9La and 9Ra has its upper front portion pivoted on a corresponding main support 10A, and the swing frame 10B of each of the third and fourth wheel supports 9Lb and 9Rb has its upper rear portion pivoted on a corresponding main support 10A.

The wheel frame 10C is supported on the swing frame 10B such that the wheel frame 10C is swingable up and down. Specifically, the wheel frame 10C is supported on the swing frame 10B via a third support shaft 12C such that the wheel frame 10C is pivotable about a horizontal axis.

The wheel frame 10C of each of the first and second wheel supports 9La and 9Ra has its rear portion pivoted on a rear portion of the swing frame 10B, and the wheel frame 10C of each of the third and fourth wheel supports 9Lb and 9Rb has its front portion pivoted on a front portion of the swing frame 10B.

The steering cylinder C1, the first lift cylinder C2, and the second lift cylinder C3 each include a hydraulic cylinder.

The steering cylinder C1 is disposed between the machine body 6 and the main support 10A. Specifically, the steering cylinder C1 has one end pivoted on a cylinder bracket 14A fixed to a middle portion of a corresponding first frame 6Aa in a front-rear direction A3, and has the opposite end pivoted on a cylinder bracket 14B fixed to the main support 10A. Extension or retraction of the steering cylinder C1 causes the travel frame 10 to swing about the first support shaft 12A, thereby changing the orientation of a corresponding wheel 8 (corresponding one of the first to fourth wheels 8La to 8Rb) (steering the wheel 8). With regard to the traveling device 7 in the present preferred embodiment, each of the wheels 8 can be steered independently.

The first lift cylinder C2 has one end pivoted on the swing frame 10B and the opposite end pivoted on a first linkage mechanism 15A. The first linkage mechanism 15A includes a first link 15a and a second link 15b. The first link 15a has one end pivoted on the main support 10A, and the second link 15b has one end pivoted on the swing frame 10B. The first link 15a and the second link 15b each have the opposite end pivoted on the opposite end of the first lift cylinder C2. Extension or retraction of the first lift cylinder C2 causes the swing frame 10B to swing up or down about the second support shaft 12B.

The second lift cylinder C3 has one end pivoted on a front portion of the swing frame 10B and the opposite end pivoted on a second linkage mechanism 15B. The second linkage mechanism 15B includes a first link 15c and a second link 15d. The first link 15c has one end pivoted on the swing frame 10B, and the second link 15d has one end pivoted on the wheel frame 10C. The first link 15c and the second link 15d each have the opposite end pivoted on the opposite end of the second lift cylinder C3. Extension or retraction of the second lift cylinder C3 causes the wheel frame 10C to swing up or down about the third support shaft 12C.

The combination of upward or downward swinging movement of the swing frame 10B caused by the first lift cylinder C2 and the upward or downward swinging movement of the wheel frame 10C caused by the second lift cylinder C3 allows a corresponding one of the wheels 8 to be raised or lowered in a parallel manner.

The travel motor M1 is a hydraulic motor, for example. Such travel motors M1 are provided so as to correspond to the respective wheels 8. Specifically, the traveling device 7 includes a travel motor M1 to drive the first wheel 8La, a travel motor M1 to drive the second wheel 8Ra, a travel motor M1 to drive the third wheel 8Lb, and a travel motor M1 to drive the fourth wheel 8Rb. Each travel motor M1 is disposed inward of a corresponding wheel 8 in a machine body width direction B3 and is attached to a corresponding wheel frame 10C. Each travel motor M1 is driven by a hydraulic fluid discharged from the hydraulic pump P1 and is rotatable in forward and reverse directions. By changing the direction of rotation of the travel motor M1 between the forward direction and the reverse direction, it is possible to change the direction of rotation of a corresponding wheel 8 between the forward direction and the reverse direction.

The second wheel support 9Ra, the third wheel support 9Lb, and the fourth wheel support 9Rb each include elements similar to that of the first wheel support 9La. The second wheel support 9Ra has a configuration laterally symmetrical to the wheel support 9La. The third wheel support 9Lb is in the form obtained by a 180 degree rotation of the second wheel support 9Ra about a vertical central axis passing through the center of the machine body 6. The fourth wheel support 9Rb is in the form obtained by a 180 degree rotation of the wheel support 9La about the central axis.

A hydraulic actuator attached to the first wheel support 9La is controlled by a first control valve CV1. A hydraulic actuator attached to the second wheel support 9Ra is controlled by a second control valve CV2. A hydraulic actuator attached to the third wheel support 9Lb is controlled by a third control valve CV3. A hydraulic actuator attached to the fourth wheel support 9Rb is controlled by a fourth control valve CV4.

Thus, the first wheel 8La to the fourth wheel 8Rb can each independently be steered. Furthermore, the first wheel 8La to the fourth wheel 8Rb can each independently be raised and lowered.

With regard to the traveling device 7, the traveling body 3 can be turned by steering the first wheel 8La to the fourth wheel 8Rb. The traveling body 3 can be caused to travel forward by causing the first wheel 8La to the fourth wheel 8Rb to rotate in the forward direction, and the traveling body 3 can be caused to travel rearward by causing the first wheel 8La to the fourth wheel 8Rb to rotate in the reverse direction. The traveling body 3 can be raised or lowered by raising or lowering the first wheel 8La to the fourth wheel 8Rb. The machine body 6 can be tilted forward or rearward by raising or lowering the first wheel 8La and the second wheel 8Ra relative to the third wheel 8Lb and the fourth wheel 8Rb or by raising or lowering the third wheel 8Lb and the fourth wheel 8Rb relative to the first wheel 8La and the second wheel 8Ra. The machine body 6 can be titled such that one of the opposite sides of the machine body 6 in a machine body width direction B3 is higher than the other by raising or lowering the first wheel 8La and the third wheel 8Lb relative to the second wheel 8Ra and the fourth wheel 8Rb or by raising or lowering the second wheel 8Ra and the fourth wheel 8Rb relative to the first wheel 8La and the third wheel 8Lb.

The manipulator 4 in the present preferred embodiment is a device at least capable of harvesting the crop 2. As illustrated in FIGS. 3 and 4, the manipulator 4 includes a mounting unit 16 detachably attached to the traveling body 3 (machine body 6), an arm 17 attached to the mounting unit 16, and a robot hand 18 which is disposed on the arm 17 and which is capable of holding the crop (target) 2.

As illustrated in FIG. 1, the mounting unit 16 in the present preferred embodiment is disposed at the rear of the traveling body 3. Note that the mounting unit 16 may be disposed at the front of the traveling body 3. That is, the mounting unit 16 need only be disposed at a location offset, in one direction, from the center of the traveling body 3 in a front-rear direction A3. In the present preferred embodiment, the agricultural robot 1 does harvesting work as the traveling body 3 travels forward, and therefore the mounting unit 16 is disposed at a location offset in a direction opposite to the direction of travel (i.e., in a counter-traveling direction).

Figure 7:
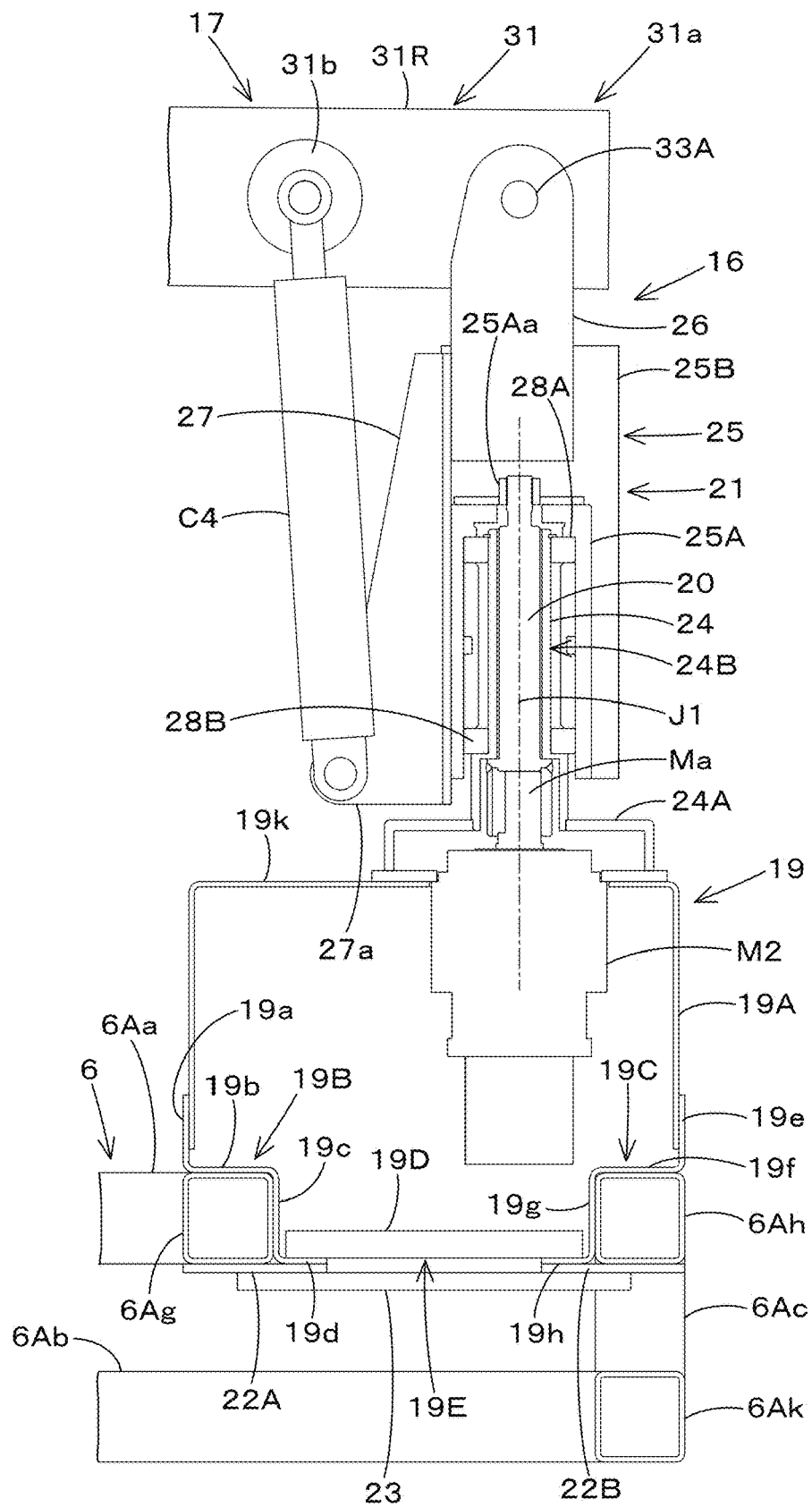
FIG. 7 is a side cross-sectional view of a mount of the manipulator.

As illustrated in FIG. 7, the mounting unit 16 includes a mount 19 detachably attached to the traveling body 3, a rotating shaft 20 supported on the mount 19 such that the rotating shaft 20 is rotatable about a vertical axis, a rotary motor M2 to drive the rotating shaft 20 to rotate, and a rotating frame 21 which rotates together with the rotating shaft 20.

Figure 9:
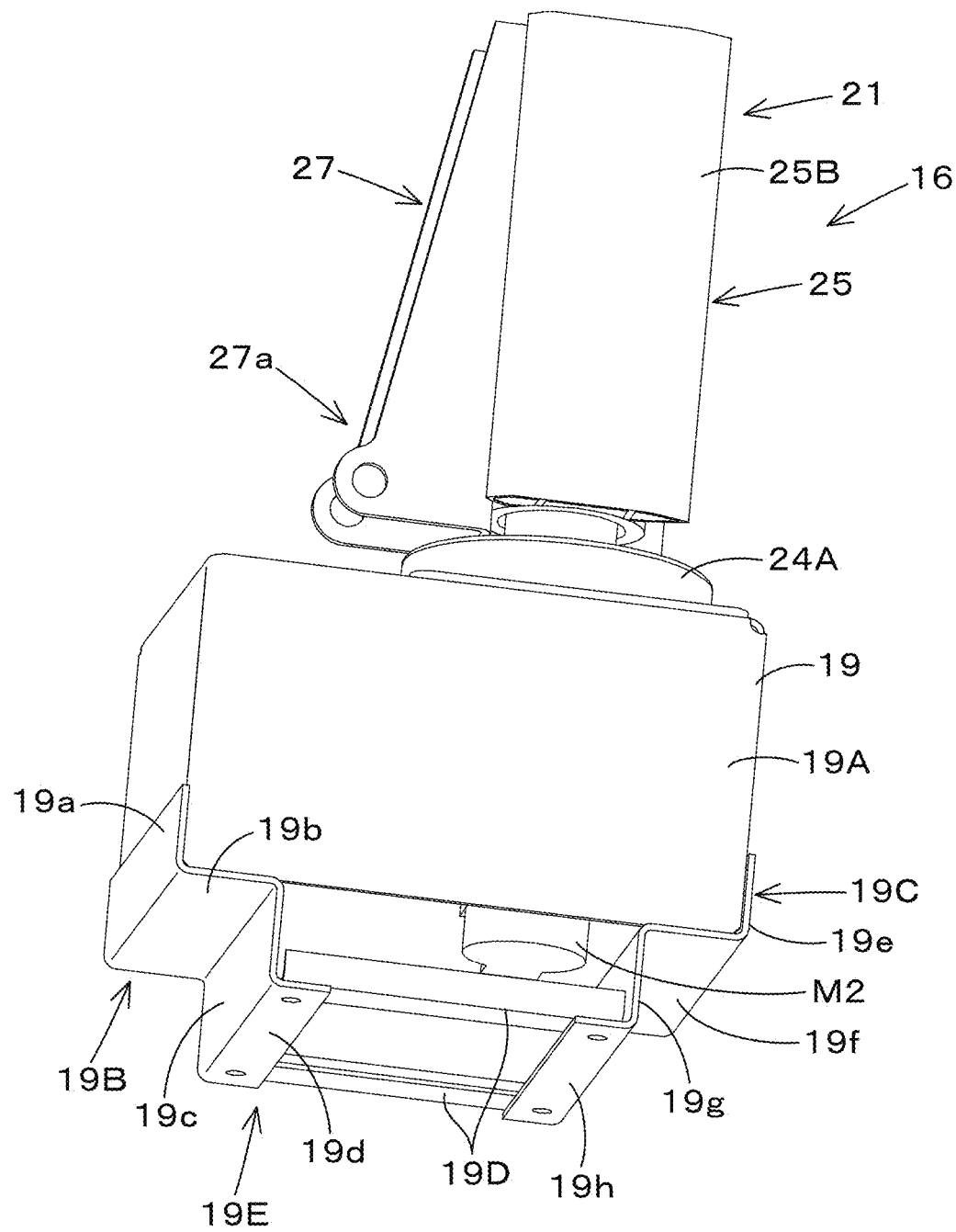
FIG. 9 is a perspective view of the mount.

As illustrated in FIGS. 7 and 9, the mount 19 includes a main body portion 19A which includes a housing with an open bottom. The main body portion 19A has a first plate member 19B fixed to a front portion at the bottom thereof, and has a second plate member 19C fixed to a rear portion at the bottom thereof. The first plate member 19B includes a first wall 19a fixed to a lower portion of a front surface of the mount 19, a second wall 19b which extends rearward from a lower edge of the first wall 19a, a third wall 19c which extends downward from a rear edge of the second wall 19b, and a fourth wall 19d which extends rearward from a lower edge of the third wall 19c. The second plate member 19C includes a first wall 19e fixed to a lower portion of a rear surface of the mount 19, a second wall 19f which extends forward from a lower edge of the first wall 19e, a third wall 19g which extends downward from a front edge of the second wall 19f, and a fourth wall 19h which extends forward from a lower edge of the third wall 19g. The fourth wall 19d and the fourth wall 19h are connected by a plurality of connector members 19D.

As illustrated in FIG. 7, the third walls 19c and 19g, the fourth walls 19d and 19h, and the plurality of connector members 19D define an engagement portion 19E. That is, the mount 19 includes the engagement portion 19E which projects downward at the bottom. The engagement portion 19E is configured to be inserted between the fourth transverse frame 6Ag (first mount frame) and the fifth transverse frame 6Ah (second mount frame).

Figure 10:
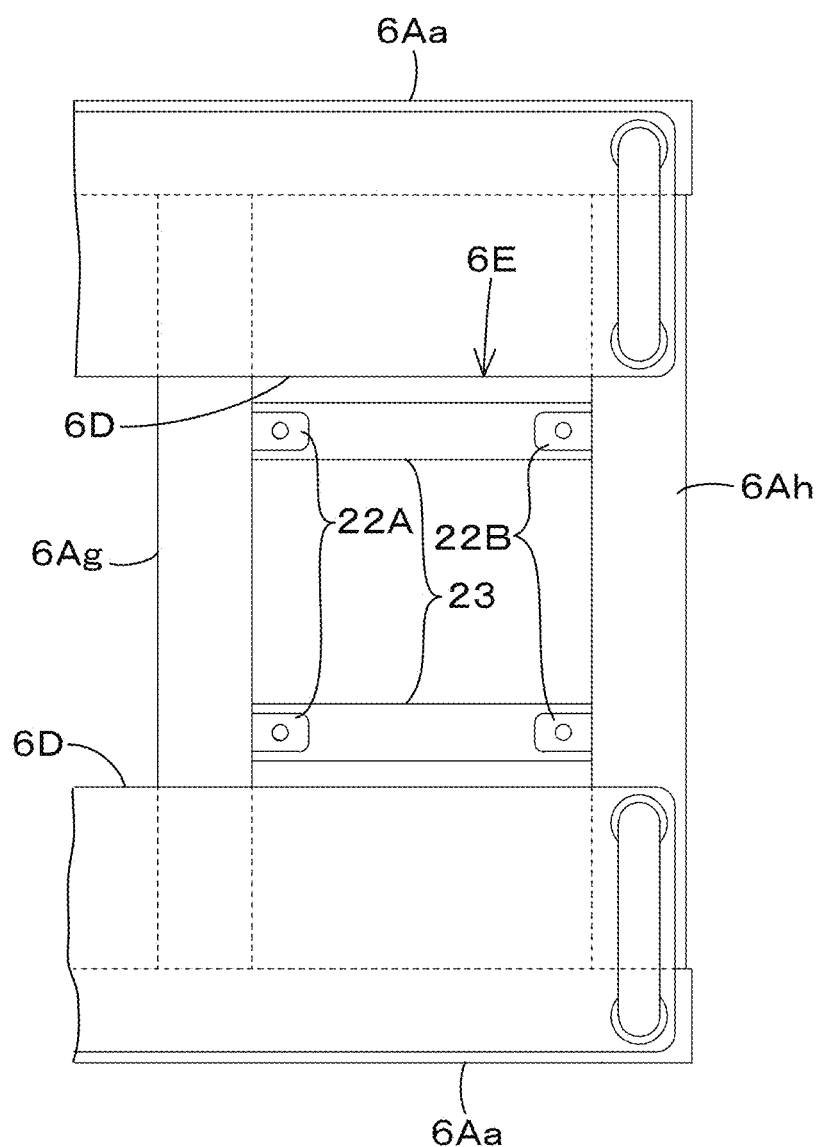
FIG. 10 is a plan view of a rear portion of the machine body.

As illustrated in FIGS. 7 and 10, on the lower surface of the fourth transverse frame 6Ag, a pair of rest plates 22A which are arranged along a machine body width direction B3 are fixed in a manner such that the pair of rest plates 22A project rearward. Furthermore, also on the lower surface of the fifth transverse frame 6Ah, a pair of rest plates 22B which are arranged in a machine body width direction B3 are fixed in a manner such that the pair of rest plates 22B project forward. The rest plates 22A and the rest plates 22B are connected by connector plates 23. At the upper surface of the machine body 6, plate members 6D are fixed to a left portion and a right portion of the machine body 6, respectively. A space defined by the left and right plate members 6D and the fourth transverse frames 6Ag and the fifth transverse frame 6Ah serves as an insertion portion 6E for insertion of the engagement portion 19E (see FIG. 10).

As illustrated in FIG. 7, the insertion of the engagement portion 19E between the fourth transverse frame 6Ag and the fifth transverse frame 6Ah allows the machine body 6 (traveling body 3) to hold the mount 19. Specifically, the second wall 19*b* is placed on an upper surface of the fourth transverse frame 6Ag, and the third wall 19*c* abuts a rear surface of the fourth transverse frame 6Ag. The fourth wall 19*d* is placed on the rest plates 22A. Furthermore, the second wall 19*f* is placed on an upper surface of the fifth transverse frame 6Ah, and the third wall 19*g* abuts a front surface of the fifth transverse frame 6Ah. The fourth wall 19*h* is placed on the rest plates 22B. With this, the machine body 6 holds the mount 19. In other words, it is possible to easily hold the mount 19. It is also easy to attach and detach the mount 19.

The connector members 19D in the present preferred embodiment are each made of an angle, and have nut member(s) (not illustrated) fixed to an upper portion thereof. By screwing bolt(s) into the nut member(s) from the bottom through the connector plates 23, the rest plates 22A and 22B, and the connector members 19D, it is possible to detachably fix the engagement portion 19E (mount 19) with the bolt(s).

As such, the mounting unit 16 can be attached to and detached from the traveling body 3 (machine body 6).

Detaching the mount 19 (mounting unit 16) from the machine body 6 makes it possible to detach the manipulator 4, making it possible to replace the manipulator 4 with a manipulator of a different type from the manipulator 4 of the present preferred embodiment.

As illustrated in FIG. 7, the mount 19 has thereon an upright shaft support 24 which supports the rotating shaft 20. The shaft support 24 includes a hollow base portion 24A which is fixed on an upper surface of the mount 19 and a support tube 24B which projects upward from the base portion 24A.

As illustrated in FIG. 7, the rotating shaft 20 has an axis (rotation axis J1) which extends along a top-bottom direction. The rotating shaft 20 is inserted in the support tube 24B and supported by the support tube 24B such that the rotating shaft 20 is rotatable about the rotation axis J1.

The rotary motor M2 may be, for example, an electric motor which is rotatable in forward and reverse directions. The rotary motor M2 is actuated by electricity supplied from a battery (not illustrated) mounted on the traveling body 3. Note that the rotary motor M2 may be a hydraulic motor which is actuated by a hydraulic pump P1 mounted on the traveling body 3.

As illustrated in FIG. 7, the rotary motor M2 is housed in the mount 19 and attached to an upper wall 19*k* of the mount 19. The rotary motor M2 includes an output shaft Ma which projects upward from the mount 19. The output shaft Ma of the rotary motor M2 is connected to a lower portion of the rotating shaft 20 such that the output shaft Ma and the rotating shaft 20 can rotate together. Therefore, the rotating shaft 20 is driven by a rotational force outputted from the rotary motor M2 such that the rotating shaft 20 is rotatable about the rotation axis J1 in forward and reverse directions.

As illustrated in FIG. 7, the rotating frame 21 is supported on the shaft support 24 such that the rotating frame 21 is rotatable about the rotation axis J1. Thus, the rotating frame 21 is attached to the mount 19 such that the rotating frame 21 is rotatable about the rotation axis J1. In other words, the rotating frame 21 is supported on the machine body 6 (traveling body 3) such that the rotating frame 21 is rotatable about a vertical axis. Specifically, the rotating frame 21 includes a frame main body 25, an arm bracket 26, and a cylinder bracket 27. The frame main body 25 includes a rotating portion 25A. The rotating portion 25A surrounds the support tube 24B, and is supported on the support tube 24B via a bearing 28A and a bearing 28B such that the rotating portion 25A is rotatable about the rotation axis J1. The rotating portion 25A includes a coupled portion 25Aa coupled via a spline or the like to an upper portion of the rotating shaft 20, and rotates together with the rotating shaft 20. That is, the rotating frame 21 can be caused to rotate about the rotation axis J1 by the rotary motor M2. The rotation of the rotating frame 21 causes the robot hand 18 to move (change in position) along a circumference centered on the rotation axis J1.

As illustrated in FIG. 3, the frame main body 25 includes a pair of frame members 25B which are arranged opposite each other along a direction orthogonal to the rotation axis J1 with the rotating portion 25A therebetween. Each of the frame members 25B is fixed to the rotating portion 25A. As illustrated in FIG. 7, an upper portion of each frame member 25B projects upward from the rotating portion 25A. The arm bracket 26 is fixed between upper portions of the pair of frame members 25B in a manner such that the arm bracket 26 projects upward. The cylinder bracket 27 is attached to front portions of the arm bracket 26 and the rotating portion 25A. The cylinder bracket 27 includes, at a lower portion thereof, a cylinder mount portion 27*a*.

As illustrated in FIGS. 3 and 4, the arm 17 is supported on the rotating frame 21 (arm bracket 26) such that the arm 17 is swingable up and down, and is bendable at a lengthwise intermediate portion thereof. The arm 17 includes a main arm 29 and a sub-arm 30.

The main arm 29 is pivoted on the rotating frame 21 such that the main arm 29 is swingable up and down, and is bendable. Specifically, the main arm 29 includes a first arm unit 31 pivoted on the rotating frame 21 such that the main arm 29 is swingable up and down, and a second arm unit 32 swingably pivoted on the first arm unit 31, and is capable of being bent by the swinging movement of the second arm unit 32 relative to the first arm unit 31.

Figure 8:
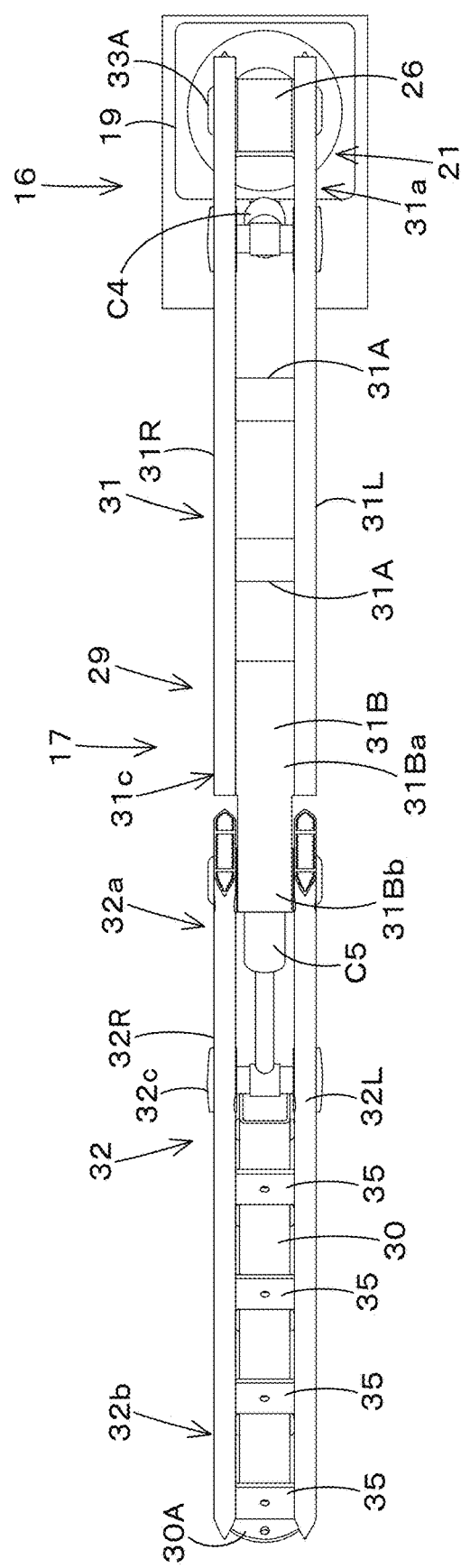
FIG. 8 is a plan view of an arm.

The first arm unit 31 has a proximal portion 31*a* pivoted on the arm bracket 26. As illustrated in FIGS. 3 and 8, the first arm unit 31 includes a first arm frame 31L and a second arm frame 31R. The first arm frame 31L and the second arm frame 31R are arranged along a machine body width direction B3 and are connected to each other by connector pipe(s) 31A and/or the like. An upper portion of the arm bracket 26 is inserted between proximal portions 31*a* of the first arm frame 31L and the second arm frame 31R, and the proximal portions 31*a* of the first arm frame 31L and the second arm frame 31R are supported on the arm bracket 26 via an arm pivot shaft 33A (referred to as a "first arm pivot shaft") which has an axis extending along a machine body width direction B3 such that the proximal portions 31*a* of the first arm frame 31L and the second arm frame 31R are pivotable about the axis of the first arm pivot shaft 33A.

The first arm frame 31L and the second arm frame 31R each include a hollow member. The length of the first arm unit 31 is less than a dimension of the traveling body 3 (machine body 6) in a front-rear direction A3.

As illustrated in FIG. 4, the first arm unit 31 includes a cylinder mount 31*b* which is in the proximal portion 31*a* and which is closer to a distal portion 31c than the first arm pivot shaft 33A is to the distal end portion 31c. A first arm cylinder (first hydraulic cylinder) C4 is provided to bridge the cylinder mount 31b and the cylinder mount portion 27a of the cylinder bracket 27. The first arm cylinder C4 is driven by hydraulic fluid discharged from the hydraulic pump P1 provided on the traveling body 3 to extend or retract. The extension or retraction of the first arm cylinder C4 causes the first arm unit 31 to swing up or down. The upward or downward swinging movement of the first arm unit 31 (arm 17) causes the robot hand 18 to be raised or lowered. The first arm cylinder C4 is provided with a first stroke sensor S1 to detect strokes of the first arm cylinder C4.

As illustrated in FIG. 4, the first arm unit 31 has a pivotably supporting member 31B fixed to the distal portion 31c thereof. Specifically, the pivotably supporting member 31B includes a proximal portion 31B a inserted between the first arm frame 31L and the second arm frame 31R, and is fixed to the first arm frame 31L and the second arm frame 31R. The pivotably supporting member 31B has a cylinder stay 34 attached to a lower surface of the proximal portion 31B a. A distal portion 31Bb of the pivotably supporting member 31B projects forward from the first arm frame 31L and the second arm frame 31R.

As illustrated in FIGS. 3 and 8, the length of the second arm unit 32 is greater than the length of the first arm unit 31. The second arm unit 32 has a proximal portion 32a pivoted on the distal portion 31Bb of the pivotably supporting member 31B. The second arm unit 32 includes a third arm frame 32L and a fourth arm frame 32R. The third arm frame 32L and the fourth arm frame 32R are arranged along a machine body width direction B3, and are connected to each other by a plurality of connector plates 35. The third arm frame 32L and the fourth arm frame 32R each include a hollow member. The distal portion 31Bb of the pivotably supporting member 31B is inserted between proximal portions 32a of the third arm frame 32L and the fourth arm frame 32R. The third arm frame 32L and the fourth arm frame 32R (second arm unit 32) are pivoted on the pivotably supporting member 31B via an arm pivot shaft (referred to as a "second arm pivot shaft") 33B having an axis extending along a machine body width direction B3.

The second arm unit 32 includes a cylinder mount 32c which is in the proximal portion 32a and which is closer to a distal portion 32b than the second arm pivot shaft 33B is to the distal portion 32b. A second arm cylinder (second hydraulic cylinder) C5 is provided to bridge the cylinder mount 32c and the cylinder stay 34. The second arm cylinder C5 is driven by hydraulic fluid discharged from the hydraulic pump P1 provided on the traveling body 3 to extend and retract. The extension or retraction of the second arm cylinder C5 causes the second arm unit 32 to swing relative to the first arm unit 31, causing the main arm 29 (arm 17) to be bent or stretched. Note that, in the present preferred embodiment, the main arm 29 in a fully stretched state is in the form of a straight line, but the main arm 29 in a fully stretched state may be bent to some extent.

Furthermore, the extension or retraction of the second arm cylinder C5 allows the robot hand 18 to move away from or toward the traveling body 3. Specifically, the extension of the second arm cylinder C5 allows the robot hand 18 to move in a direction away from the traveling body 3, and the retraction of the second arm cylinder C5 allows the robot hand 18 to move in a direction toward the traveling body 3.

As illustrated in FIG. 4, the second arm cylinder C5 is provided with a second stroke sensor S2 to detect strokes of the second arm cylinder C5.

As illustrated in FIGS. 4 and 8, the plurality of connector plates 35 in the present preferred embodiment are four sets of connector plates 35 which are arranged along a longitudinal direction of the second arm unit 32 at intervals. Each of the four sets of connector plates 35 includes a pair of connector plates 35 which are arranged along a direction orthogonal to the longitudinal direction of the second arm unit 32 and which face each other along a direction orthogonal to a direction along which the third arm frame 32L and the fourth arm frame 32R face each other.

In the present preferred embodiment, the first arm unit 31 and the second arm unit 32 each include two hollow members connected together to be highly rigid. Furthermore, since the first arm frame 31L and the second arm frame 31R of the first arm unit 31 and the third arm frame 32L and the fourth arm frame 32R of the second arm unit 32 each include a hollow member, routed member(s) such as hydraulic hose(s) and/or harness(es) can be routed within the first to fourth arm frames 31L to 32R. This makes it possible to prevent damage to the hydraulic hose(s) and/or harness(es). Furthermore, a compact configuration can be achieved when the first arm frame 31L and the second arm frame 31R are connected together with a distal portion of a piston rod of the first arm cylinder C4 therebetween and the third arm frame 32L and the fourth arm frame 32R are connected together with a distal portion of a piston rod of the second arm cylinder C5 therebetween.

The sub-arm 30 is provided such that the sub-arm 30 can extend and retract relative to the second arm unit 32. Therefore, the extension or retraction of the sub-arm 30 makes it possible to increase or reduce the length of the arm 17. As illustrated in FIGS. 4 and 8, the sub-arm 30 is made of a square pipe in the form of a straight line. The sub-arm 30 is supported between distal portions (front portions) of the third arm frame 32L and the fourth arm frame 32R such that the sub-arm 30 is movable along a longitudinal direction. Furthermore, the sub-arm 30 is disposed between connector plates 35 facing each other, and can be fixed to the connector plates 35 with fixing member(s) such as bolt(s). The sub-arm 30 includes, on one side surface, protrusion(s) 30a which abut(s) the third arm frame 32L, and includes, on the opposite side surface, another protrusion(s) 30a which abut(s) the fourth arm frame 32R. The protrusions 30a make it possible to prevent or reduce the rattle of the sub-arm 30.

The sub-arm 30 is, when in a fully retracted position, contained within the space between the third arm frame 32L and the fourth arm frame 32R. Note that the sub-arm 30 in the fully retracted position may project from the second arm unit 32 to some extent.

As illustrated in FIG. 4, the sub-arm 30 has a joint flange 30A fixed to a distal portion thereof. The joint flange 30A has a mount flange 36 attached thereto with bolt(s) and/or the like, and the mount flange 36 has a hanger plate 37 fixed thereto. The robot hand 18 is pivoted on the hanger plate 37 and is hung on the hanger plate 37 (see FIG. 1). That is, the robot hand 18 is swingably attached to the distal portion of the sub-arm 30. The distal portion of the second arm unit 32 is provided with a third stroke sensor S3 to measure (detect) the degree of extension of the sub-arm 30 from the second arm unit 32.

The sub-arm 30 is, for example, used in the following two positions: a fully extended position with respect to the second arm unit 32; and a fully retracted position with respect to the second arm unit 32. Note that the degree of the extension of the sub-arm 30 may be adjusted in steps between the fully extended position and the fully retracted position, and may be fixed at a position between the fully extended position and the fully retracted position. The sub-arm 30 may be extended and retraced using a hydraulic cylinder.

Figure 11:
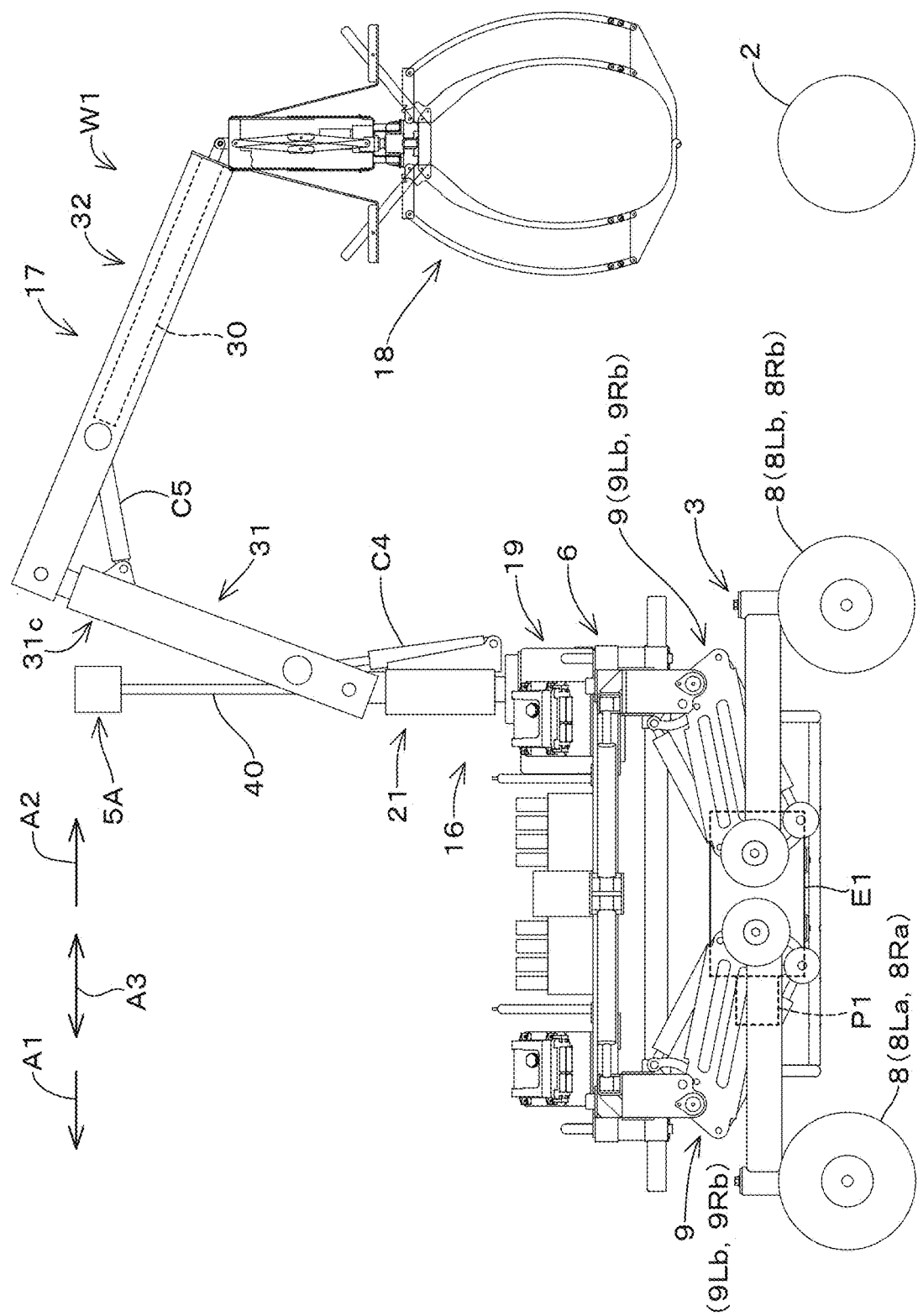
FIG. 11 is a side view of the agricultural robot in a work posture.

The arm 17 can be changed in posture between a work posture W1 in which the arm 17 points in a front-rear direction A3 (in the counter-traveling direction) (see FIG. 11) and a ready-for-storage posture W2 in which the arm 17 points in the opposite front-rear direction A3 (in the traveling direction) and is bent (see FIG. 1). In the present preferred embodiment, the work posture W1 is a posture in which the arm 17 points in a rearward direction of the traveling body 3, as illustrated in FIG. 11. Specifically, the work posture W1 is a posture in which the arm 17 points in a direction between the front-to-rear direction of the traveling body 3 and a machine body width direction B3. The ready-for-storage posture W2 is a posture in which the arm 17 points in a rear-to-front direction of the traveling body 3 as illustrated in FIG. 1.

The agricultural robot 1 does work such as the work of harvesting crop(s) 2 while the arm 17 is in the work posture W1 and within a certain range around the rotation axis J1. By causing the rotating frame 21 to rotate leftward or rightward and raising/lowering and stretching/bending the arm 17 while the arm 17 is in the work posture W1, it is possible to move the robot hand 18 to a desired position. That is, it is possible to move the robot hand 18 to a space above the crop 2 and lower the robot hand 18 to hold the crop 2 with the robot hand 18.

As illustrated in FIG. 1, with regard to the arm 17 in the ready-for-storage posture W2, the first arm unit 31 extends above the traveling body 3 such that the first arm unit 31 is inclined upward in a forward direction, and the second arm unit 32 extends from the space above an intermediate portion of the traveling body 3 in a front-rear direction A3 such that the second arm unit 32 is inclined downward in the forward direction. The sub-arm 30 is in the fully retracted position.

In the present preferred embodiment, the rotating frame 21, which rotatably supports the arm 17, is disposed at the rear of the traveling body 3, and the work of harvesting crop(s) 2 is done while the arm 17 is in the work posture W1 in which the arm 17 points rearward. This makes it possible to ensure a wide work area.

Furthermore, the distal portion 31c of the first arm unit 31 is located rearward of the traveling body 3 in the work posture W1, whereas the distal portion 31c of the first arm unit 31 is located rearward of the front end of the traveling body 3 (machine body 6) and the first arm unit 31 is located above the traveling body 3 in the ready-for-storage posture W2 (in examples in the drawings, the distal portion 31c of the first arm unit 31 is located above a substantially middle portion of the traveling body 3 in a front-rear direction). This makes it possible to make the agricultural robot 1 compact in a front-rear direction A3 when the agricultural robot 1 is not used (e.g., transferred or stored).

With the agricultural robot 1 of the present preferred embodiment, since the arm 17 is configured to be caused by a hydraulic cylinder to swing, it is possible to easily lift up and carry a crop 2 such as a watermelon weighing more than 10 kg. Furthermore, since the hydraulic pump P1 mounted on the traveling body 3 is used as a power source (hydraulic pressure source) for the first arm cylinder C4 and the second arm cylinder C5 (a power source for driving a hydraulic actuator for the traveling body 3 and a power source for driving a hydraulic actuator for the manipulator 4 are not separated power sources), it is possible to achieve a compact configuration.

Figure 12:
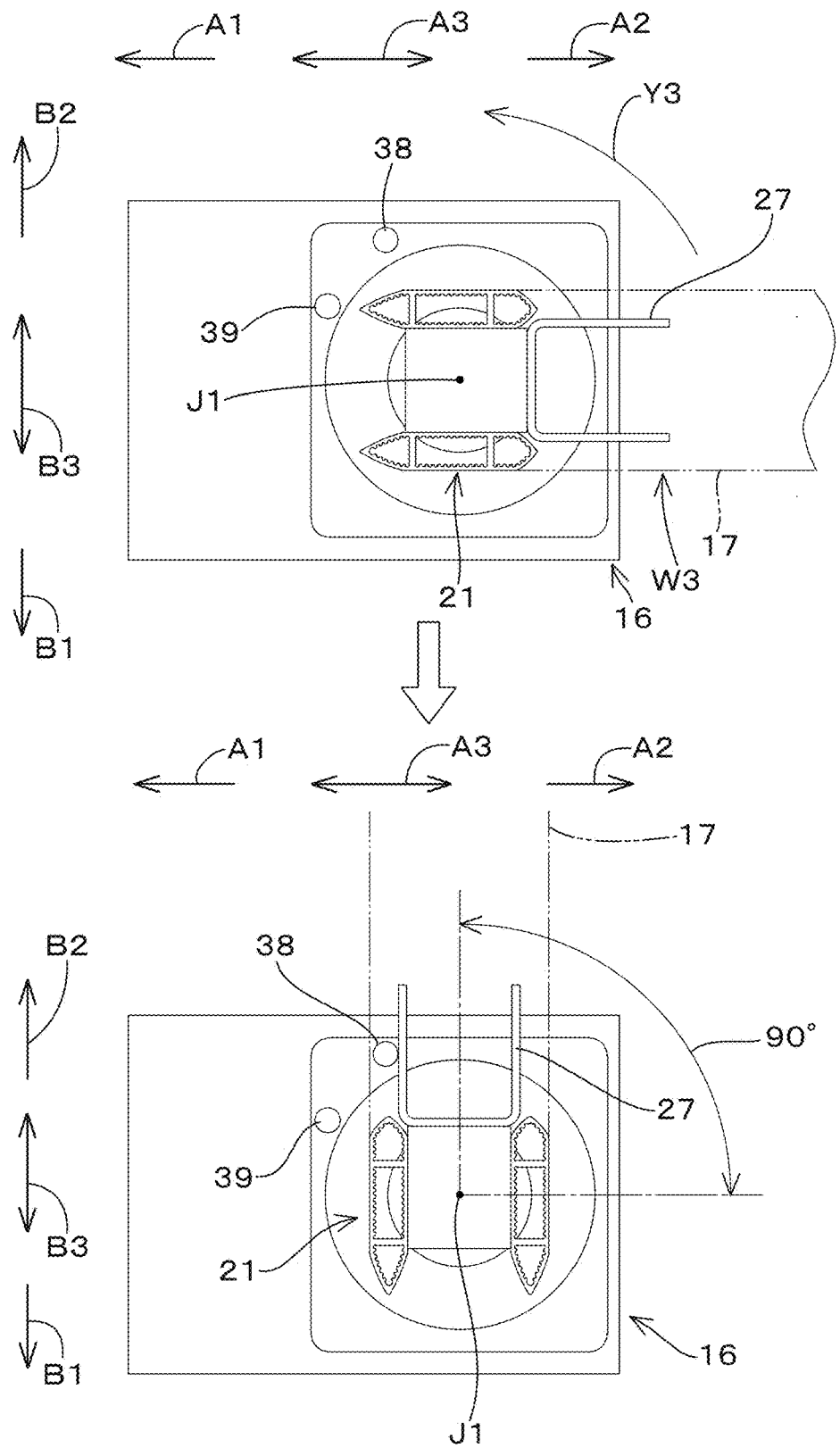
FIG. 12 is a plan view showing how rotation is restricted in the work posture.
Figure 13:
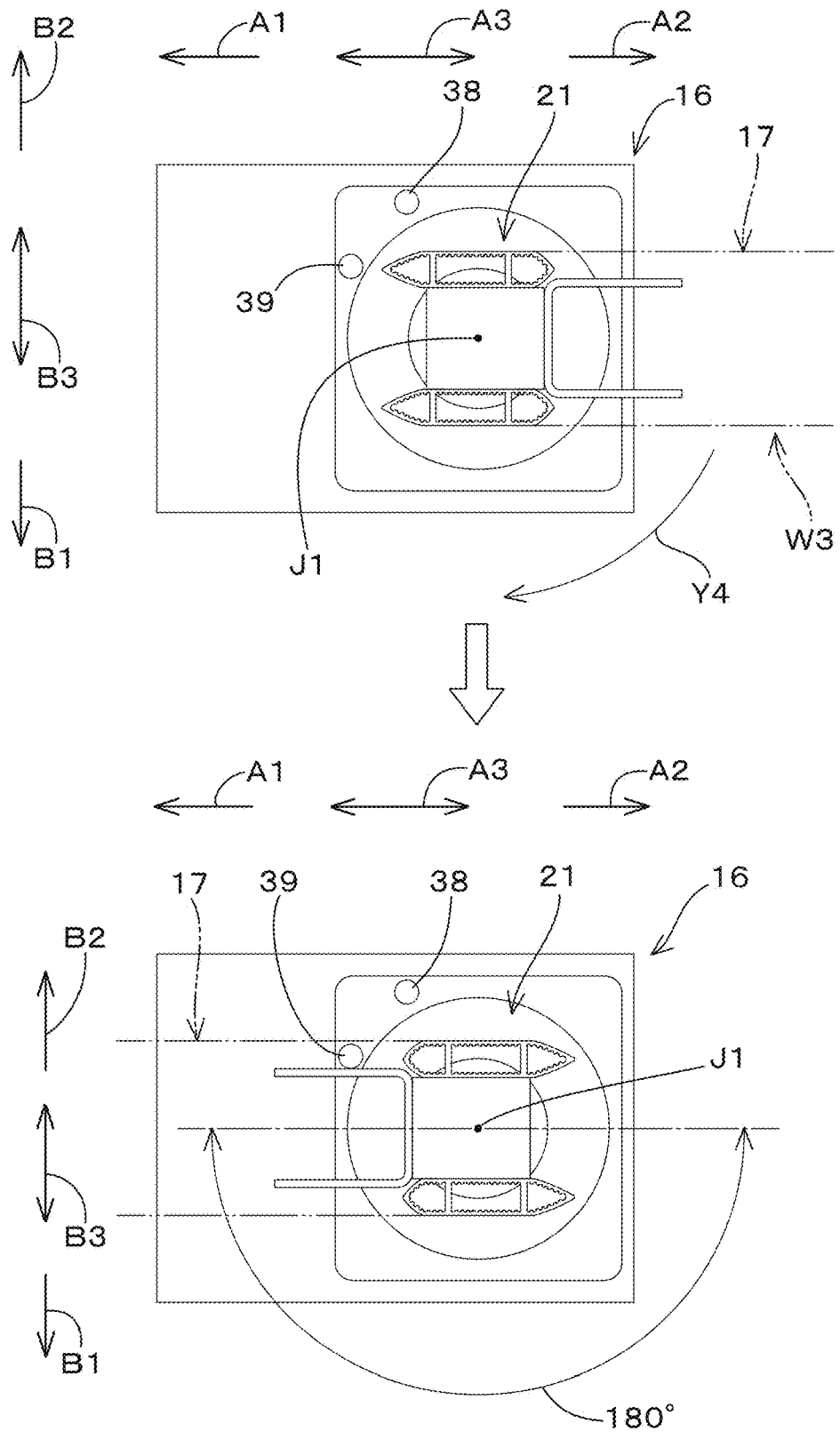
FIG. 13 is a plan view showing positioning in a ready-for-storage posture.

As illustrated in FIGS. 12 and 13, a rotation restriction member 38 and a positioning member 39 are provided at an upper surface of the mount 19. The rotation restriction member 38 and the positioning member 39 in the present preferred embodiment each include a single pin. Note that the rotation restriction member 38 and the positioning member 39 are not limited to pins. The rotation restriction member 38 restricts the rotation of the rotating frame 21 while the arm 17 is in the work posture W1. Restricting the rotation of the rotating frame 21 while the arm 17 is in the work posture W1 makes it possible to prevent hydraulic hose(s) and/or harness(es) routed on the arm 17 from being wound around the rotating frame 21 or being damaged. The positioning member 39 restricts the rotation of the rotating frame 21 to position the arm 17 in the ready-for-storage posture W2. Restricting the rotation of the rotating frame 21 with the positioning member 39 makes it possible to cause the rotating frame 21 to quickly and accurately rotate to the position corresponding to the ready-for-storage posture W2 of the arm 17.

In the present preferred embodiment, as illustrated in FIG. 12, the rotation restriction member 38 is disposed rightward of (sideward of) of the rotating frame 21. As illustrated in the upper portion of FIG. 12, when the rotating frame 21, with the arm 17 in the position in which the arm 17 extends rearward from the rotating frame 21 (rear-pointing position W3), rotates by 90 degrees in a first rotation direction (counterclockwise direction) indicated by arrow Y3, the rotating frame 21 (cylinder bracket) abuts the rotation restriction member 38 as illustrated in the lower portion of FIG. 12. This restricts the rotation of the rotating frame 21.

In the present preferred embodiment, as illustrated in FIG. 13, the positioning member 39 is disposed diagonally forward and rightward of the rotating frame 21. As illustrated in the upper portion of FIG. 13, when the rotating frame 21, with the arm 17 in the rear-pointing position W3, rotates by 180 degrees in a second rotation direction (clockwise direction) indicated by arrow Y4, the rotating frame 21 abuts the positioning member 39.

As has been discussed, in the present preferred embodiment, the range of clockwise rotation of the rotating frame 21 from the position in which the rotating frame 21 abuts the rotation restriction member 38 to the position in which the rotating frame 21 abuts the positioning member 39 is set to substantially 270 degrees. Note that the range of rotation of the rotating frame 21 is not limited to 270 degrees.

Note that the rotation restriction member 38 may be disposed leftward of the rotating frame 21 so as to restrict the rotation of the rotating frame 21 in the second rotation direction Y4 when the arm 17 is in the work posture W1. In such a case, the positioning member 39 is disposed diagonally forward and leftward of the rotating frame 21, and the rotation of the rotating frame 21 in the first rotation direction Y3 causes the arm 17 to be positioned in the ready-for-storage posture W2. That is, rotating the rotary motor M2 in the forward direction or the reverse direction causes the rotating frame 21 to rotate in the first rotation direction Y3 about the rotation axis J1 or in the second rotation direction Y4 opposite to the first rotation direction Y3, the rotation restriction member 38 restricts the rotation of the rotating frame 21 in one of the first and second rotation directions Y3 and Y4, and the positioning member 39 restricts the rotation of the rotating frame 21 in the other of the first and second rotation directions Y3 and Y4.

As illustrated in FIG. 1, in the present preferred embodiment, the imaging device 5A is attached to the rotating frame 21. Specifically, the imaging device 5A is attached to an upper portion of the arm bracket 26 via a supporting pillar 40. This does not imply any limitation, and the imaging device 5A may be attached to the traveling body 3 and/or the like. A plurality of the imaging devices 5A may be provided at a plurality of locations. That is, the agricultural robot 1 may include a plurality of the imaging devices 5A. The imaging device 5A is capable of capturing an image of a surrounding area of the traveling body 3, and acquires information about the surrounding area of the traveling body 3 by capturing an image.

The imaging device 5A is, for example, a camera with the function of measuring distance such as a stereoscopic camera or a laser camera. A stereoscopic camera is a camera capable of measuring the distance between the camera (lens) and a subject (for example, a crop 2, an object near the agricultural robot 1 such as a truck 48 (described later), a border of a travel area, and/or the like) by generating parallax data of captured images. The laser camera is a camera system which measures the distance between the camera and a subject by capturing an image with a CCD camera using long-range laser as illuminating light.

A plurality of the imaging devices 5A, i.e., a plurality of cameras, may be provided to capture images of a surrounding area (front, rear, left side, and right side) of the traveling body 3. Alternatively, a single imaging device 5A including a 360-degree camera capable of capturing images at 360 degrees around the traveling body 3 may be provided.

Note that a camera capable of sensing the quality of the crop 2 (for example, multispectral camera, far infrared camera, near infrared spectroscopic camera, and/or the like) may be provided on the robot hand 18, the traveling body 3, and/or the like. This makes it possible to select a crop 2 that should be harvested and harvest the selected crop 2 while sensing the quality of the crop 2.

Figure 14A:
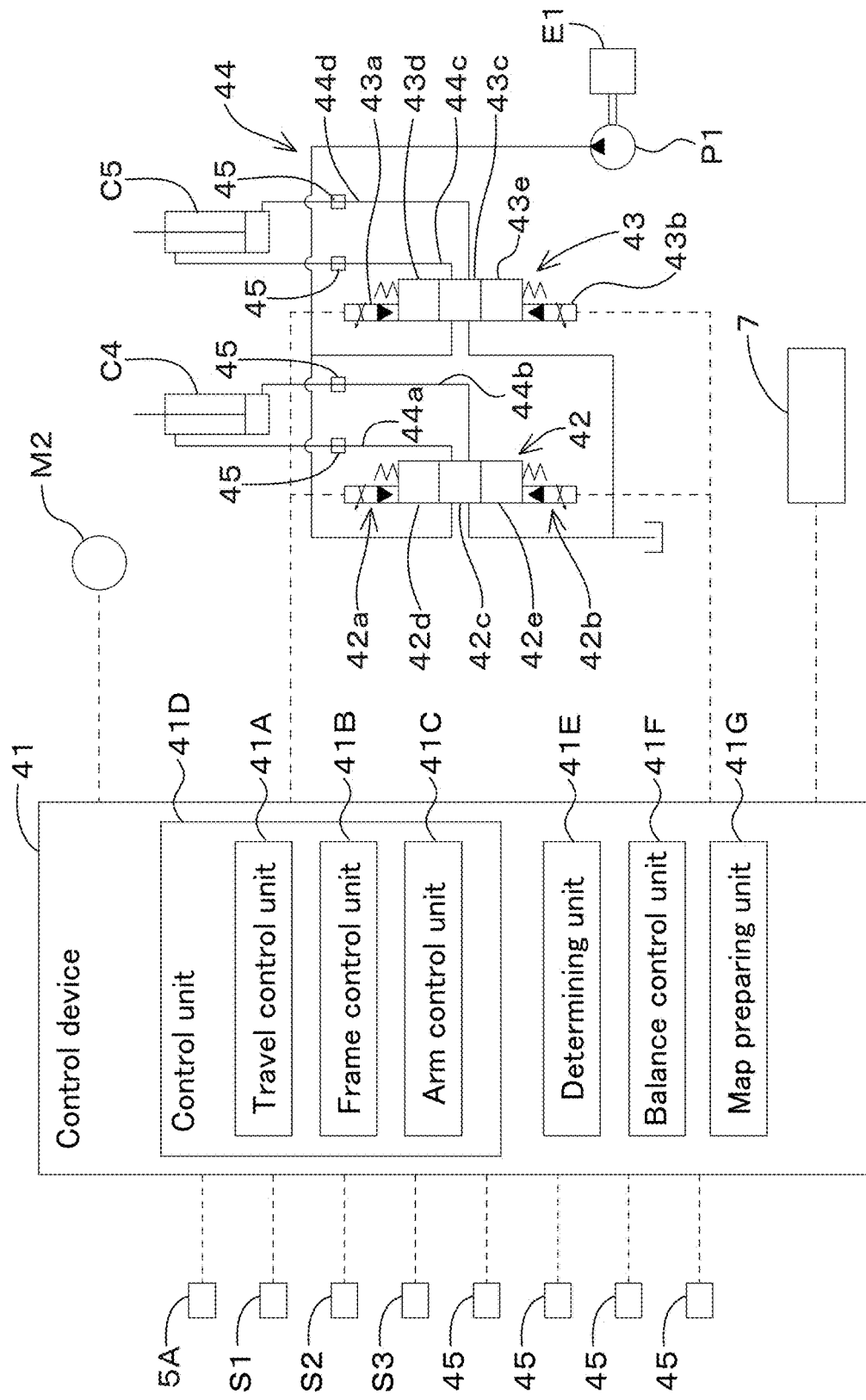
FIG. 14A is a block diagram showing a system configuration.

As illustrated in FIG. 14A, the agricultural robot 1 includes a control device 41. The control device 41 may include, for example, a microcomputer including a central processing unit (CPU), an electrically erasable programmable read-only memory (EEPROM), and/or the like.

The control device 41 has the imaging device 5A connected thereto. The control device 41 is capable of acquiring information acquired (detected) by the imaging device 5A (such information is detection information). With the detection information from the imaging device 5A, it is possible to cause the control device 41 to identify (recognize) crop(s) 2 that should be harvested, the distance to the crop(s) 2, borders of a passage between areas where the crop(s) 2 is grown, the appearance of the surrounding area of the agricultural robot 1, and/or the like.

The control device 41 has the traveling device 7 connected thereto. The control device 41 includes a travel control unit 41A. The travel control unit 41A controls the steering cylinders C1, the first lift cylinders C2, the second lift cylinders C3, and the travel motors M1 based on the information (detection information) acquired by the imaging device 5A. That is, the travel control unit 41A controls the traveling device 7. The travel control unit 41A performs speed control, steering control, and/or the like of the traveling device 7, and thereby the traveling body 3 travels in an autonomous manner. Furthermore, the travel control unit 41A controls raising/lowering, tilting, and/or the like of the machine body 6.

Note that the traveling body 3 may be caused to travel in an autonomous manner using Light Detection And Ranging (LiDAR). The LiDAR is a remote sensing technique using light, in which infrared rays or the like in the form of pulses are emitted several millions of times per second and the period from the emission to the return of the pulse is measured to thereby construct a three-dimensional map of the surrounding area of the traveling body 3.

The control device 41 has the first stroke sensor S1 connected thereto. The control device 41 is capable of acquiring detection information from the first stroke sensor S1, and, with the detection information from the first stroke sensor S1, it is possible to cause the control device 41 to identify the amount of swinging movement of the first arm unit 31. Furthermore, the control device 41 has the second stroke sensor S2 connected thereto. The control device 41 is capable of acquiring detection information from the second stroke sensor S2, and, with the detection information from the second stroke sensor S2, it is possible to cause the control device 41 to identify the amount of swinging movement of the second arm unit 32 relative to the first arm unit 31.

Note that the amounts of swinging movement of the arm unit 31 and the second arm unit 32 may be directly detected by potentiometer(s), and potentiometer value(s) from the potentiometer(s) may be transmitted to the control device 41.

As illustrated in FIG. 14A, the control device 41 has connected thereto the rotary motor M2, a first cylinder control valve 42, and a second cylinder control valve 43. The control device 41 includes a frame control unit 41B to control the rotary motor M2 to control the rotation of the rotating frame 21. The frame control unit 41B controls the rotation of the rotating frame 21 based on (using as rotation origin) the position of the rotating frame 21 restricted by the rotation restriction member 38. That is, the frame control unit 41B calculates the rotational position of the rotating frame 21 relative to the rotation origin to control the rotation of the rotating frame 21. Therefore, before the start of harvesting work (initial stage), the rotating frame 21 is rotated to the rotation restriction member 38 to cause the control device 41 to identify the initial position of the rotating frame 21.

The first cylinder control valve 42 and the second cylinder control valve 43 each include, for example, a pilot-operated solenoid valve. The first cylinder control valve 42 controls the first arm cylinder C4, and the second cylinder control valve 43 controls the second arm cylinder C5. The control device 41 includes an arm control unit 41C to control the first cylinder control valve 42 and the second cylinder control valve 43 to control the swinging movement of the first arm unit 31 and the second arm unit 32.

The arm control unit 41C energizes or de-energizes a first solenoid 42a and a second solenoid 42b of the first cylinder control valve 42 to switch the first cylinder control valve 42 from a neutral position 42c to a first position 42d or a second position 42e. Upon switching to the first position 42d, the first arm cylinder C4 extends to thereby cause the first arm unit 31 (arm 17) to swing upward. Upon switching to the second position 42e, the first arm cylinder C4 retracts to thereby cause the first arm unit 31 (arm 17) to swing downward. The arm control unit 41C also energizes or de-energizes a first solenoid 43a and a second solenoid 43b of the second cylinder control valve 43 to switch the second cylinder control valve 43 from a neutral position 43c to a first position 43d or a second position 43e. Upon switching to the first position 43d, the second arm cylinder C5 extends to thereby cause the second arm unit 32 to swing upward. Upon switching to the second position 43e, the second arm cylinder C5 retracts to thereby cause the second arm unit 32 to swing downward.

As has been discussed, the control device 41 is capable of controlling, with use of the frame control unit 41B, the rotation of the rotating frame 21 caused by the rotary motor M2, and is capable of controlling, with use of the arm control unit 41C, the swinging movement of the first arm unit 31 caused by the extension/retraction of the first arm cylinder C4 and the swinging movement of the second arm unit 32 caused by the second arm cylinder C5. With this, the control device 41 is capable of moving the robot hand 18 to any (desired) position. Specifically, it is possible to move the robot hand 18 to a target position by the movement of the robot hand 18 along a circumference centered on the rotation axis J1 caused by the rotation of the rotating frame 21, raising/lowering of the robot hand 18 caused by upward/downward swinging movement of the first arm unit 31, and the movement of the robot hand 18 toward/away from the traveling body 3 caused by the swinging movement of the second arm unit 32. The control device 41 also actuates the manipulator 4 to move the robot hand 18 to a crop 2 to be harvested, based on detection information from the imaging device 5A.

As illustrated in FIG. 14A, the travel control unit 41A, the frame control unit 41B, and the arm control unit 41C are part of a control unit 41D which, based on information acquired by the imaging device 5A, performs travel control in which the traveling body 3 is caused to travel in an autonomous manner and action control in which the manipulator 4 is caused to perform a harvesting action.

As illustrated in FIG. 14A, the control device 41 has the third stroke sensor S3 connected thereto. The control device 41 is capable of acquiring detection information from the third stroke sensor S3, and it is possible to cause the control device 41 to identify the degree of extension of the sub-arm 30 using the detection information from the third stroke sensor S3.

It is noted that the position of the robot hand 18 varies between when the sub-arm 30 is not extended and when the sub-arm 30 is extended, even when the rotational position of the rotating frame 21 is the same, the amount of swinging movement of the first arm unit 31 is the same, and the amount of swinging movement of the second arm unit 32 is the same. In view of this, the control device 41 controls the position of the robot hand 18 in consideration of the degree of extension of the sub-arm 30.

As illustrated in FIG. 14A, a hydraulic control circuit 44 including the first arm cylinder C4 and the second arm cylinder C5 is provided with pressure sensors 45. The pressure sensors 45 are disposed in a first connecting fluid passage 44a which connects the first cylinder control valve 42 and a rod-side (the side where the piston rod projects) fluid chamber of the first arm cylinder C4, a second connecting fluid passage 44b which connects the first cylinder control valve 42 and a bottom-side (head-side) fluid chamber of the first arm cylinder C4, a third connecting fluid passage 44c which connects the second cylinder control valve 43 and a rod-side fluid chamber of the second arm cylinder C5, and a fourth connecting fluid passage 44d which connects the second cylinder control valve 43 and a bottom-side fluid chamber of the second arm cylinder C5. It is possible to detect loads acting on the arm 17 (the first arm cylinder C4 and the second arm cylinder C5) using detection information from the pressure sensors 45.

As illustrated in FIG. 14A, the pressure sensors 45 are connected to the control device 41. The control device 41 is capable of acquiring detection information from each pressure sensor 45. The control device 41 is capable of performing force control in which the output of the hydraulic pump P1 is controlled according to the loads (weight of crop 2) acting on the arm 17.

Note that it is not necessary to provide pressure sensors 45 both in the first connecting fluid passage 44a and the second connecting fluid passage 44b, and it is only necessary to provide a pressure sensor 45 in either the first connecting fluid passage 44a or the second connecting fluid passage 44b. Also note that it is not necessary to provide pressure sensors 45 both in the third connecting fluid passage 44c and the fourth connecting fluid passage 44d, and a pressure sensor 45 may be provided in either the third connecting fluid passage 44c or the fourth connecting fluid passage 44d.

As illustrated in FIG. 14A, the control device 41 includes a determining unit 41E. The determining unit 41E determines, based on information acquired by the imaging device 5A, whether a crop 2 is in a proper stage for harvest from a characteristic specific to the type of the crop 2.

Figure 14B:
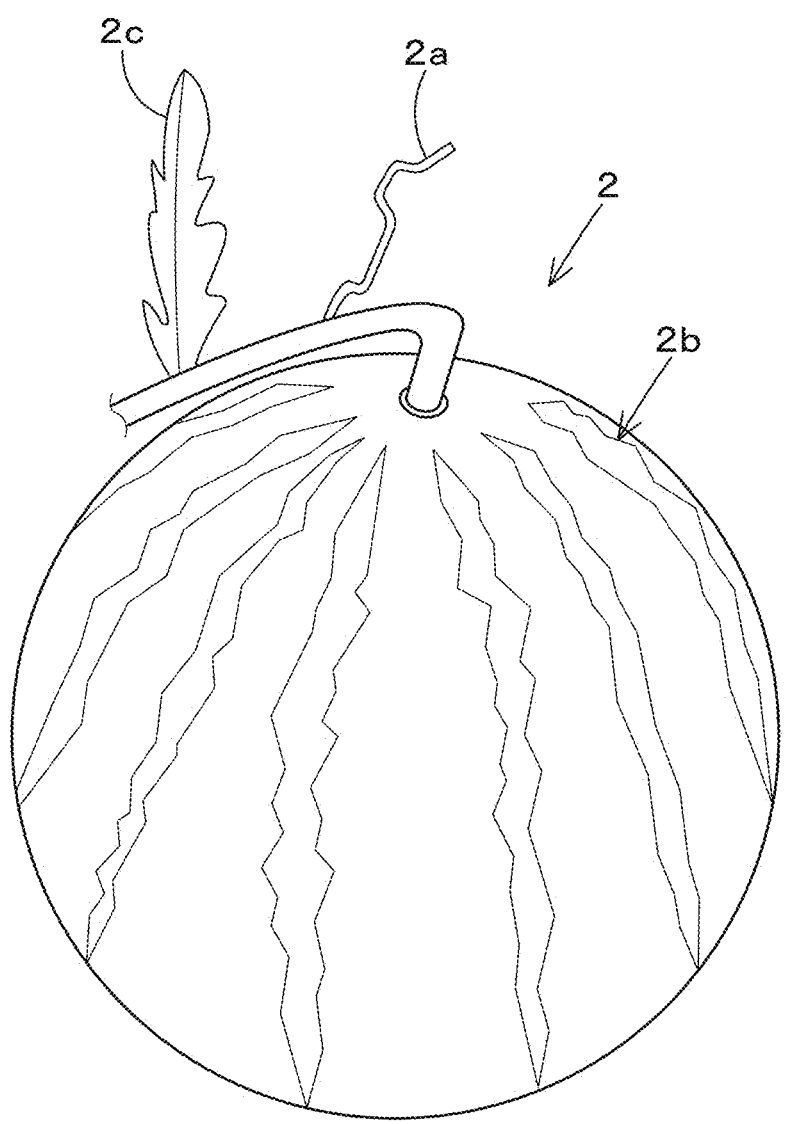
FIG. 14B is a perspective view illustrating a watermelon as a crop.

In the case where the crop 2 is a watermelon, as illustrated in FIG. 14B, the determining unit 41E determines whether the crop 2 is in a proper stage for harvest from the color of a tendril 2a, stripes 2b on the surface, and/or the condition of a leaf 2c. Specifically, the crop 2 is in a proper stage for harvest when the tendril 2a including the base is in dark brown color (withered). The crop 2 is in a proper stage for harvest also when the stripes 2b are sharp (in a high contrast black color). The crop 2 is in a proper stage for harvest also when the leaf 2c is in a yellow or dark brown color and withered.

Figure 14C:
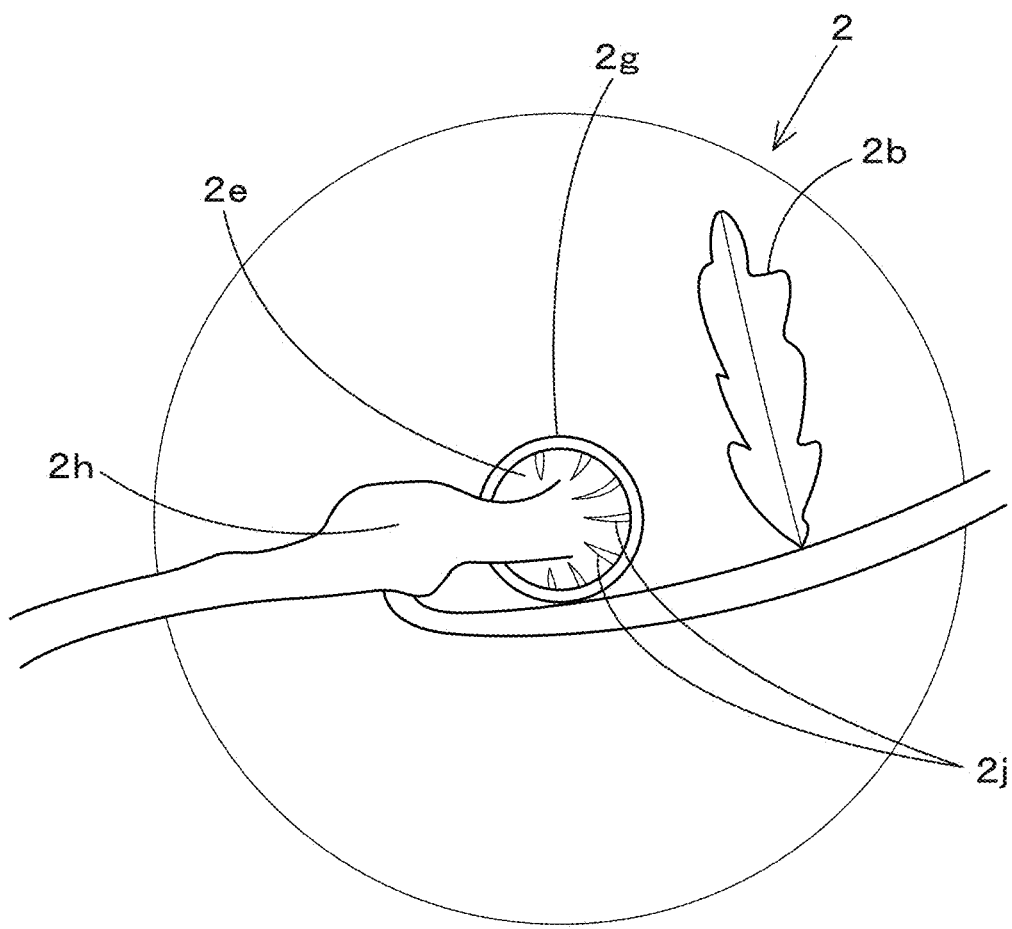
FIG. 14C is a perspective view illustrating a melon as a crop.

In the case where the crop 2 is a melon, as illustrated in FIG. 14C, the determining unit 41E determines whether the crop 2 is in a proper stage for harvest from the condition of a leaf 2d and/or the condition of an area of a stalk end 2e. Specifically, the crop 2 is in a proper stage for harvest when the condition of the leaf 2d is such that the leaf 2d is in a yellow color or dark brown color and withered. The crop 2 is in a proper stage for harvest also when there is a brown ring (abscission layer) 2g around the base of the stalk end 2e and/or there is a portion 2j extending from the net toward a stem 2h in the area of the stalk end 2e.

Figure 14D:
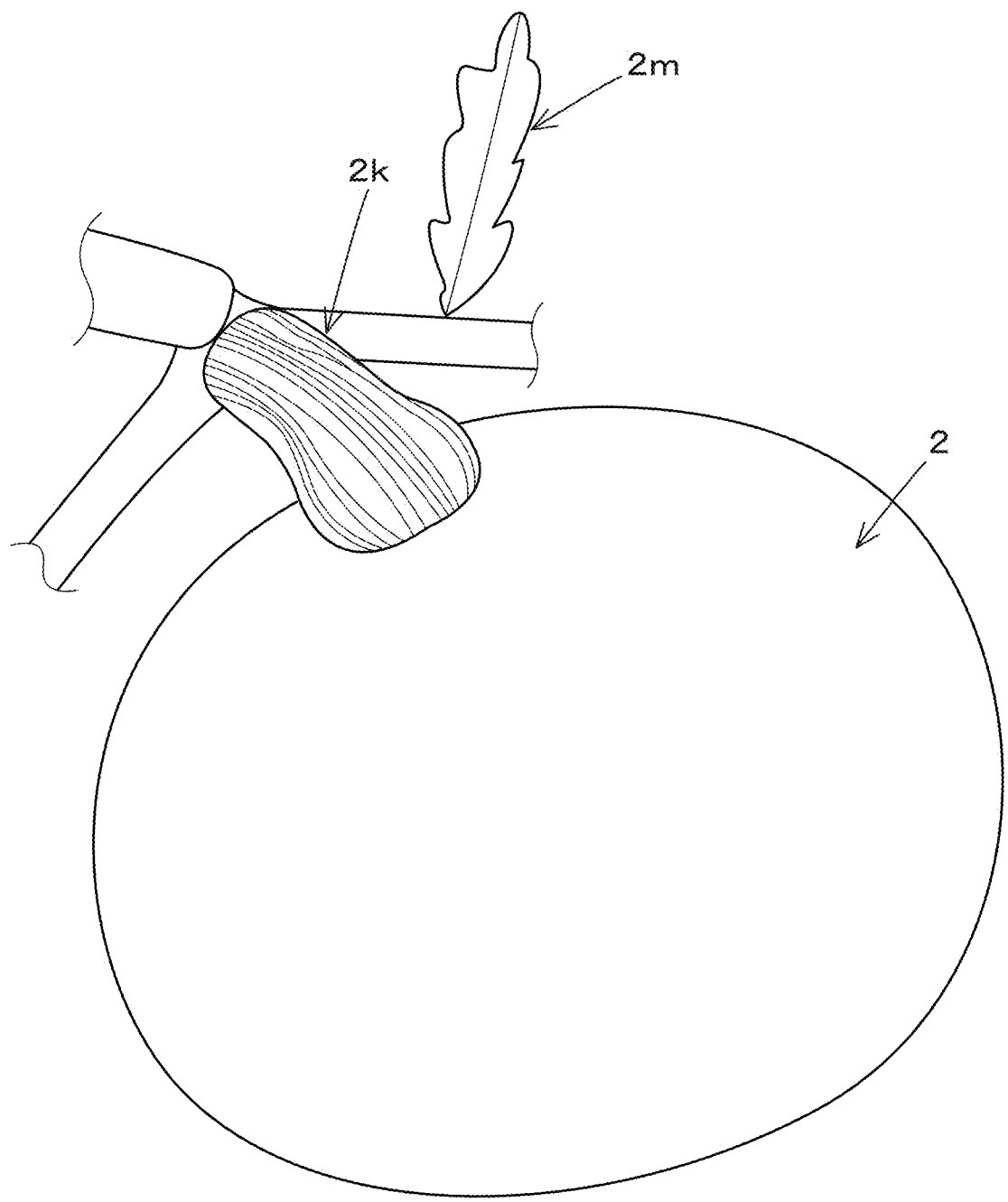
FIG. 14D is a perspective view illustrating a pumpkin as a crop.

In the case where the crop 2 is a pumpkin, as illustrated in FIG. 14D, the determining unit 41E determines whether the crop 2 is in a proper stage for harvest form the condition of a peduncle 2k and/or the condition of a leaf 2m. Specifically, the crop 2 is in a proper stage for harvest when the peduncle 2k is in a brown color (commonly called "suberized"). The crop 2 is in a proper stage for harvest also when the condition of the leaf 2m is such that the leaf 2m is in a yellow color or dark brown color and withered.

As illustrated in FIG. 14A, the control device 41 includes a balance control unit 41F. The balance control unit 41F controls the positions of the first wheel 8La to the fourth wheel 8Rb so that the machine body 6 is balanced with the arm 17 and the robot hand 18 (manipulator 4). Specifically, the balance control unit 41F controls the posture of the machine body 6 by causing one or more of the first to fourth wheels 8La to 8Rb to be raised or lowered to achieve a balance with the arm 17 and the robot hand 18. More specifically, as illustrated in FIG. 14E, when a crop 2 is to be harvested with the arm 17 rotated in one machine body width direction B3 (for example, rotated left), the second wheel 8Ra and the fourth wheel 8Rb, which are located at the right of the traveling body 3, are raised. It follows that the machine body 6 is tilted such that the right side is lowered. This makes it possible to achieve a balance between the traveling body 3 and the manipulator 4. When the crop 2 is to be harvested with the arm 17 rotated right, the first wheel 8La and the third wheel 8Ra, which are located at the left of the traveling body 3, are raised.

When harvesting work is done with the arm 17 extended diagonally leftward and rearward, the second wheel 8Ra is raised higher than the fourth wheel 8Rb and the third wheel 8Lb is lowered. With this, the right side of the machine body 6 is lowered and the machine body 6 is tilted rearward, making it possible to achieve a good balance between the traveling body 3 and the manipulator 4. When the harvesting work is done with the arm 17 extended diagonally rightward and rearward, the first wheel 8La is raised higher than the third wheel 8Lb and the fourth wheel 8Rb is lowered.

A load from the manipulator 4 on the traveling body 3 varies depending on the degree of extension of the arm 17 and whether the robot hand 18 holds a crop 2 or not. It is possible to cause the control device 41 to identify loads on the arm 17, the robot hand 18, and/or the like using detection information from the pressure sensors 45, and therefore is also possible to control the amounts of raising/lowering of the first wheel 8La to the fourth wheel 8Rb according to the loads from the manipulator 4 on the traveling body 3.

In addition to the control by the balance control unit 41F by which the machine body 6 is balanced with the arm 17 and the robot hand 18, control to change the orientation of (to steer) the first wheel 8La to the fourth wheel 8Rb may be performed.

The balance control unit 41F may be configured to adjust the treads of the wheels so that the machine body 6 is balanced with the arm 17 and the robot hand 18.

As illustrated in FIG. 14A, the control device 41 includes a map preparing unit 41G. The map preparing unit 41G automatically generates a map 60 (see FIG. 14E) of the positions and/or growth states of individual crops 2 based on information acquired (information captured) by the imaging device 5A as the agricultural robot 1 travels in an autonomous manner on a passage 47 (see FIG. 15) before harvesting the crop 2. Specifically, as illustrated in FIG. 14F, the map preparing unit 41G records, on the map 60, the positions of crops 2 (No. 1, No. 2, No. 3 . . . , and No. n) in an agricultural field 59, based on information captured by the imaging device 5A. The growth states of the crops 2 are also recorded on the map 60. The growth state can be, for example, the size of a crop 2. The size is recorded, for example, on a scale of S1 to S5. S1 indicates the smallest size. S5 indicates the largest size. Note that whether each crop 2 is in a proper stage for harvest or not may also be recorded on the map 60.

By generating the map 60 by previously recognizing the positions, growth states, and/or the like of the crops 2, it is possible to utilize the map 60 in subsequent work, and possible to do next work in a pinpoint manner with maximum efficiency. Examples of the subsequent work include fertilizer application work, water spraying work, weeding work, and harvesting work.

Figure 15:
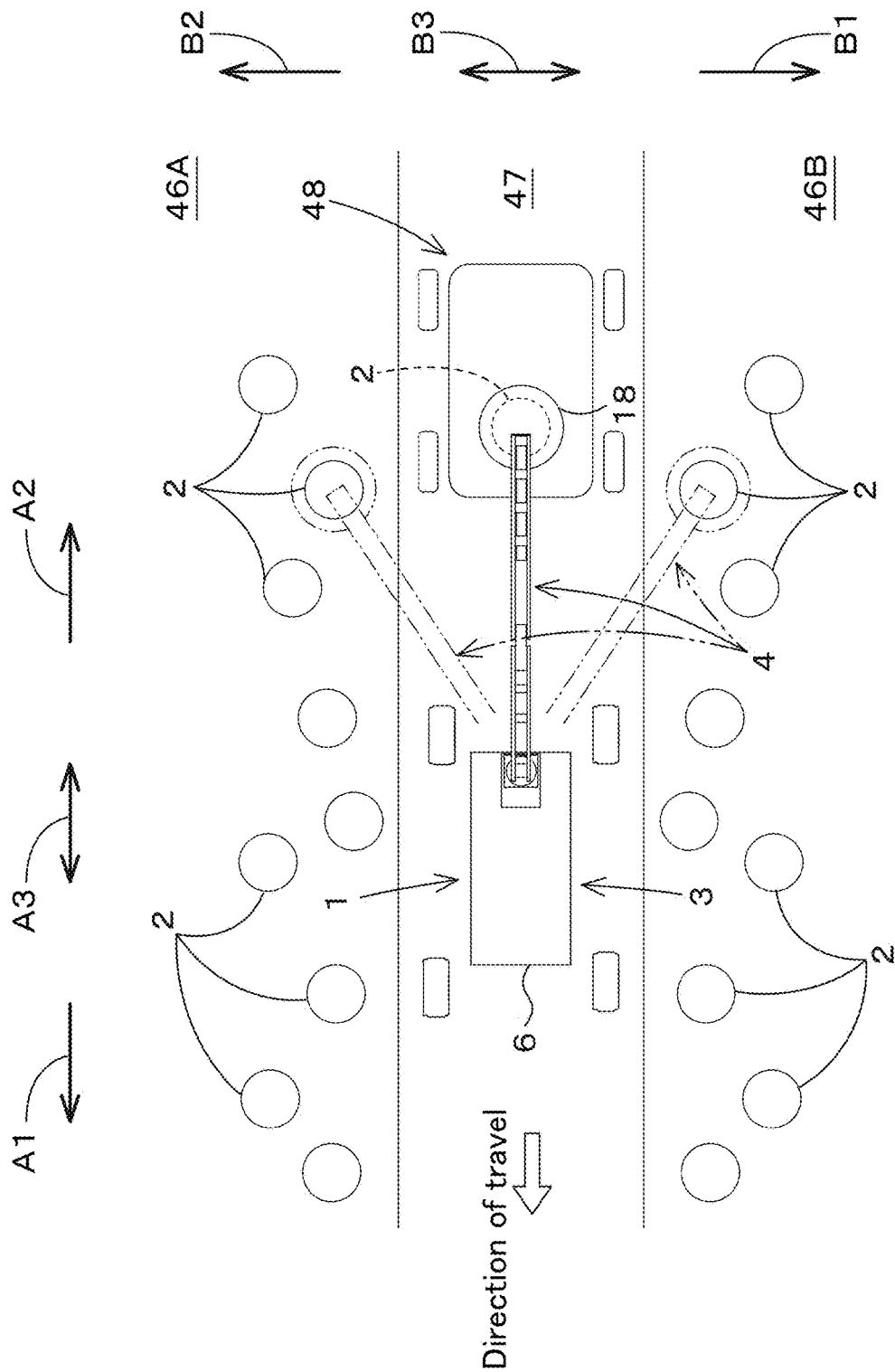
FIG. 15 is a plan view showing how the work of harvesting crops is done.

The following description discuses a case in which crops 2 are harvested, with reference to FIG. 15. FIG. 15 illustrates an agricultural field in which watermelons as the crops 2 are grown.

As illustrated in FIG. 15, there is a passage 47 in an agricultural field between a growing area 46A where crops 2 are grown and a growing area 46B where crops 2 are grown adjacent to the growing area 46A. The crops 2 are grown in the vicinity of the passage 47 during the cultivation. The traveling body 3 travels on the passage 47. For example, a self-propelled truck 48 which travels after the traveling body 3 is disposed rearward of the traveling body 3. In the case where the crops 2 are grown in the vicinity of the passage 47, the arm 17 is used with the sub-arm 30 not extended.

The crops 2 are harvested with the agricultural robot 1 of the present preferred embodiment in the following manner: the traveling body 3 travels forward, and the position of the robot hand 18 is controlled with the manipulator 4 in the work posture W1 (for example, with the arm 17 extended diagonally rearward). The agricultural robot 1 harvests crop (s) 2 which have been determined by the determining unit 41E as being in a proper stage for harvest from characteristic (s) specific to the type of the crops 2 based on information acquired by the imaging device 5A. The harvested crops 2 are put on the truck 48 by controlling the position of the robot hand 18. Note that stems extending from the crops 2 are cut with, for example, a cutter (not illustrated) during the harvesting work (for example, immediately before each crop 2 is held by the robot hand 18 or when the crop 2 is held). The cutter is mounted on the robot hand 18 or a distal portion of the arm 17.

In the case where the crops 2 are distant from the passage 47, the arm 17 is used with the sub-arm 30 extended and stretched. By causing the arm 17 to expand or contract by causing the sub-arm 30 to extend or retract, it is possible to achieve arm dimensions (arm lengths) suitable for the position of each crop 2 and/or the manner in which work is done.

Note that, after the crops 2 are harvested, the following can be performed: a rake is attached to the distal portion of the arm 17 instead of the robot hand 18, and the work of gathering stems and leaves after harvesting. In such a case, stems and leaves distant from the passage 47 can be gathered by using the arm 17 with the sub-arm 30 extended and stretched.

Note that, although the above description discusses cases where the work is done during forward travel, the work can also be done while rearward travel.

The agricultural robot 1 of the present preferred embodiment can be modified variously in terms of design. For example, the arm 17 may not have the sub-arm 30. That is, the arm 17 can include the first arm unit 31 and the second arm unit 32. The truck 48 to house the harvested crops 2 does not need to be a self-propelled tracking truck, and may be a trailed truck to be trailed by the traveling body 3. That is, the truck 48 need only be a truck 48 which moves after the traveling body 3 as the traveling body 3 travels. The machine body 6 may be equipped with a container for housing the harvested crops 2.

The following description discusses a configuration of the robot hand 18 in detail.

In the following description, an outward direction is a direction (direction indicated by arrow L2 in FIG. 16) orthogonal toward and away from a centerline L1 extending along a top-bottom direction passing through the center of the robot hand 18 (see FIG. 16). An inward direction is a direction (direction indicated by arrow L3 in FIG. 16) opposite to the outward direction and toward the centerline L1.

Figure 16:
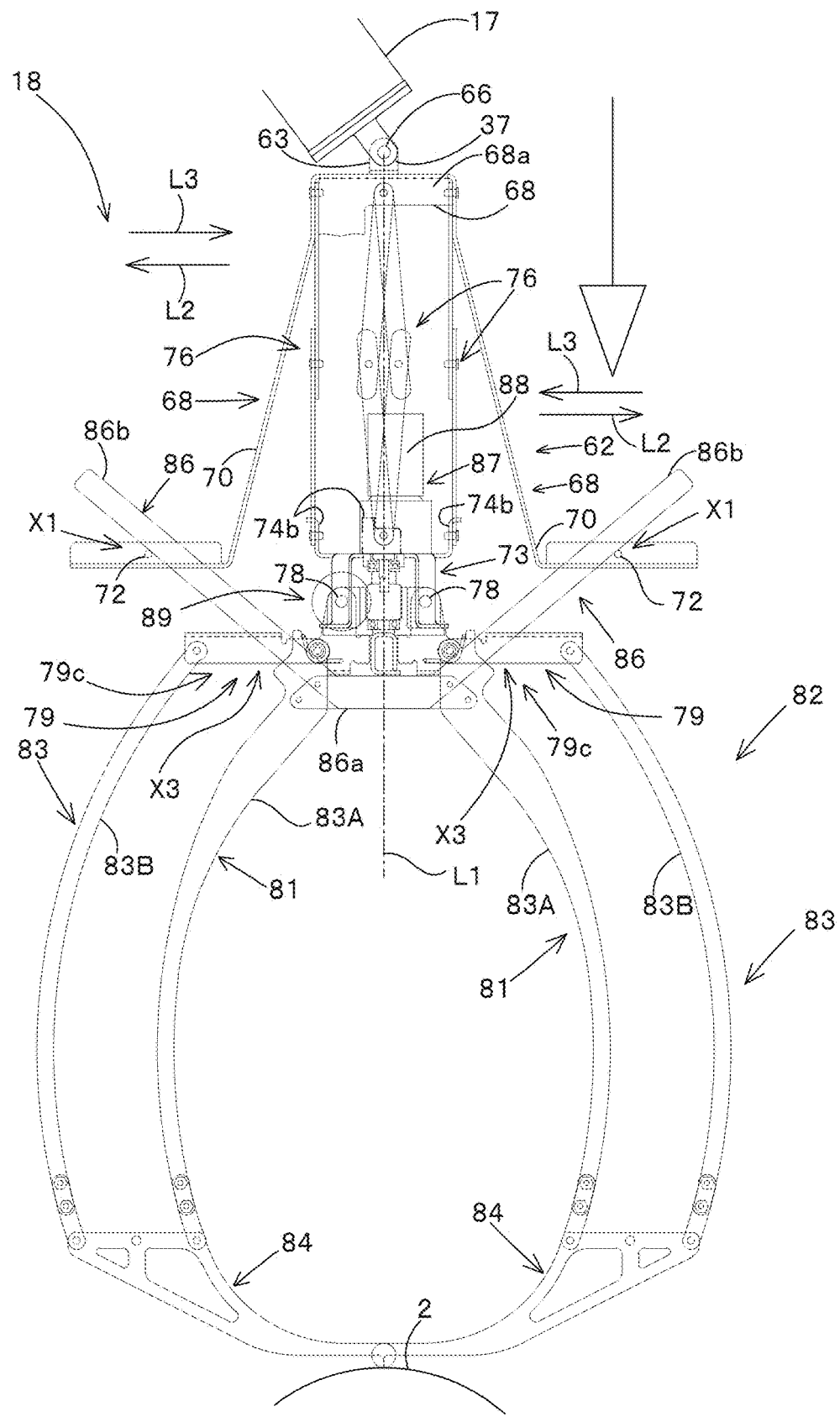
FIG. 16 is a side view of a robot hand.

As illustrated in FIG. 16, the robot hand 18 includes an ascent/descent body 62 capable of ascending and descending. The ascent/descent body 62 is comprised of plate member(s), and includes a connecting piece 63 at an upper portion thereof. The connecting piece 63 is pivoted and connected to the hanger plate 37 at the distal portion of the arm 17 via a pivot shaft 66 such that the connecting piece 63 is rotatable about a horizontal axis (axis in a horizontal direction). Thus, the ascent/descent body 62 is connected to the arm 17, and can be caused to ascend or descend by causing the arm 17 to swing up or down.

Figure 17:
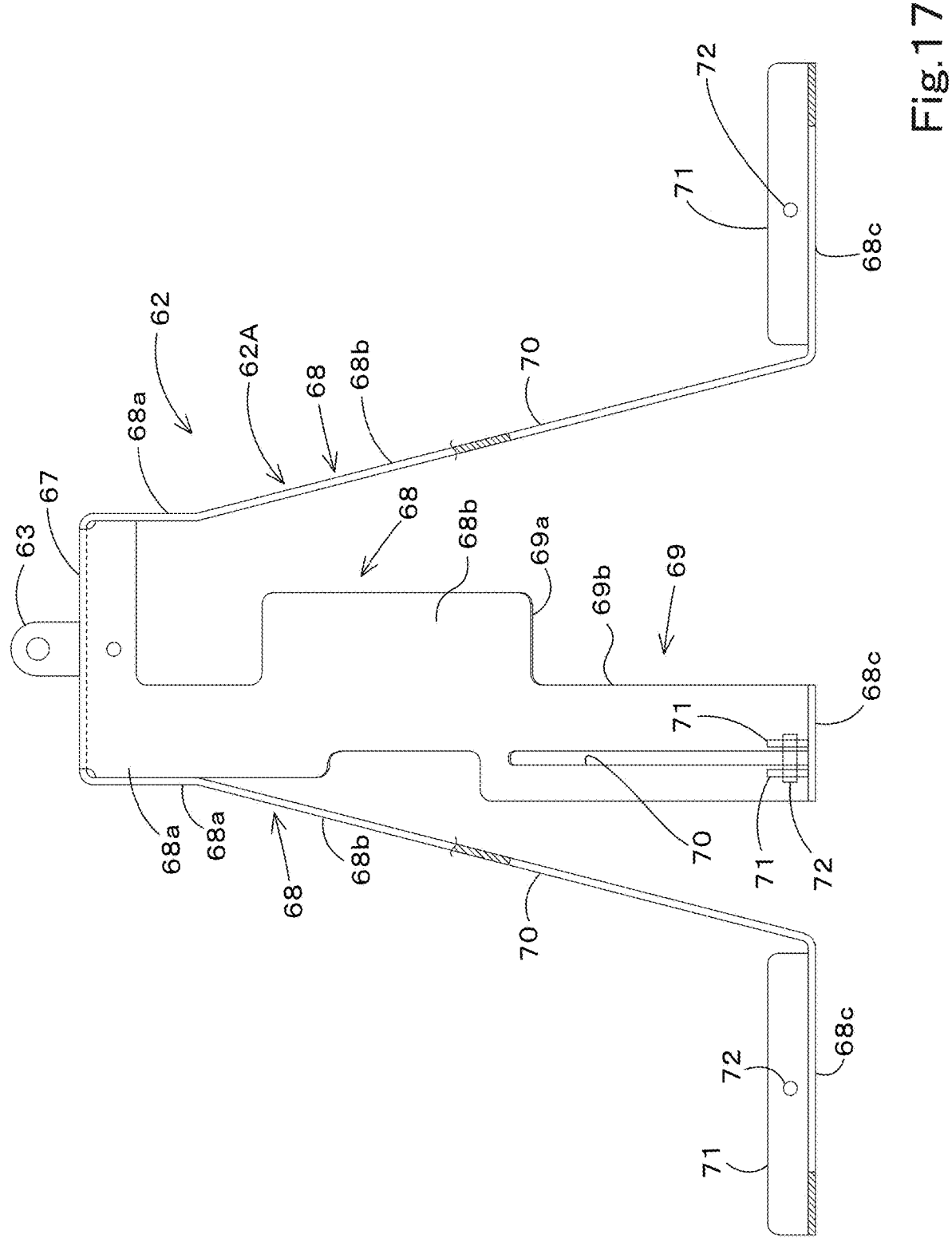
FIG. 17 is a side view of an ascent/descent body.

As illustrated in FIG. 17, a main body 62A of the ascent/descent body 62 includes an upper wall 67 and a plurality of extension walls 68 extending downward from the upper wall 67. The connecting piece 63 is fixed to a central portion of a top surface of the upper wall 67. The extension walls 68 extend from four edges of the upper wall 67. Thus, in the present preferred embodiment, there are four extension walls 68. Each extension wall 68 includes an upper first section 68a, an intermediate second section 68b, and a lower third section 68c.

The first section 68a extends downward in a substantially vertical direction from the upper wall 67. An upper portion of the first section 68a is wider than a lower portion of the first section 68a. The lower portion of the first section 68a is located at a position offset from the widthwise center of the upper portion. The second section 68b extends downward from the lower portion of the first section 68a. The second section 68b extends in a manner such that the second section 68b is inclined outward in a downward direction. The lower portion of the second section 68b has a cutout 69 in an L shape defined by an upper edge 69a and a side edge 69b. The third section 68c extends in the outward direction from the lower edge of the second section 68b.

As illustrated in FIG. 17, each extension wall 68 has a groove 70 continuing from the lower portion of the second section 68b to the third section 68c. A pair of stays 71 opposite each other with the groove 70 therebetween are fixed on an upper surface of the third section 68c. The pair of stays 71 are provided with an engagement member 72 which bridges one of the stays 71 and the other of the stays 71. In the present preferred embodiment, the engagement member 72 includes a pin. The engagement member 72 is provided so as to pass over the portion of the groove 70 that is located in the third section 68c.

As illustrated in FIG. 16, the robot hand 18 includes a support 73 disposed below the ascent/descent body 62. In other words, the ascent/descent body 62 is disposed above the support 73.

Figure 19:
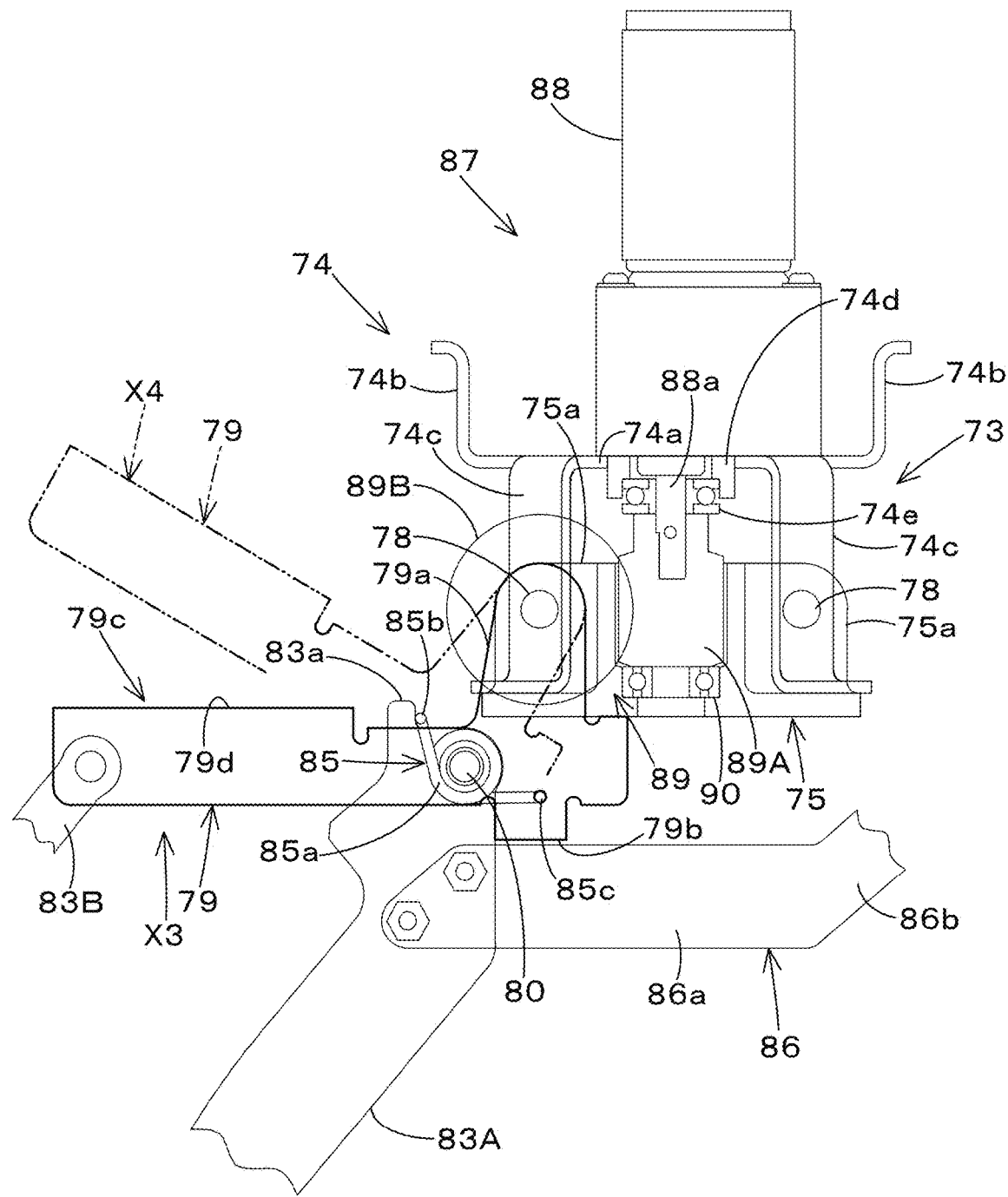
FIG. 19 is a side view of a mechanism to forcibly open and close holding nails.

As illustrated in FIG. 19, the support 73 includes an upper body 74 and a lower body 75.

Figure 18:
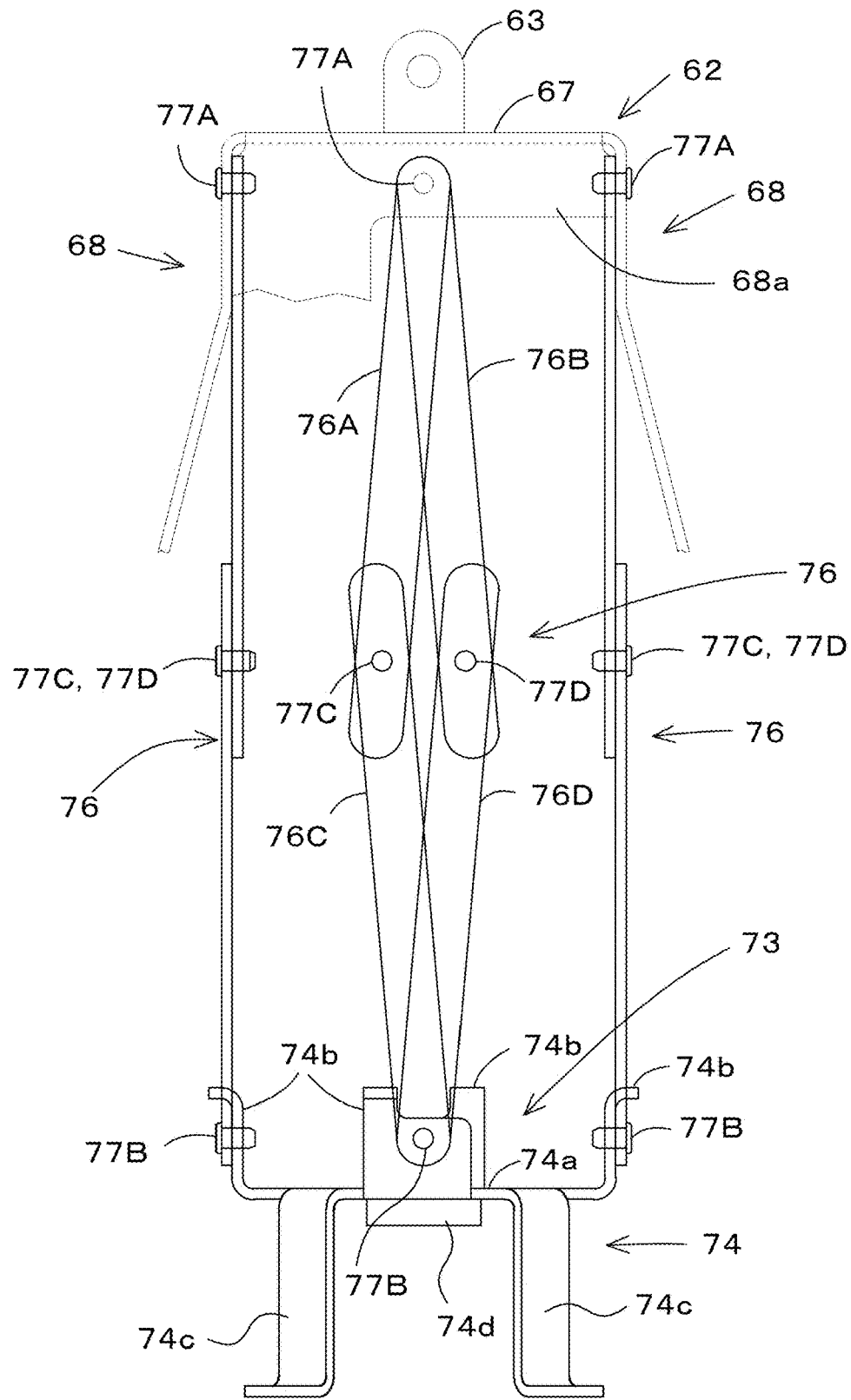
FIG. 18 is a side view of the ascent/descent body, linkage mechanisms, and an upper body.

As illustrated in FIG. 18, the upper body 74 includes a base wall 74a, a plurality of upper connecting pieces 74b extending upward from the base wall 74a, a plurality of lower connecting pieces 74c extending downward from the base wall 74a, and a bearing part 74d provided in a middle portion of the base wall 74a. In the present preferred embodiment, there are four upper connecting pieces 74b, which are located so as to correspond to the respective extension walls 68. Each lower connecting piece 74c is provided between adjacent upper connecting pieces 74b. Thus, in the present preferred embodiment, there are four lower connecting pieces 74c. As illustrated in FIG. 19, the bearing part 74d is located in the middle of the upper body 74, and accommodates a bearing 74e.

As illustrated in FIG. 19, the lower body 75 is fixed to the plurality of lower connecting pieces 74c.

As illustrated in FIGS. 16 and 18, the ascent/descent body 62 and the support 73 are connected together by a plurality of expandable linkage mechanisms 76. The expandable linkage mechanisms 76 each connect a corresponding first section 68a and a corresponding upper connecting piece 74b. Thus, in the present preferred embodiment, there are four expandable linkage mechanisms 76, for example.

As illustrated in FIG. 18, each expandable linkage mechanism 76 includes a first link 76A, a second link 76B, a third link 76C, and a fourth link 76D. End portions (upper end portions) of the first link 76A and the second link 76B are pivoted on the first section 68a via a pin 77A. End portions of the third link 76C and the fourth link 76D are pivoted on the upper connecting piece 74b via a pin 77B. The opposite end portions of the first link 76A and the third link 76C are pivotably connected together with a pin 77C. The opposite end portions of the second link 76B and the fourth link 76D are pivotably connected together with a pin 77D.

The expandable linkage mechanisms 76 expand by the movement of the pin 77C and the pin 77D toward each other, and contract by the movement of the pin 77C and the pin 77D away from each other. That is, the expandable linkage mechanisms 76 are expandable and contractable along a top-bottom direction. Thus, the ascent/descent body 62 and the support 73 are connected by the expandable linkage mechanisms 76 such that the ascent/descent body 62 and the support 73 are movable relative to each other along the top-bottom direction (capable of moving toward and away from each other).

As illustrated in FIG. 19, the lower body 75 includes a plurality of pivotably supporting portions 75a. Four pivotably supporting portions 75a are provided at regular intervals along a circumference centered on an axis (centerline L1) extending along the top-bottom direction through the center of the support 73. Each pivotably supporting portion 75a is provided with a pivot shaft 78. Each pivotably supporting portion 75a has supported thereon a nail mount 79 such that the nail mount 79 is swingable up and down about the pivot shaft 78. That is, in the present preferred embodiment, the robot hand 18 includes four (a plurality of) nail mounts 79, for example.

Figure 20:
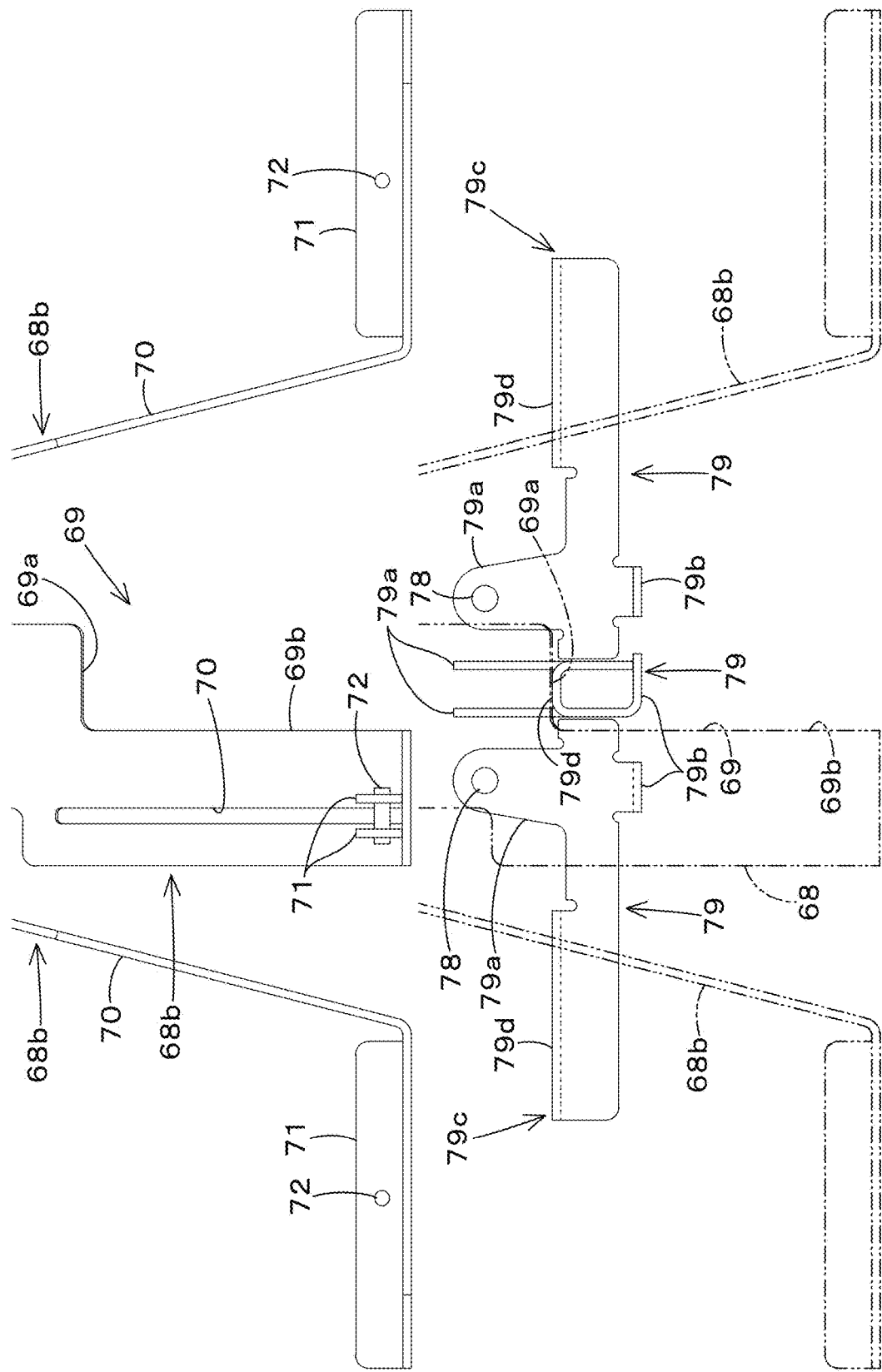
FIG. 20 is a side view showing a relationship between the ascent/descent body and nail mounts.

As illustrated in FIG. 20, each nail mount 79 is located so as to correspond to the cutout 69 in a corresponding second section 68b. Each nail mount 79 includes a pair of bracket portions 79a pivotably connected to a corresponding pivotably supporting portion 75a via the pivot shaft 78. Furthermore, the nail mount 79 includes a restricting portion 79b located below the bracket portions 79a. Furthermore, the nail mount 79 includes a nail mount portion 79c which projects in the outward direction from a lower portion of the bracket portions 79a. An upper surface of the nail mount portion 79c defines and functions as an abutment portion 79d on which the upper edge 69a of the cutout 69 (ascent/descent body 62) abuts.

As illustrated in FIG. 16, the nail mounts 79 have attached thereto respective holding nails 81 capable of holding a crop 2. Specifically, in the present preferred embodiment, the robot hand 18 includes four (a plurality of) holding nails 81, which are part of a hand portion 82 of the robot hand 18. In other words, the hand portion 82 includes two sets of two holding nails 81 arranged opposite each other. Each holding nail 81 includes a swinging linkage mechanism 83 and a holding portion 84. The swinging linkage mechanism 83 includes a parallel linkage. Specifically, the swinging linkage mechanism 83 includes a first swinging link 83A including an upper end portion pivoted on an inward portion of the nail mount portion 79c, and a second swinging link 83B having an upper end portion pivoted on an outward portion of the nail mount portion 79c.

The holding portion 84 includes an upper inward portion thereof pivoted on a lower portion of the first swinging link 83A, and includes an upper outward portion thereof pivoted on a lower portion of the second swinging link 83B. The holding portion 84 translates by the swinging movement of the swinging linkage mechanism 83. A lower portion of the holding portion 84 extends in the inward direction from the bottom of an upper portion of the holding portion 84. Lower end portions of the holding portions 84 (holding nails 81) overlap when the hand portion 82 (holding nails 81) is in a closed state as illustrated in FIG. 16.

The holding nails 81 (hand portion 82) open and close by the swinging movement of the swinging linkage mechanisms 83. Specifically, when the holding nails 81 are in their closed position, the swinging movement of the swinging linkage mechanisms 83 in outward directions causes the holding nails 81 (hand portion 82) to open (see dot-dot-dash lines in FIG. 21). Therefore, the swinging movement of the swinging linkage mechanisms 83 in inward directions causes the holding nails 81 (hand portion 82) to close.

As illustrated in FIG. 19, each holding nail 81 is biased by a closing spring 85 in a direction in which the holding nail 81 closes. Specifically, the closing spring 85 is made of a torsion coil spring, and a coil portion 85a of the closing spring 85 is fitted on the outer side of the pivot shaft 80 which pivotably supports the upper portion of a corresponding first swinging link 83A. The closing spring 85 has one end 85b engaged with an engagement portion 83a of the first swinging link 83A and has the opposite end 85c engaged with the nail mount 79.

Figure 21:
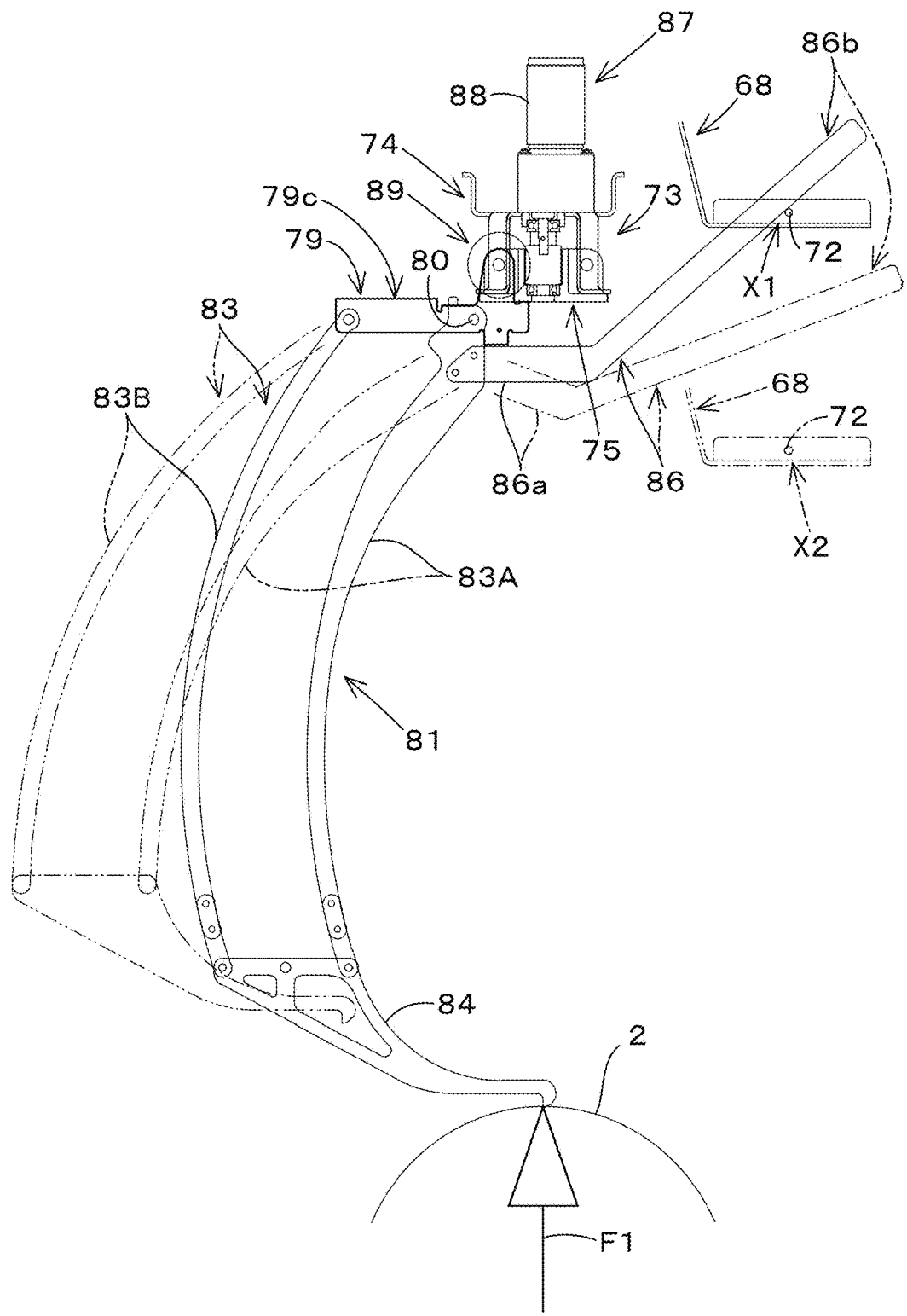
FIG. 21 is a side view showing a relationship between a holding nail and an engagement portion.

As illustrated in FIG. 21, each holding nail 81 is pushed up by a force F1 against the biasing force of the closing spring 85, and is thereby caused to move in a direction in which the holding nail 81 opens (see dot-dot-dash lines in FIG. 21).

As illustrated in FIGS. 16 and 19, the robot hand 18 includes linked members 86 each of which moves with the opening/closing movement of a corresponding holding nail 81. Each linked member 86 includes a proximal portion 86a and a lever 86b which extends diagonally upward from the proximal portion 86a.

As illustrated in FIG. 19, an end of the proximal portion 86a is fixed to an upper portion of a corresponding first swinging link 83A with bolt(s). The proximal portion 86a projects in the inward direction from an upper portion of the first swinging link 83A. Since the proximal portion 86a (linked member 86) abuts the restricting portion 79b when a corresponding holding nail 81 is in a closed position, the holding nail 81 is restricted from moving in the direction in which the holding nail 81 closes.

As illustrated in FIG. 16, the lever 86b extends from the end of the proximal portion 86a opposite the end fixed to the first swinging link 83A in a manner such that the lever 86b is inclined outward in the upward direction, and passes through the groove 70 in a corresponding third section 68c. Since the engagement member 72 is engaged with (abuts) the lever 86b from below when the holding nail 81 is in the closed state, the holding nail 81 is restricted from swinging in the direction in which the holding nail 81 opens. The state in which the engagement member 72 is engaged with the lever 86b from below is engaged position X1.

As illustrated in FIG. 21, when the ascent/descent body 62 descends while a lower end of each holding nail 81 is in abutment with a crop 2 and the nail mount 79 and the support 73 are restricted from moving downward, the engagement member 72 descends together with the ascent/descent body 62 from the engaged position X1 to a disengaged position X2 in which the engagement member 72 is spaced below from a corresponding linked member 86, as indicated by dot-dot-dash lines. When the engagement member 72 is in the disengaged position X2, the holding nail 81 is allowed to open and close.

As illustrated in FIG. 19, the support 73 is provided with a driving unit 87. The driving unit 87 includes a power unit 88 and a drive mechanism 89. The power unit 88 includes a motor (e.g., electric motor) rotatable in forward and reverse directions, and is attached on the upper body 74. The power unit 88 includes an output shaft 88a which projects downward and which passes through the bearing part 74d. The drive mechanism 89 is a mechanism to cause each nail mount 79 to swing up and down about a corresponding pivot shaft 78 by power from the power unit 88 to forcibly open and close the holding nails 81. Specifically, the drive mechanism 89 includes a first gear 89A and a plurality of second gears 89B. The first gear 89A includes a worm, is disposed between the bearing 74e of the bearing part 74d and a bearing 90 provided on a lower portion of the lower body 75, and is supported such that the first gear 89A is rotatable about a vertical axis. The first gear 89A is connected to the output shaft 88a, and is driven to rotate by rotational power from the power unit 88. Each second gear 89B includes a worm wheel which meshes with the first gear 89A, and is attached to a corresponding pivot shaft 78. Thus, the number of the second gears 89B provided corresponds to that of the nail mounts 79 and that of the holding nails 81. Specifically, there are four second gears 89B.

Once the rotational power from the output shaft 88a has been transmitted to a corresponding second gear 89B via the first gear 89A and the second gear 89B is driven to rotate, a corresponding pivot shaft 78 rotates, and a corresponding nail mount 79 swings up or down about a corresponding pivot shaft 78. Thus, by causing the nail mounts 79 to swing up or down by power from the power unit 88, it is possible to forcibly open or close the holding nails 81. In FIG. 19, a lowered position X3 of the nail mount 79 represented by solid line is a position to close the holding nail 81 (hand portion 82), and a raised position X4 of the nail mount 79 represented by dot-dot-dash line is a position to open the holding nail 81 (hand portion 82).

Note that, although the robot hand 18 includes four holding nails 81 in the present preferred embodiment, this does not imply any limitation. For example, there may be three or five or more holding nails 81. In such cases, the number of nail mounts 79 provided, the number of linked members 86 provided, the number of engagement members 72 provided, the number of second gears 89B provided, and the like each correspond to the number of holding nails 81.

The following description discusses how the robot hand 18 moves when harvesting crop(s) 2 such as watermelon. Note that the following description about the movement discusses a case in which crops 2 with their stems cut off are harvested.

As illustrated in FIG. 16, when the support 73, the nail mounts 79, and the holding nails 81 (hand portion 82) are hung on the ascent/descent body 62 via the expandable linkage mechanisms 76, the expandable linkage mechanisms 76 are in their expanded state. Furthermore, the holding nails 81 are in their closed state by their weight and/or biasing force from the closing springs 85, the nail mounts 79 are in their lowered position X3, and the engagement members 72 are in their engaged position X1.

Figure 22:
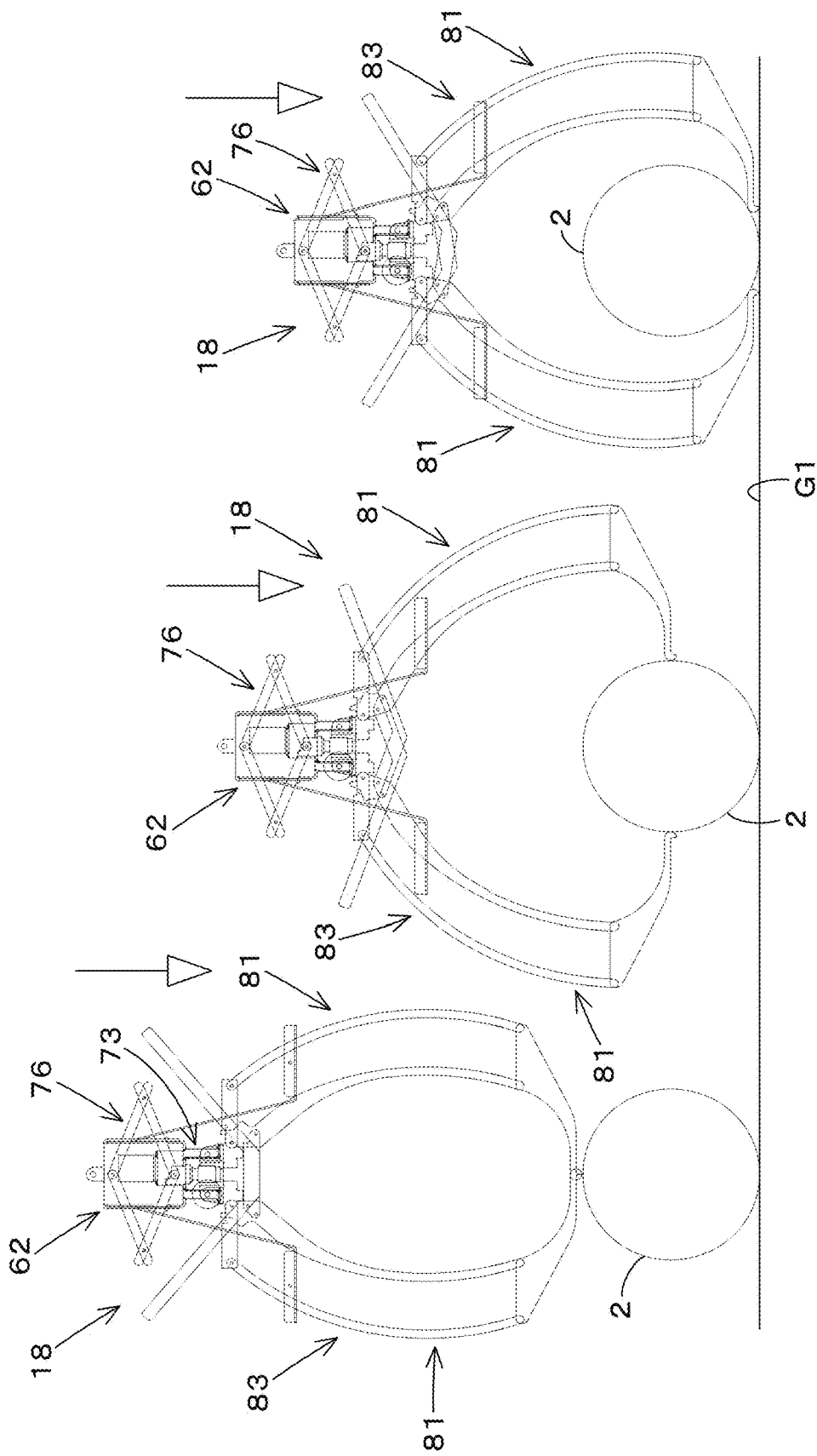
FIG. 22 is a side view showing actions of the robot hand.

When the robot hand 18 is moved to a space above a crop 2 and is lowered from the position illustrated in FIG. 16, the lower ends of the holding nails 81 first abut the crop 2, and the support 73, the nail mounts 79, and the holding nails 81 are restricted from moving downward. When the ascent/descent body 62 is further lowered, as illustrated in the left part of FIG. 22, the expandable linkage mechanisms 76 contract, and thereby the ascent/descent body 62 descends relative to the support 73 and the like. The ascent/descent body 62 descends until the upper edges 69a of the cutouts 69 abut the abutment portions 79*d* of the nail mounts 79, as represented by dot-dot-dash lines in FIG. 20. Furthermore, the engagement members 72 are spaced below from the linked members 86 and brought into the disengaged position X2 as represented by dot-dot-dash line in FIG. 21, and the holding nails 81 are brought into conditions in which they are allowed to open. Once the upper edges 69*a* have abutted the abutment portions 79*d*, the nail mounts 79 are pushed down by the ascent/descent body 62, and the holding nails 81 open under a reaction force from the crop 2 acting on the holding nails 81 against biasing forces from the closing springs 85. When the nail mounts 79 are further pushed down, the holding nails 81 open along the surface of the crop 2, as illustrated in the middle part of the FIG. 22. Then, once the holding portions 84 (lower ends of the holding nails 81) have reached an agricultural field's surface (ground) G1 as illustrated in the right part of FIG. 22, the ascent/descent body 62 stops descending.

Figure 23:
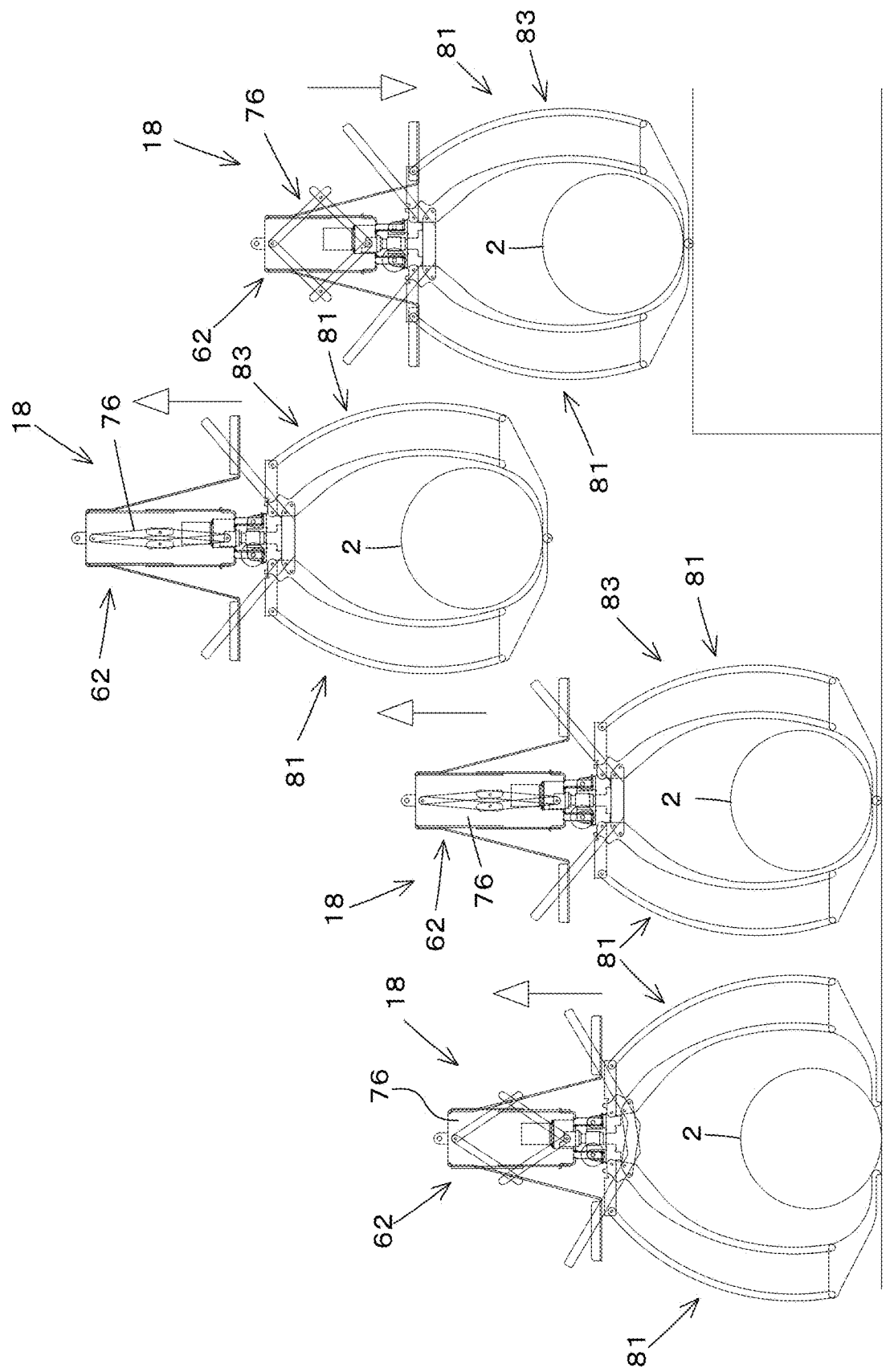
FIG. 23 is a side view showing actions of the robot hand.
Figure 25:
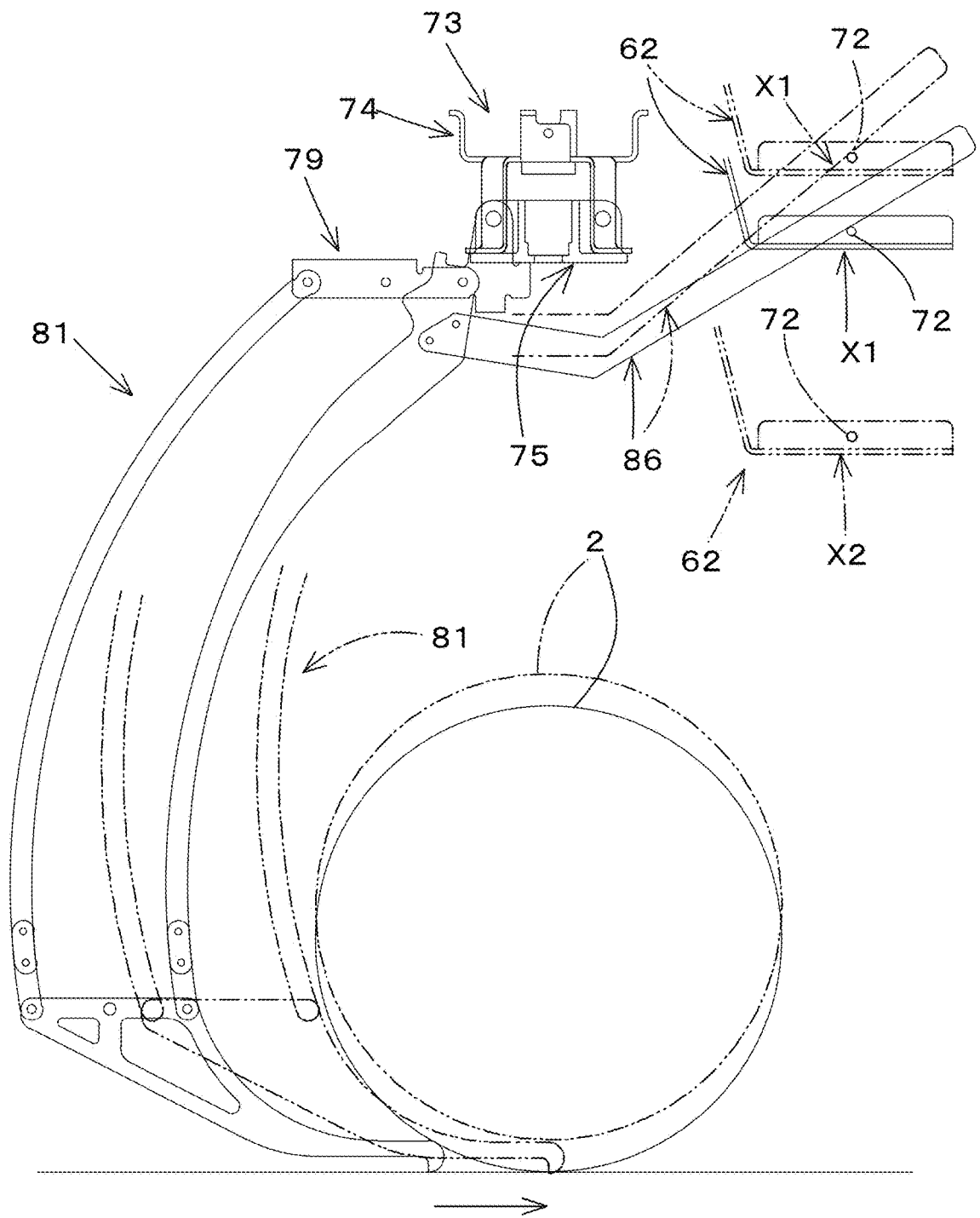
FIG. 25 is a side view showing a closing action of a holding nail.

Next, when the ascent/descent body 62 is raised as illustrated in the leftmost part of FIG. 23, the holding nails 81 close and the crop 2 is held around the holding nails 81 as illustrated in the second leftmost part of FIG. 23. Specifically, when the ascent/descent body 62 is raised, as illustrated in FIG. 25, the engagement members 72 ascend from the disengaged position X2 as the ascent/descent body 62 ascends, are brought into the engaged position X1 in which the engagement members 72 abut the linked members 86 from below, and the linked members 86 are raised by the ascent of the engagement members 72. With this, as represented by dot-dot-dash lines in FIG. 25, the holding nails 81 move in the inward directions to hold the crop 2.

When the engagement members 72 are in the engaged position X1, the holding nails 81 are restricted from moving in the directions in which the holding nails 81 open. Therefore, it is possible to lift up the crop 2 by raising the ascent/descent body 62. This makes it possible to move the crop 2 to a desired place (such as the tracking truck 48) as illustrated in the second rightmost part and the rightmost part of FIG. 23.

When the ascent/descent body 62 is lowered while the crop 2 is on the desired place after having been moved to the desired place as illustrated in the rightmost part of FIG. 23, the engagement members 72 are brought from the engaged position X1 into the disengaged position X2.

Figure 24:
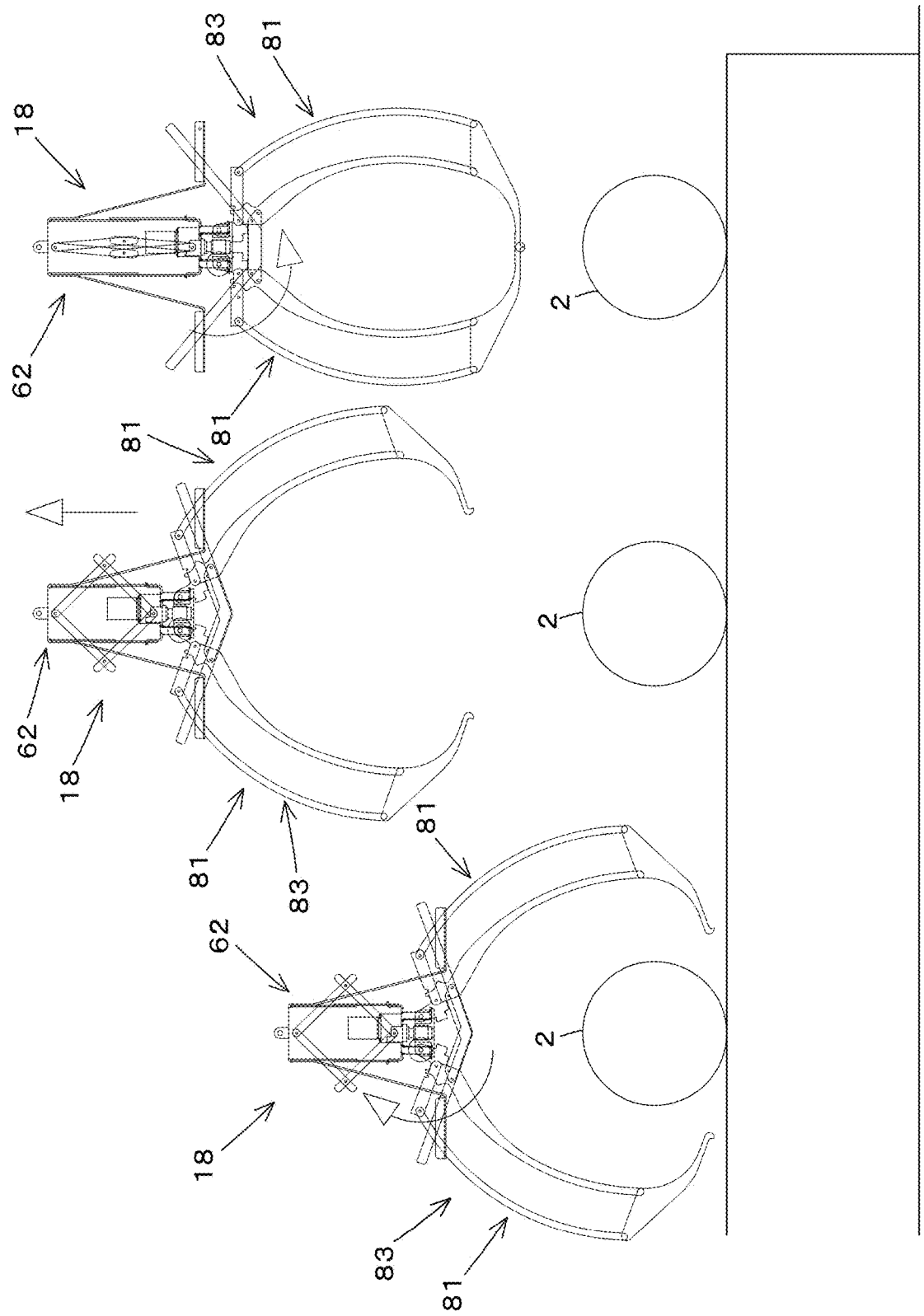
FIG. 24 is a side view showing actions of the robot hand.
Figure 26:
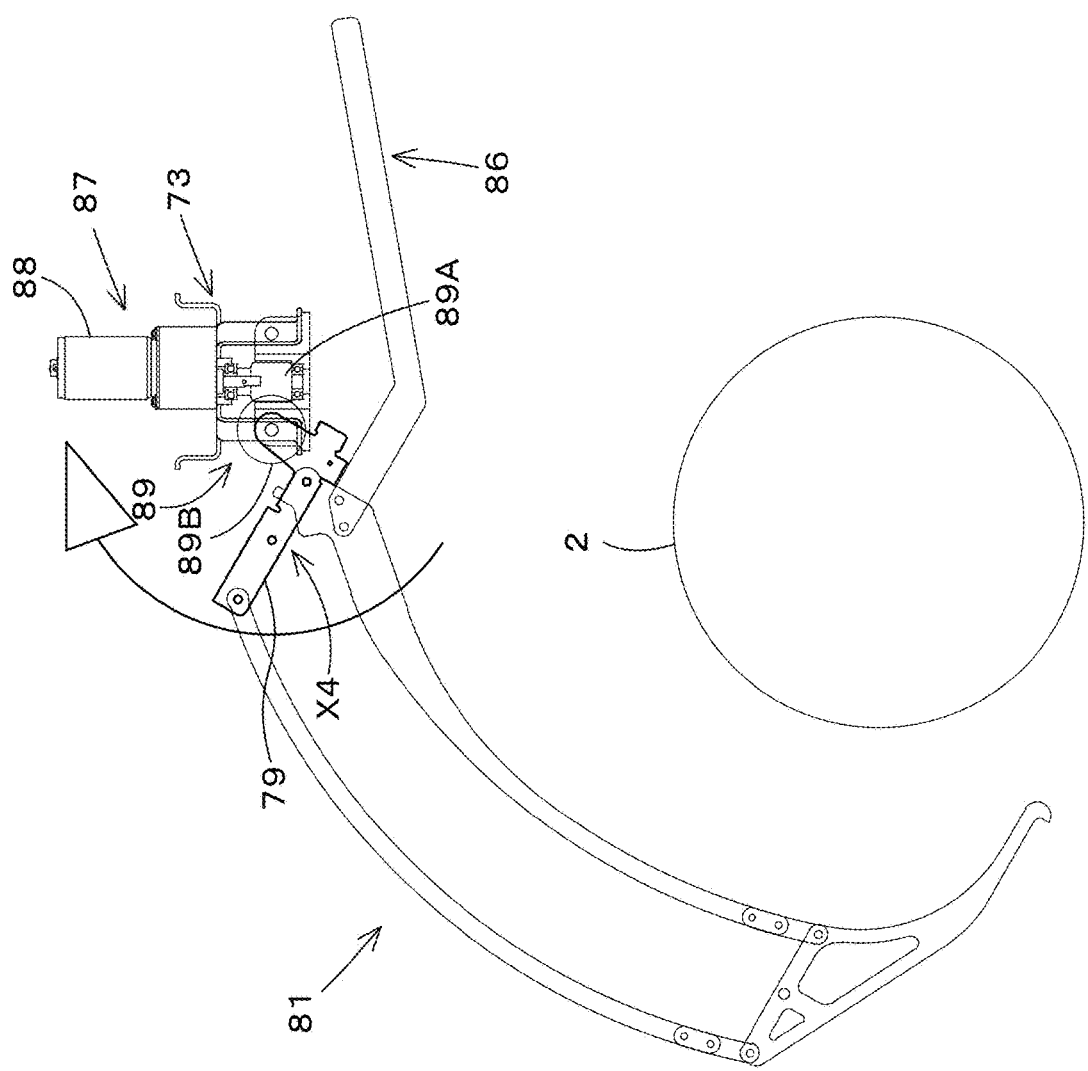
FIG. 26 is a side view showing the action of forcibly opening a holding nail.

Next, when the nail mounts 79 are caused to swing up from the lowered position X3 to the raised position X4 by the driving unit 87 as illustrated in FIG. 19 while the robot hand 18 is on the desired place as illustrated in the rightmost part of FIG. 23, the holding nails 81 are forcibly opened to release the crop 2, as illustrated in the left part of FIG. 24 and in FIG. 26. After the crop 2 is released, the robot hand 18 with the holding nails 81 open are raised as illustrated in the middle part of FIG. 24, and then, as illustrated in the right part of FIG. 24, the nail mounts 79 are caused to swing down from the raised position X4 to the lowered position X3 at, for example, a position above the crop 2, thereby forcibly closing the holding nails 81. After that, the robot hand 18 is moved to a crop 2 to be next harvested, and the foregoing actions are repeated. This makes it possible to sequentially harvest crops 2.

With regard to the foregoing robot hand 18, the distal ends of the holding nails 81 are closed until the robot hand 18 contacts a crop 2, thereby making it possible to prevent or reduce the likelihood that stems and/or leaves will accidentally enter the space defined by the holding nails 81.

Furthermore, since the holding nails 81 of the robot hand 18 open in contact with the surface of the crop 2, it is possible to prevent or reduce the likelihood that stems and/or leaves will accidentally enter the space defined by the holding nails 81 and also possible to automatically brush the stems and/or leaves off the crop 2 with the holding nails 81 without having to particularly control the robot hand 18.

Furthermore, since the links are configured such that each holding nail 81 opens outward, even if the distal end of the holding nail 81 is offset from the center of the crop 2 toward any of the other holding nails 81, it is possible to prevent "reverse joint" of the holding nail 81 on the opposite side of the offset (prevent the holding nail 81 from being pressed inward) when the holding nails 81 are pressed down.

Furthermore, when the crop 2 is lifted up, the crop 2 is held around the holding nails 81 by leverage as the robot hand 18 ascends, making it possible to close the holding nails 81 and unfailingly hold the crop 2 without power.

Furthermore, when the crop 2 is released, the entire holding nails 81 including base portions are forcibly opened by the power unit 88 (motor), thereby making it possible to release the crop 2 whenever desired without affected by the linkage mechanisms for the holding nails 81 and/or leverage.

Figure 27:
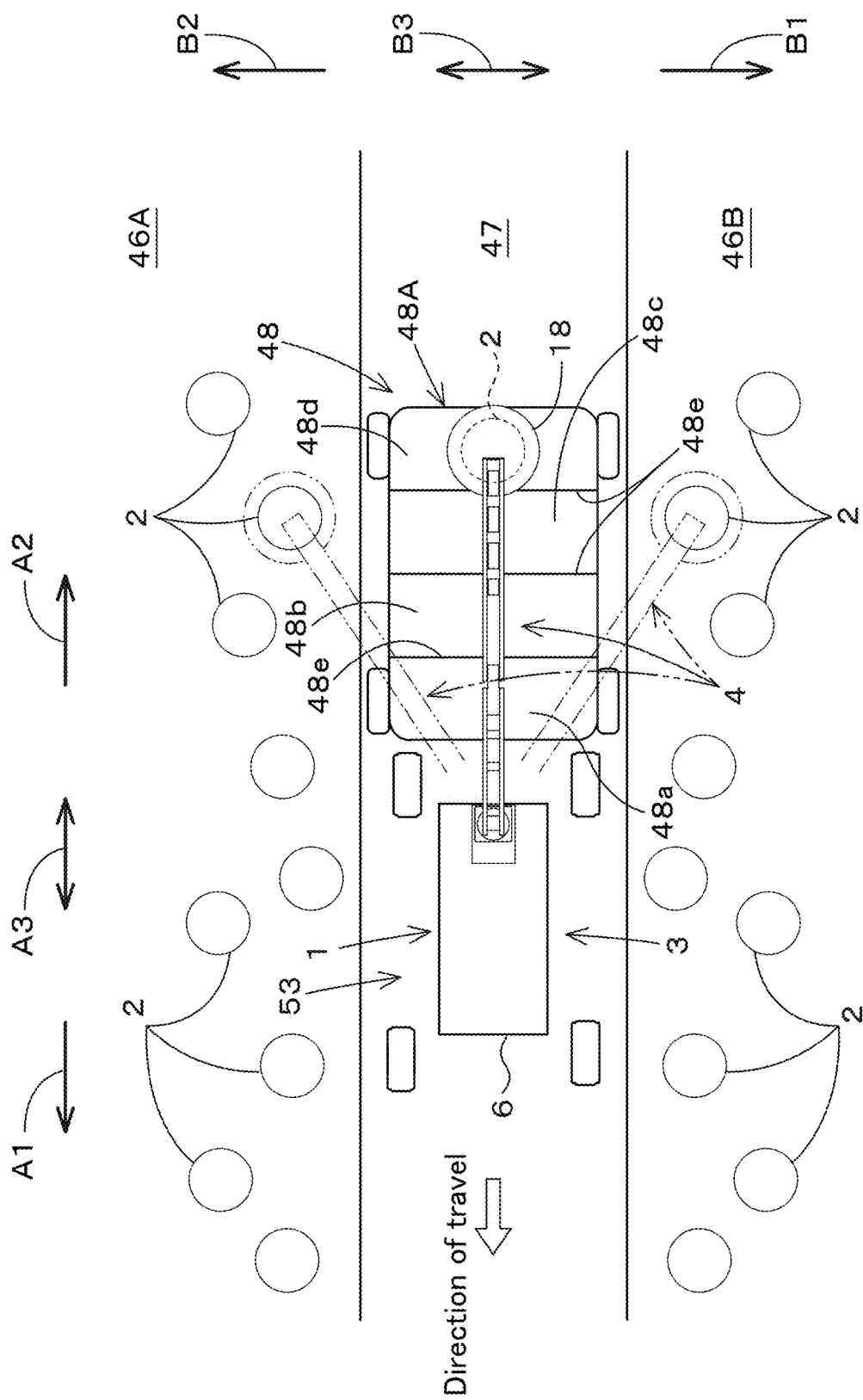
FIG. 27 is a general plan view of a grade determining harvester.

FIGS. 27 to 34 illustrate preferred embodiments different from those illustrated in FIGS. 1 to 26. FIG. 27 illustrates an example of a grade determining harvester 53. The grade determining harvester 53 includes the foregoing agricultural robot 1 and a truck 48.

Figure 28:
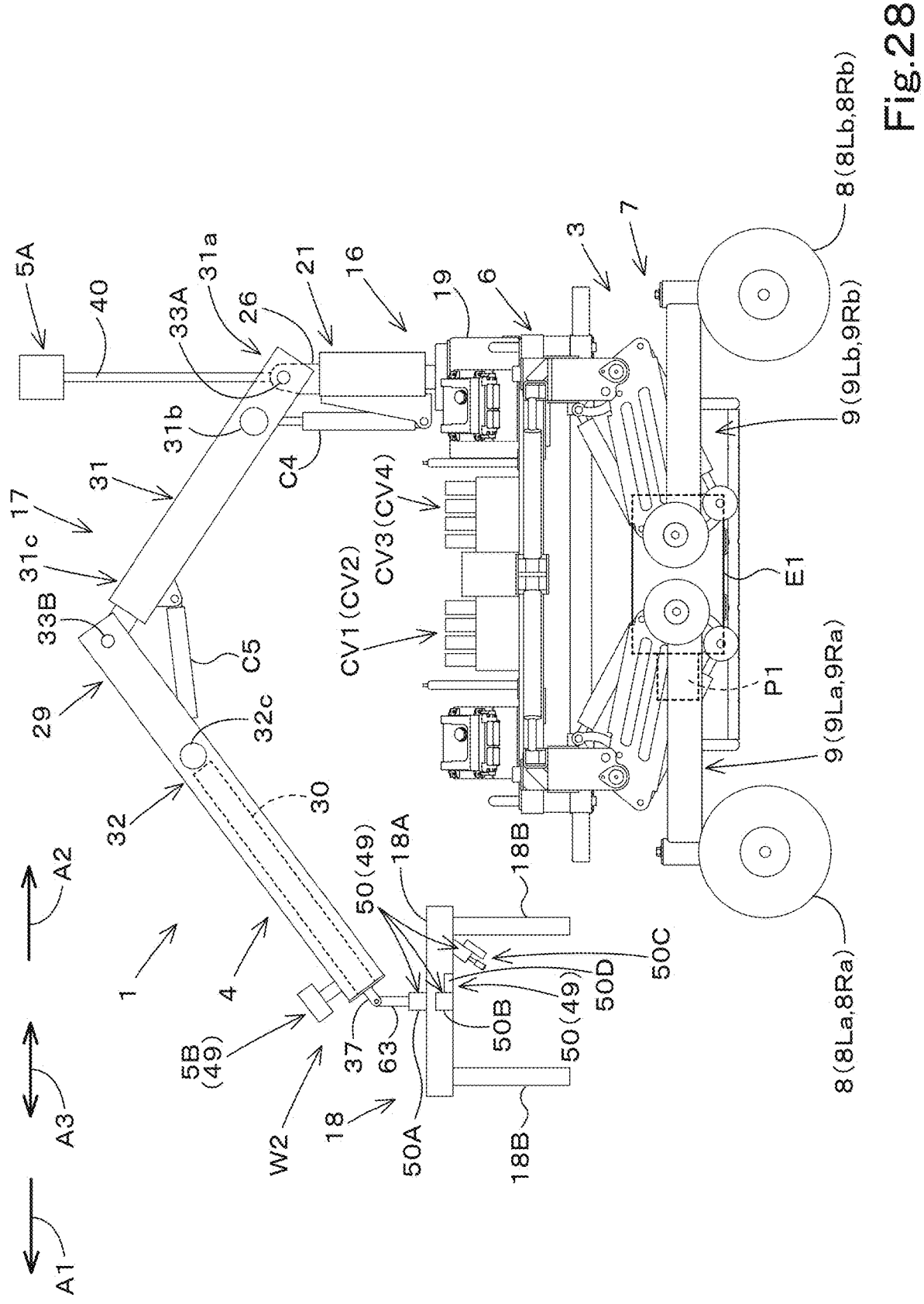
FIG. 28 is a side view of an agricultural robot.
Figure 29:
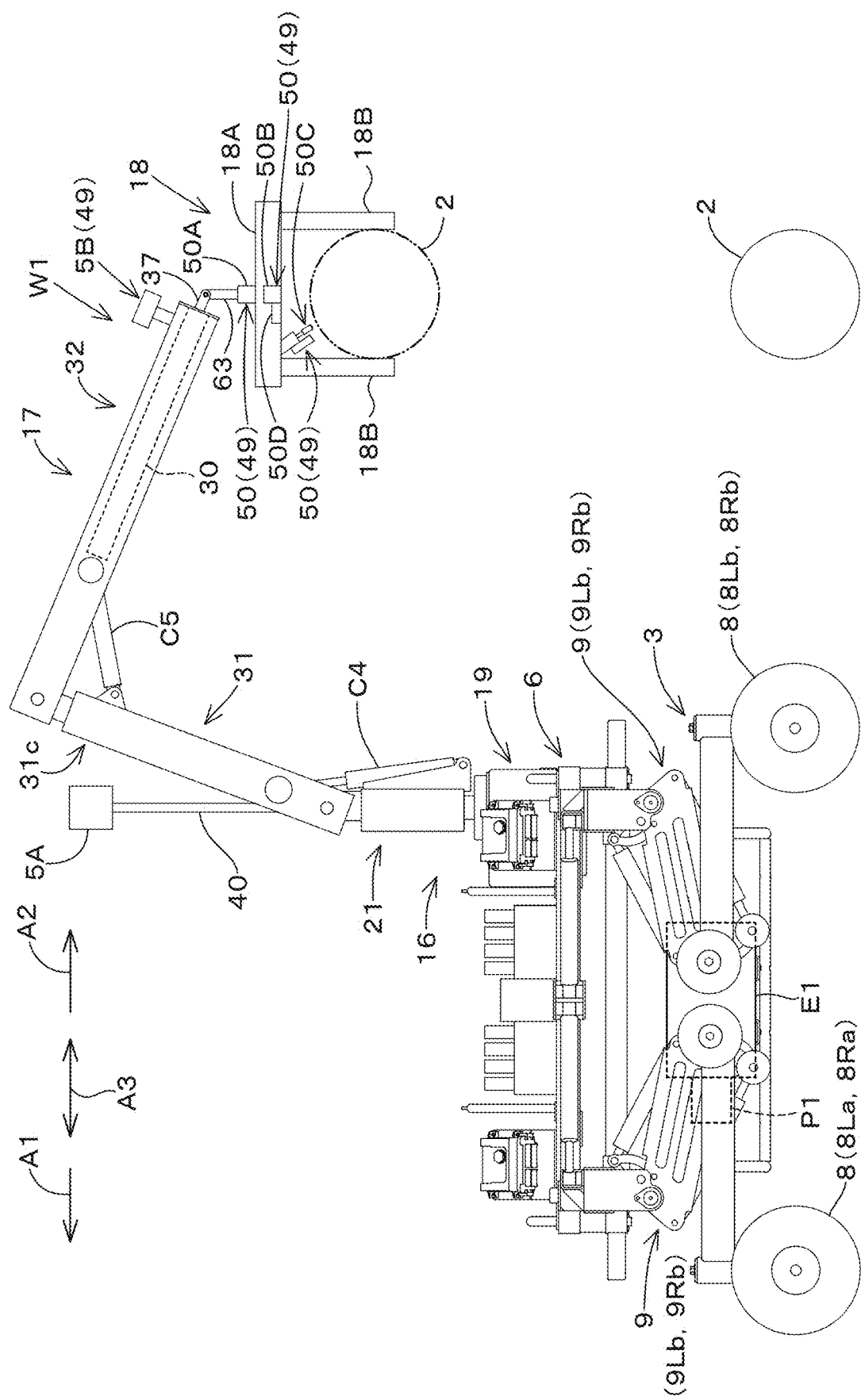
FIG. 29 is a side view of the agricultural robot in a work posture.

As illustrated in FIGS. 28 and 29, the robot hand 18 includes a base member 18A and a plurality of holding nails 18B. The connecting piece 63 is provided at the upper surface side of the base member 18A. The connecting piece 63 is pivoted on the hanger plate 37. That is, the robot hand 18 is hung on the arm 17. The plurality of holding nails 18B are swingably attached to a lower surface side of the base member 18A. The robot hand 18 is capable of holding a crop 2 between the holding nails 18B by the swinging movement of the plurality of holding nails 18B (see FIG. 29), and is also capable of releasing the held crop 2.

As illustrated in FIGS. 28 and 29, the agricultural robot 1 includes quality detector(s) 49 to acquire quality information of a crop 2 harvested using the manipulator 4. Specifically, the quality detectors 49 acquire quality information necessary for sorting of crops 2 harvested using the manipulator 4. The quality detectors 49 include an imaging device (referred to as a second imaging device) 5B and detection sensor(s) 50.

The second imaging device 5B is a device to acquire quality information of a crop 2 by capturing image(s). The quality information necessary for sorting of crops 2, acquired by the second imaging device 5B, is quality information obtained from the appearance of the crop 2, and is, for example, the size, shape, color, pattern (strips of watermelon), damage, and/or the like of the crop 2. The second imaging device 5B includes a Charge Coupled Devices (CCD) camera equipped with a CCD image sensor, a Complementary Metal Oxide Semiconductor (CMOS) camera equipped with a CMOS image sensor, or the like.

The detection sensor(s) 50 is/are each a sensor to acquire, by sensing, quality information differing from the quality information obtained by the second imaging device 5B. The quality information necessary for sorting of crops 2, acquired by each detection sensor 50, is, for example, the weight, aroma, tap sound, video, and/or the like of the crop 2.

As illustrated in FIGS. 28 and 29, the detection sensor(s) 50 in the present preferred embodiment includes one or more of the following: a weight sensor 50A, an aroma sensor 50B, a tap sound sensor 50C, and a video sensor 50D.

The weight sensor 50A is a sensor to acquire the weight of a crop 2 as quality information of the crop 2. The weight sensor 50A is provided between the robot hand 18 (base member 18A) and the connecting piece 63. That is, the robot hand 18 is hung on the arm 17 via the weight sensor 50A, and is capable of detecting the weight of the crop 2 held with the holding nails 18B. The weight sensor 50A includes, for example, a load cell or an electromagnetic balancing sensor.

The aroma sensor 50B is a sensor to acquire the aroma of a crop 2 as the quality information of the crop 2. The aroma sensor 50B is provided on, for example, the base member 18A, and acquires the aroma of the crop 2 held with the holding nails.

The tap sound sensor 50C is a sensor to acquire, as quality information of a crop 2, tap sound that the crop 2 makes when hit (tapped). The tap sound sensor 50C is provided on the robot hand 18 (base member 18A).

Figure 30:
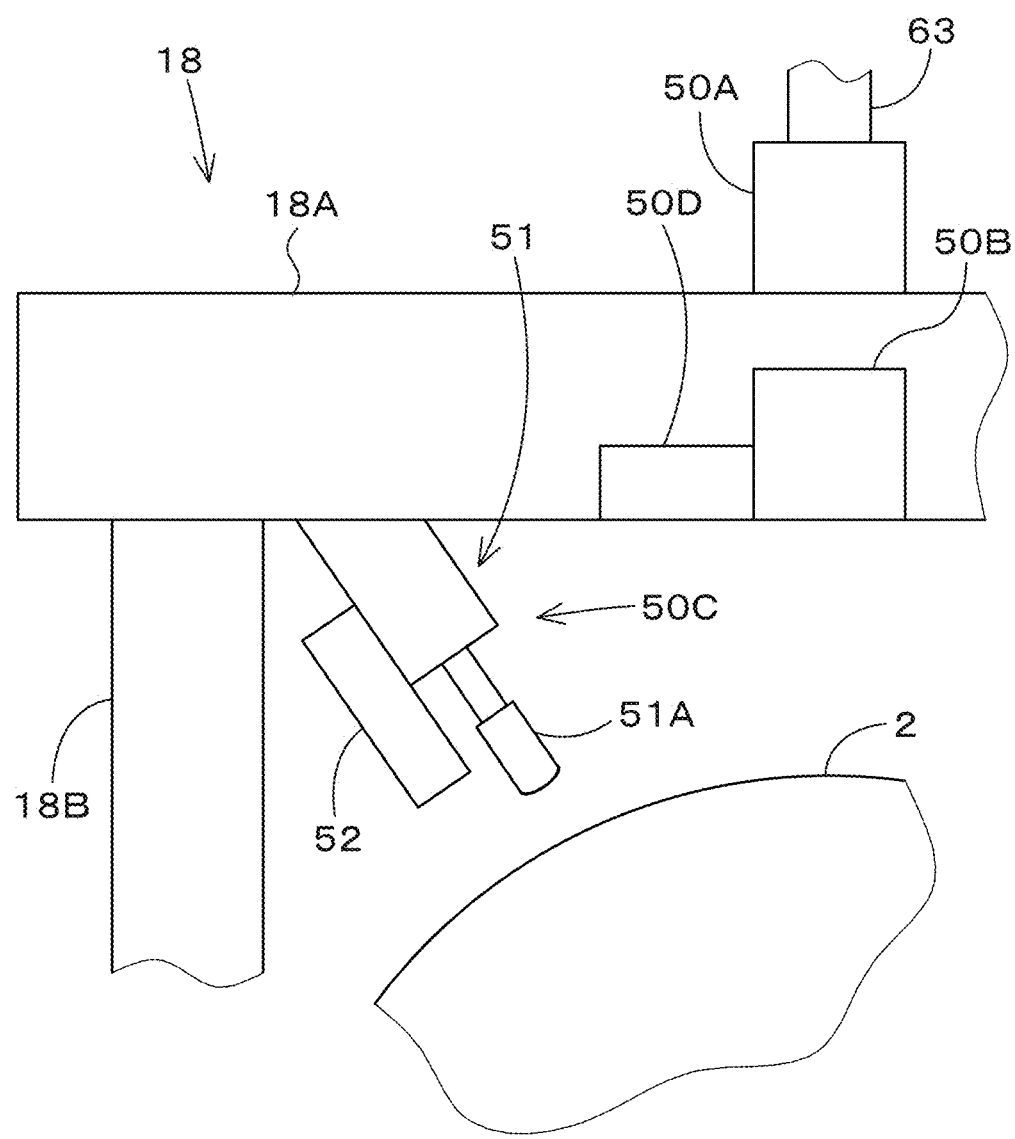
FIG. 30 is an enlarged view of a portion of a robot hand.

As illustrated in FIG. 30, the tap sound sensor 50C includes a hitting mechanism 51 and a sound recording mechanism 52. The hitting mechanism 51 includes a hitting member 51A capable of moving toward and away from a crop 2 held with the holding nails 18B, and causes the hitting member 51A to extend to hit the crop 2 to cause the crop 2 to make a sound. The sound recording mechanism 52 includes a microphone (highly directional microphone), and records a sound that the crop 2 makes when hit with the hitting member 51A.

The video sensor 50D is a sensor to acquire video of a crop 2 as quality information of the crop 2. The video sensor 50D is provided, for example, on the base member 18A. The video sensor 50D is a sensor including a CCD image sensor, a CMOS image sensor, or the like. It is possible to acquire the ripeness of the crop 2 based on video of the crop 2 captured by the video sensor 50D. Note that it is possible to, for example, detect the position of the crop 2 and/or determine whether the crop 2 is defective based on the video captured by the video sensor 50D.

Note that the quality detector(s) 49 may be the second imaging device 5B alone or the detection sensor(s) 50 alone. Furthermore, the detection sensors 50 are not limited to the weight sensor 50A, the aroma sensor 50B, the tap sound sensor 50C, and the video sensor 50D, provided that each detection sensor 50 is a sensor that acquires, by sensing, quality information differing from the quality information acquired by the second imaging device 5B. Other examples of the detection sensor 50 include a moisture sensor to detect the moisture of a crop 2.

As illustrated in FIG. 27, the truck 48 is disposed behind the traveling body 3. The truck 48 is, for example, a self-propelled tracking truck which travels after the traveling body 3. The truck 48 includes a harvest container 48A. The harvest container 48A includes a plurality of predetermined positions for respective grades allocated to the harvest container 48A (a first container portion 48a to a fourth container portion 48d). Adjacent ones of the predetermined positions (the first container portion 48a and the second container portion 48b, the second container portion 48b and the third container portion 48c, the third container portion 48c and the fourth container portion 48d) are partitioned by a partition wall 48e. The harvest container 48A illustrated in the example in FIG. 27 includes four predetermined positions, and the agricultural robot 1 is capable of sorting crops 2 into four grades (for example, special grade→excellent→very good→good). The number of predetermined positions in which crops 2 are sorted is not limited to the number in the present preferred embodiment.

Figure 31:
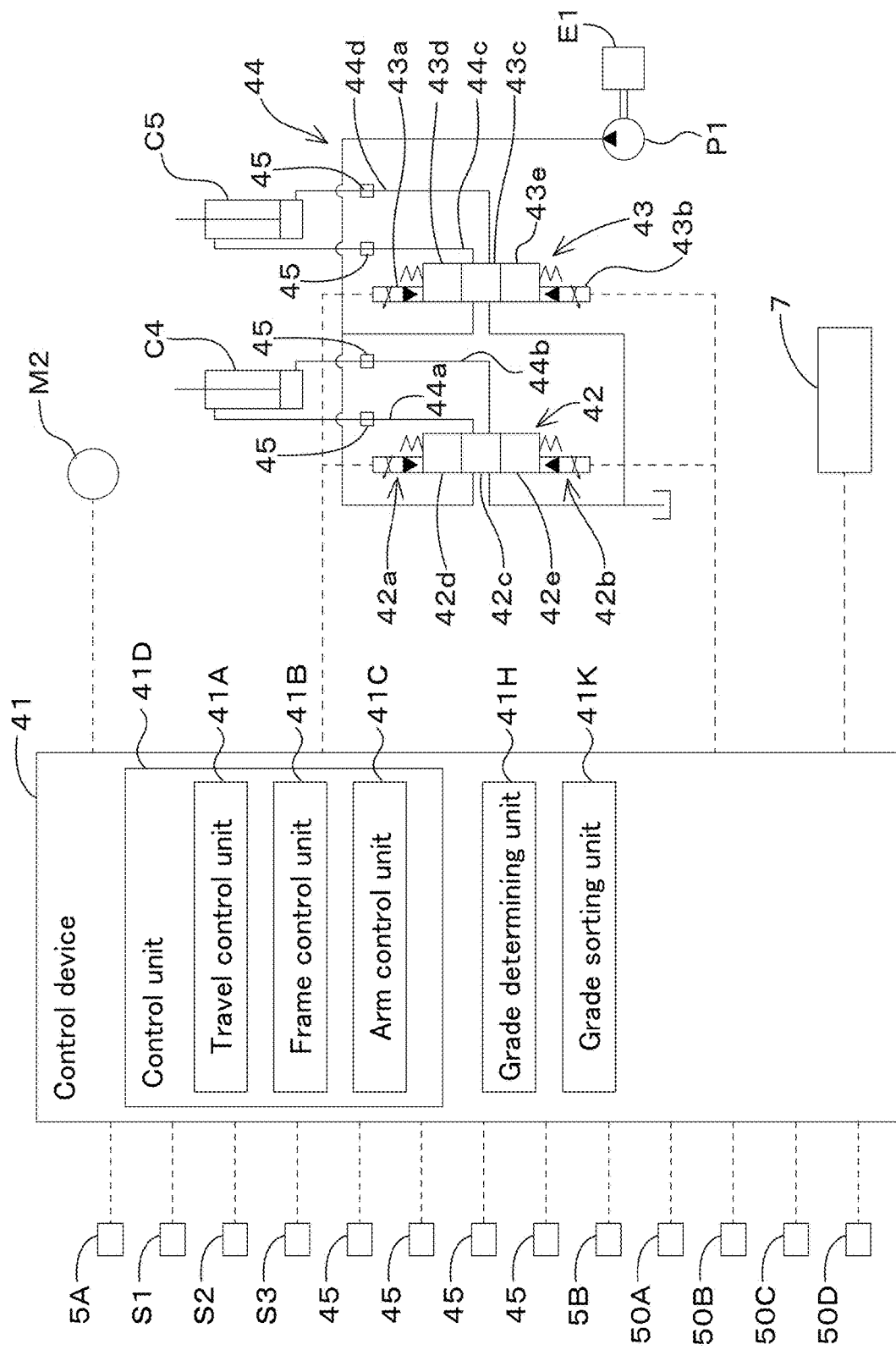
FIG. 31 is a block diagram showing a system configuration.

As illustrated in FIG. 31, the control device 41 has connected thereto the second imaging device 5B, the weight sensor 50A, the aroma sensor 50B, the tap sound sensor 50C, and the video sensor 50D. The control device 41 is capable of acquiring quality information of a crop 2 acquired by the second imaging device 5B, and is capable of acquiring, as quality information, the weight of the crop 2 acquired by the weight sensor 50A, the aroma of the crop 2 acquired by the aroma sensor 50B, the tap sound acquired by the tap sound sensor 50C, and the ripeness of the crop 2 based on the video acquired by the video sensor 50D.

The control device 41 includes a grade determining unit 41H. The grade determining unit 41H determines the grade of a crop 2 based on the quality information acquired by the second imaging device 5B and the quality information acquired by the detection sensor(s) 50 (the weight sensor 50A, the aroma sensor 50B, the tap sound sensor 50C, and/or the video sensor 50D). Specifically, the grade determining unit 41H determines under which of a plurality of grades the crop 2 falls based on the appearance of the crop 2 such as the size, shape, color, pattern, damage, and/or the like of the crop 2 acquired by the second imaging device 5B. Furthermore, the grade determining unit 41H determines under which of a plurality of grades the crop 2 falls, based on the weight of the crop 2 acquired by the weight sensor 50A. Furthermore, the grade determining unit 41H determines the ripeness of the crop 2 based on the aroma of the crop 2 acquired by the aroma sensor 50B, and determines under which of a plurality of grades the crop 2 falls based on the ripeness. Furthermore, the grade determining unit 41H determines the ripeness of the crop 2 based on the tap sound of the crop 2 acquired by the tap sound sensor 50C, and determines under which of a plurality of grades the crop 2 falls based on the ripeness. It is noted that a clear, high-pitched tap sound changes to a low, dull tap sound as the crop 2 ripens. When the tap sound is transformed by Fourier transformation, the sound shows a characteristic wavelength distribution in the spectrum as the crop 2 ripens. The grade determining unit 41H determines the ripeness of the crop 2 based on the wavelength distribution. Furthermore, the grade determining unit 41H determines under which of a plurality of grades the crop 2 falls, based on the ripeness based on the video acquired by the video sensor 50D.

The grade determining unit 41H determines the grade of the crop 2 in general consideration of the grade determined based on the quality information acquired by the second imaging device 5B and the grade determined based on the quality information acquired by the detection sensor(s) 50 (the weight sensor 50A, the aroma sensor 50B, the tap sound sensor 50C, and/or the video sensor 50D). This makes it possible to increase the accuracy of the determination of the grade of the crop 2.

As illustrated in FIG. 31, the control device 41 includes a grade sorting unit 41K. The grade sorting unit 41K actuates the manipulator 4 to sort a crop 2, having been subjected to the determination by the grade determining unit 41H, into any of the predetermined positions for respective grades allocated to the harvest container 48A (the first container portion 48a to the fourth container portion 48d). Specifically, assume that the first container portion 48a is a predetermined position for crops 2 of a first grade (special grade), the second container portion 48b is a predetermined position for crops 2 of a second grade (excellent), the third container portion 48c is a predetermined position for crops 2 of a third grade (very good), and the fourth container portion 48d is a predetermined position for crops 2 of a fourth grade (good). In such a case, if the grade determining unit 41H determines a crop 2 as being the first grade based on quality information acquired by the second imaging device 5B and the detection sensor(s) 50, the grade sorting unit 41K controls the position of the robot hand 18 with the frame control unit 41B and the arm control unit 41C to store the crop 2 in the first container portion 48*a*. If the grade determining unit 41H determines a crop 2 as being the second grade, the third grade, or the fourth grade, the grade sorting unit 41K causes the crop 2 to be stored in a corresponding container portion in a similar manner.

The other configurations are substantially the same as those of the preferred embodiments illustrated in FIGS. 1 to 15. In the present preferred embodiment, the robot hand 18 of the preferred embodiment as illustrated in FIG. 16 may be used.

Figure 32:
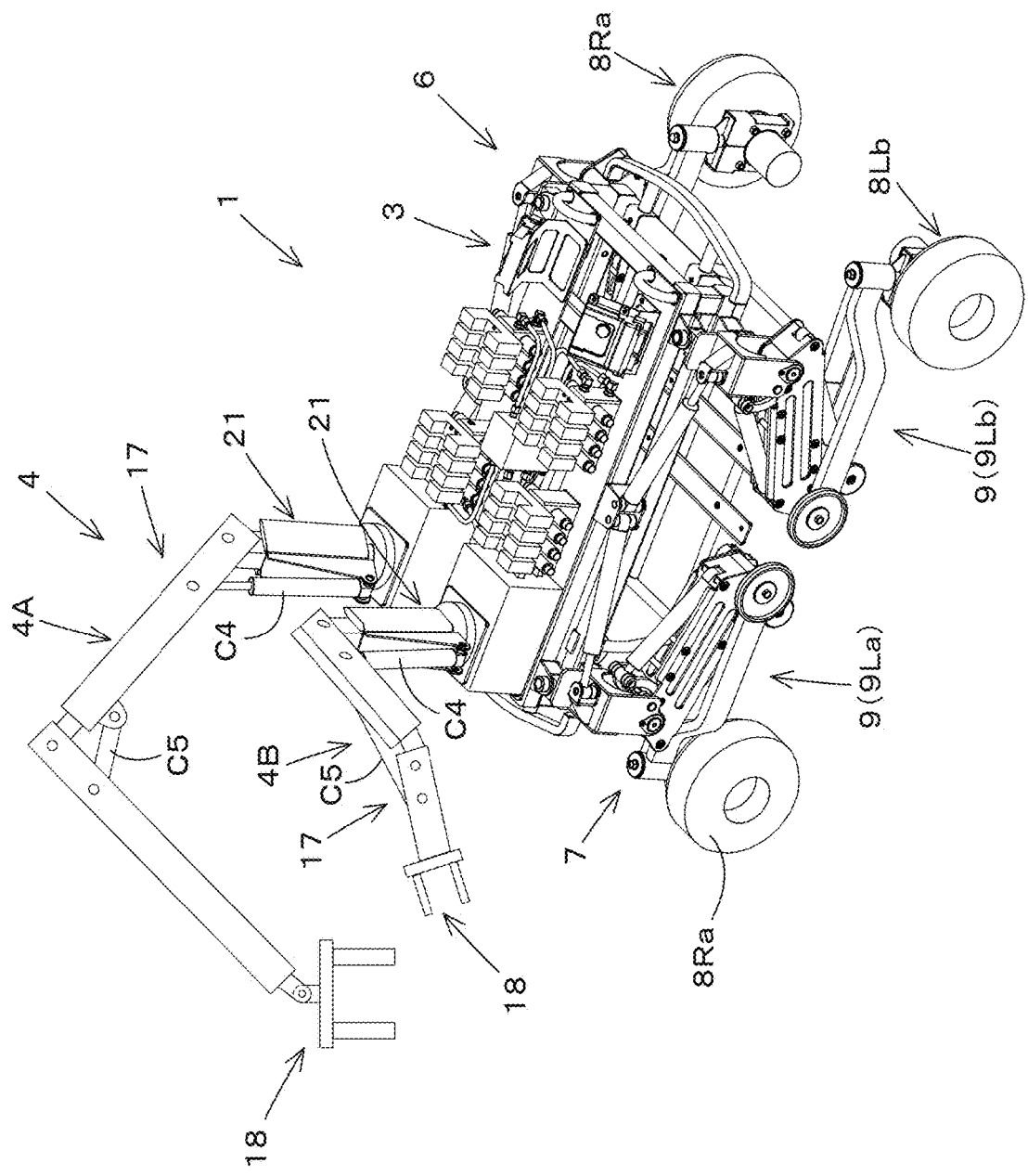
FIG. 32 is a perspective view illustrating another example of an agricultural robot.
Figure 33:
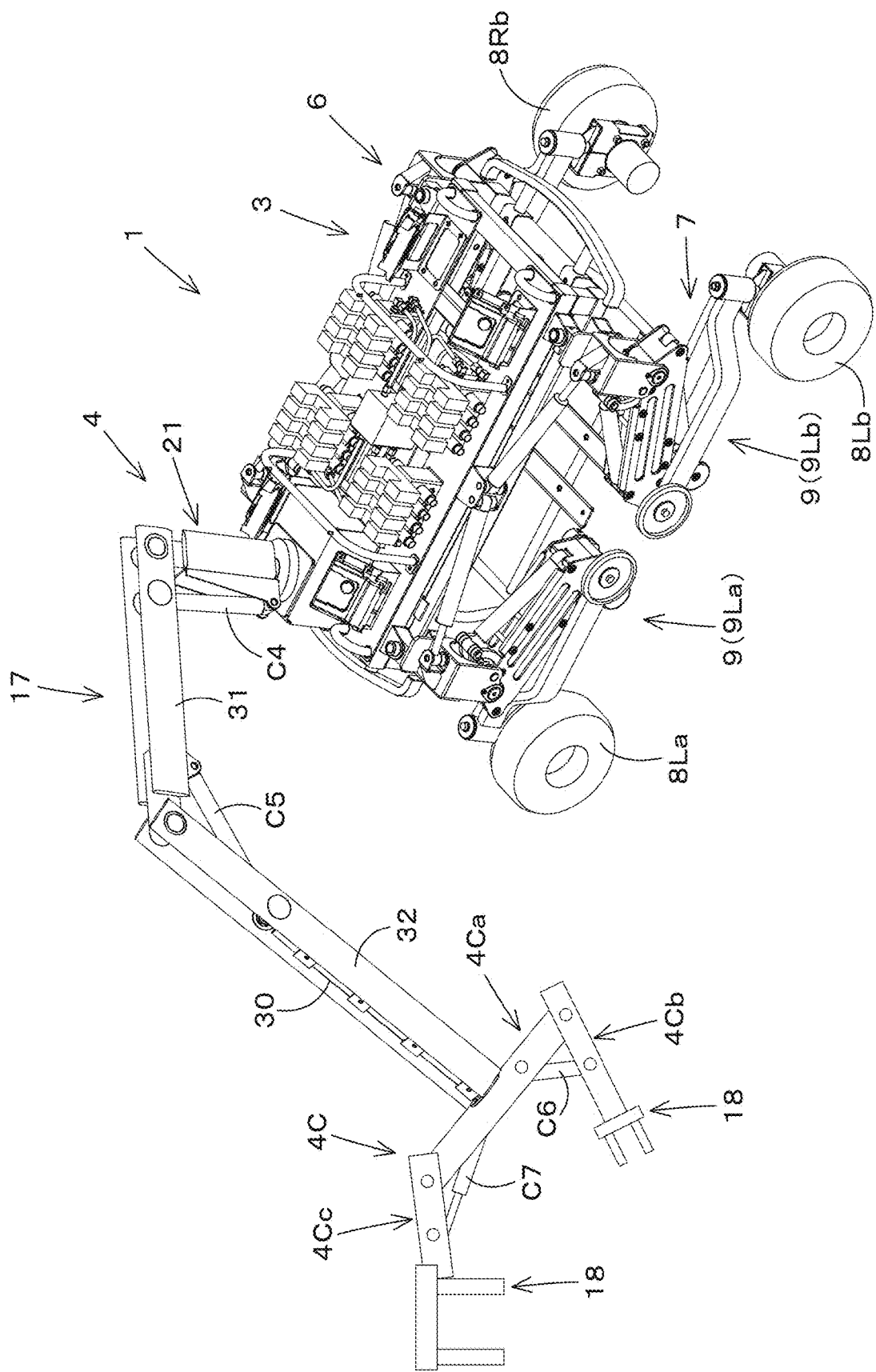
FIG. 33 is a perspective view illustrating a further example of an agricultural robot.
Figure 34:
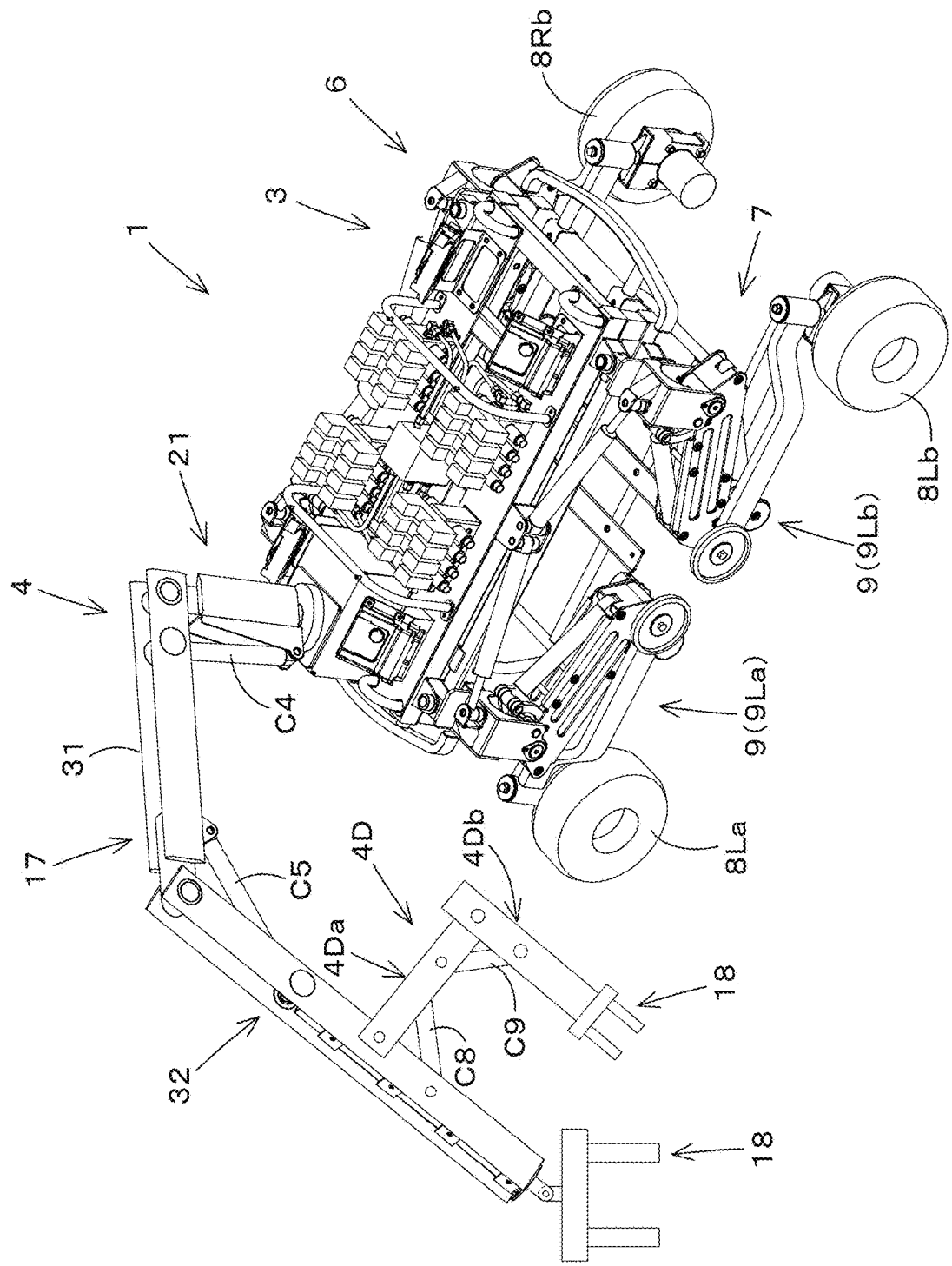
FIG. 34 is a perspective view illustrating still a further example of an agricultural robot.

FIGS. 32, 33, and 34 each illustrate an agricultural robot 1 according to another preferred embodiment.

In the agricultural robot 1 as illustrated in FIG. 32, a manipulator 4 includes a plurality of units (4A and 4B) each including a rotating frame 21, an arm 17, and a robot hand 18. In other words, the agricultural robot 1 includes a plurality of arms 17 with respective robot hands 18. Specifically, the manipulator 4 of the agricultural robot 1 illustrated in FIG. 32 includes two units 4A and 4B, each of which includes a rotating frame 21, an arm 17, a first arm cylinder C4, a second arm cylinder C5, and/or the like.

A manipulator 4 of the agricultural robot 1 as illustrated in FIGS. 33 and 34 includes a rotating frame 21, an arm 17, and a plurality of robot hands 18 provided on the arm 17. That is, the manipulator 4 includes a plurality of robot hands 18 on a single arm 17.

The manipulator 4 of the agricultural robot 1 illustrated in FIG. 33 includes a branch arm 4C. The branch arm 4C includes a primary arm part 4Ca, a first secondary arm part 4Cb, and a second secondary arm part 4Cc. The primary arm part 4Ca is attached to a sub-arm 30 when there is the sub-arm 30, and is attached to a second arm unit 32 when there is no sub-arm 30. The primary arm part 4Ca has a lengthwise middle portion thereof attached to the sub-arm 30 or the second arm unit 32. The first secondary arm part 4Cb is pivoted on one end of the primary arm part 4Ca, and the second secondary arm part 4Cc is pivoted on the opposite end of the primary arm part 4Ca. The first secondary arm part 4Cb is driven by a hydraulic cylinder C6 to swing relative to the primary arm part 4Ca, and the second secondary arm part 4Cc is driven by a hydraulic cylinder C7 to swing relative to the primary arm part 4Ca. Note that the primary arm part 4Ca may be pivoted on the sub-arm 30 or the second arm unit 32 and configured to be driven by a hydraulic cylinder to swing.

The manipulator 4 of the agricultural robot 1 illustrated in FIG. 34 includes a branch arm 4D. The branch arm 4D includes a primary arm part 4Da and a secondary arm part 4Db. The primary arm part 4Da has one end pivoted on a lengthwise intermediate portion of the second arm unit 32, and has the secondary arm part 4Db pivoted on the opposite end thereof. The primary arm part 4Da is driven by a hydraulic cylinder C8 to swing relative to the second arm unit 32, and the secondary arm part 4Db is driven by a hydraulic cylinder C9 to swing relative to the primary arm part 4Da.

With the agricultural robot 1 illustrated in each of FIGS. 32, 33 and 34, it is possible to brush off branches (stems) and leaves of a crop 2 with one robot hand 18 and do work such as harvesting of the crop 2 with another robot hand 18. It is also possible to hold a crop 2 with one robot hand 18 and do work such as cutting a stem with another robot hand 18. In the case where the agricultural robot 1 is configured as a fertilizer spreader to spread fertilizer on an agricultural field, it is possible to carry a bag of fertilizer with one robot hand 18 to an inlet of a fertilizer hopper and open the fertilizer bag with another robot hand 18 to introduce the fertilizer into the fertilizer hopper. In the case where the agricultural robot 1 is configured as a transplanter to plant seedlings, it is possible to concurrently perform the work of taking empty seedling boxes out of the machine body 6 and the work of installing seedling boxes with seedlings onto the machine body 6. That is, it is possible, with the use of the agricultural robot 1, to do agricultural work that has required human hand.

The agricultural robot 1 illustrated in FIG. 32 is configured such that, compared to the arm 17 and the robot hand 18 of one unit 4A, the arm 17 and the robot hand 18 of the other unit 4B are small. The agricultural robot 1 illustrated in FIG. 33 is configured such that, compared to one robot hand 18, the other robot hand 18 is small. With regard to the agricultural robot 1 illustrated in FIG. 34, a large arm 17 is provided, and a small branch arm 4D is disposed on an intermediate portion of the arm 17 of the robot hand 18.

Each of the agricultural robots 1 illustrated in FIGS. 32, 33, and 34 holds and carries a crop 2 (vegetable) with a large robot hand 18 and does another supplementary work and detailed work with a small robot hand 18, making it possible to do work quickly and efficiently.

FIGS. 35 to 40 illustrate preferred embodiments different from those illustrated in FIGS. 1 to 34.

Figure 35:
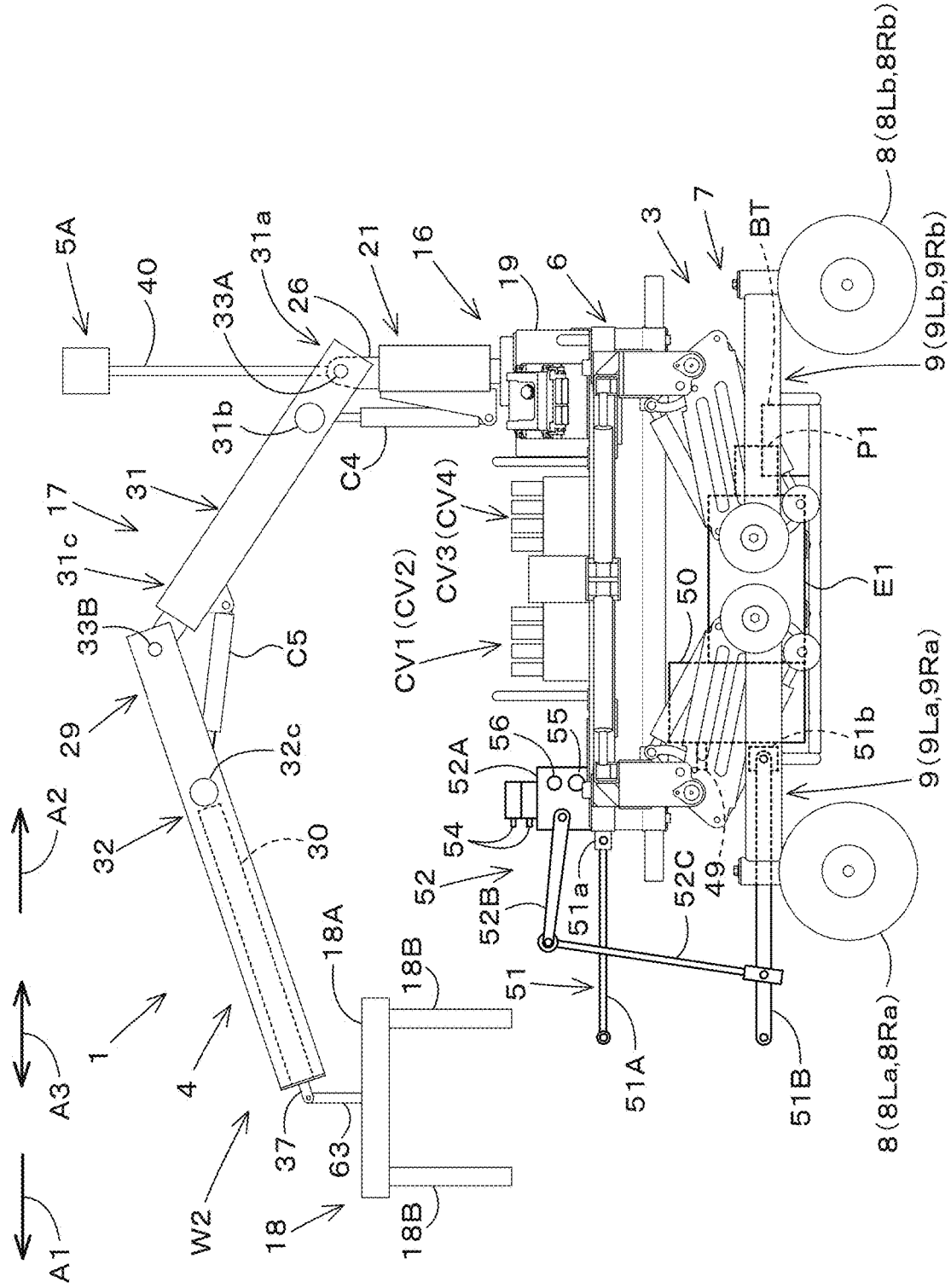
FIG. 35 is a side view of the agricultural robot.

As illustrated in FIG. 35, a prime mover frame 6B is equipped with a battery BT to supply electricity to electric device(s) mounted on an agricultural robot 1.

Figure 37:
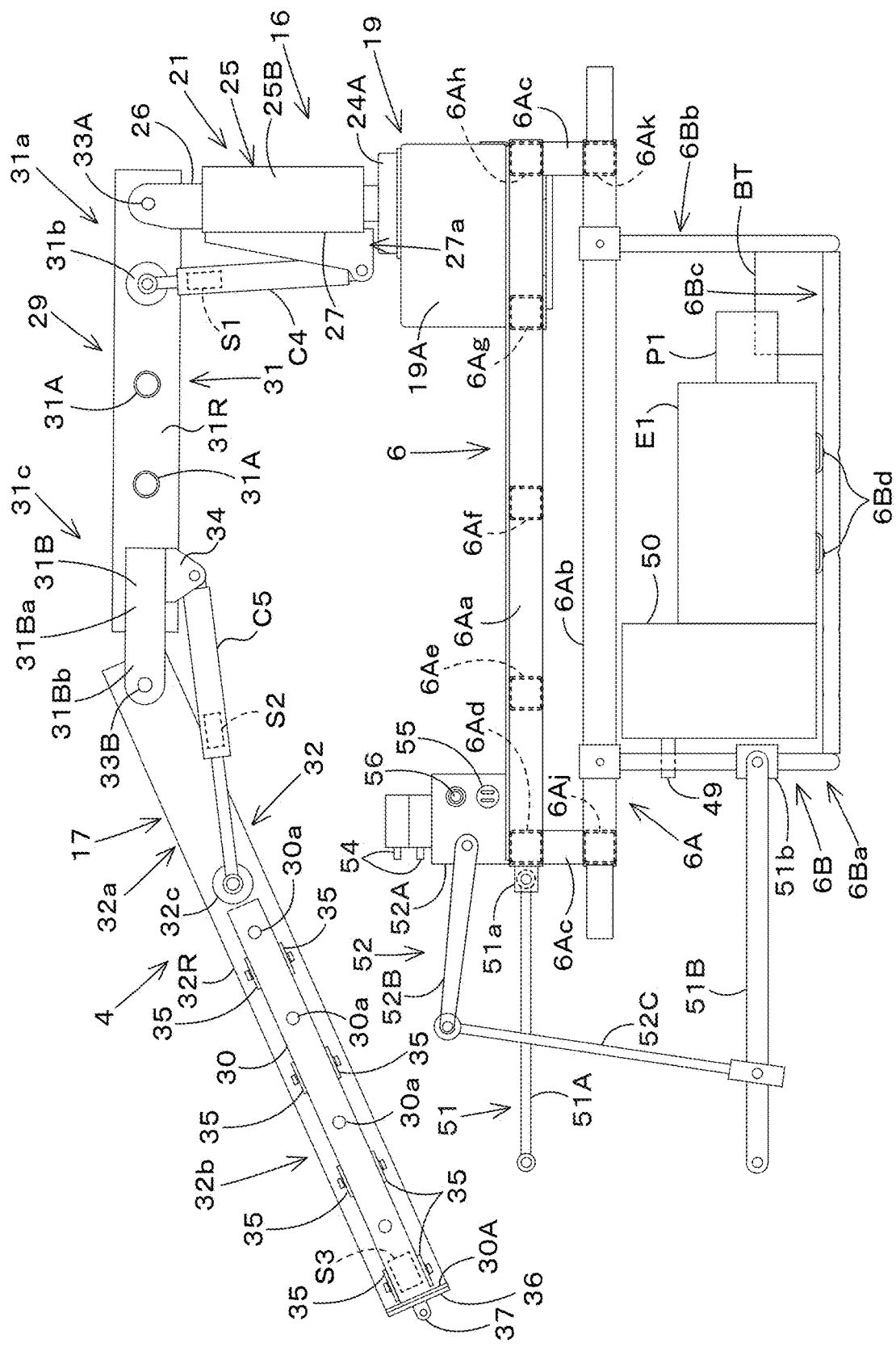
FIG. 37 is a side view of a machine body and a manipulator.
Figure 38:
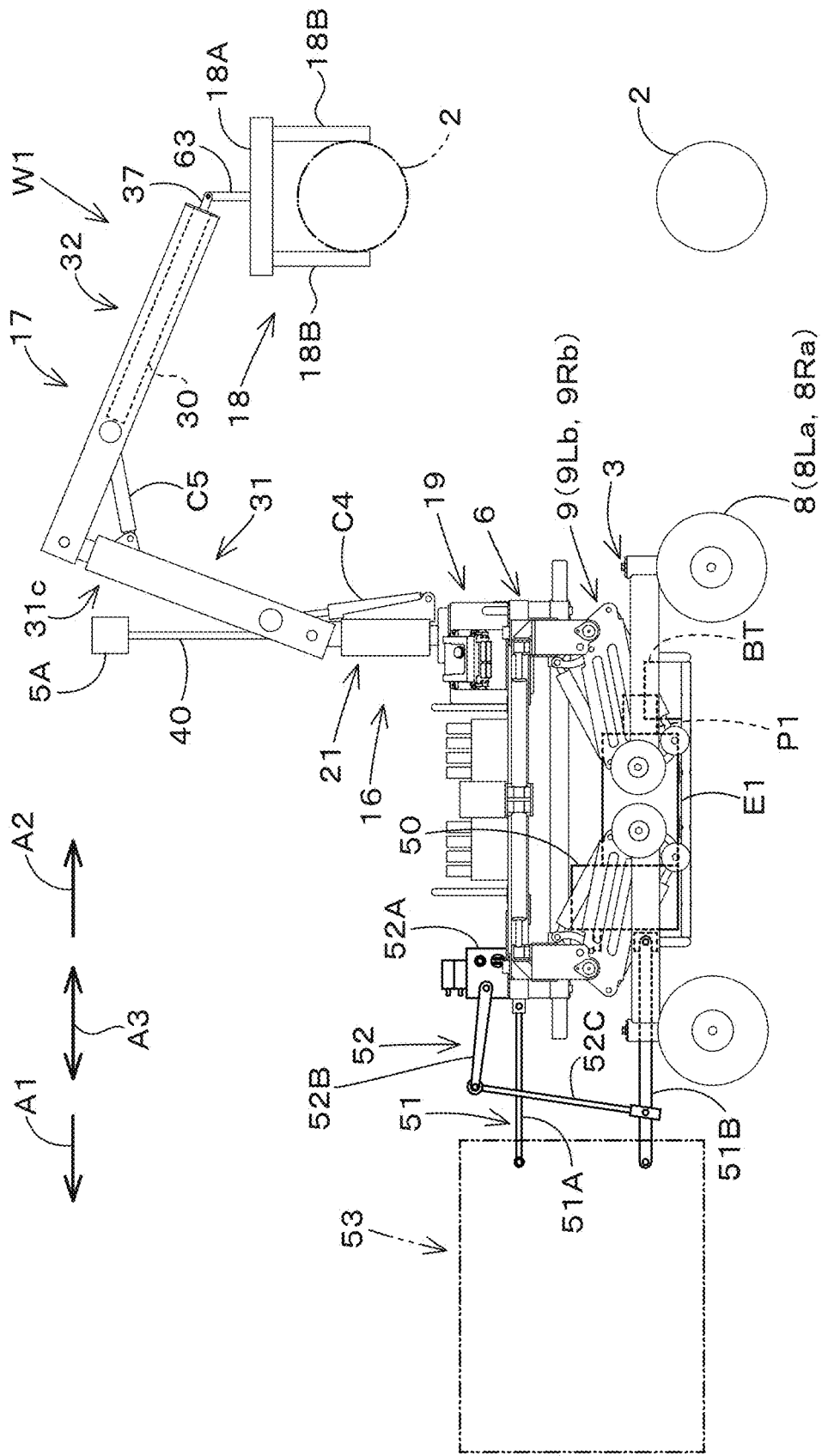
FIG. 38 is a side view of the agricultural robot in a work posture.

As illustrated in FIGS. 35 and 37, the agricultural robot 1 includes a power take-off shaft (first power take-off shaft) 49 to take power from a prime mover E1. The first power take-off shaft 49 projects forward from a transmission case 50 connected to a front portion of the prime mover E1. Furthermore, power outputted from the prime mover E1 via a power transmission mechanism stored in the transmission case 50 is transmitted to the first power take-off shaft 49. The first power take-off shaft 49 is disposed in a middle portion of the machine body 6 in a machine body width direction B3.

Note that the first power take-off shaft 49 may be provided at the rear of the agricultural robot 1. Such first power take-off shafts 49 may be provided at both the front and the rear of the agricultural robot 1.

Figure 36:
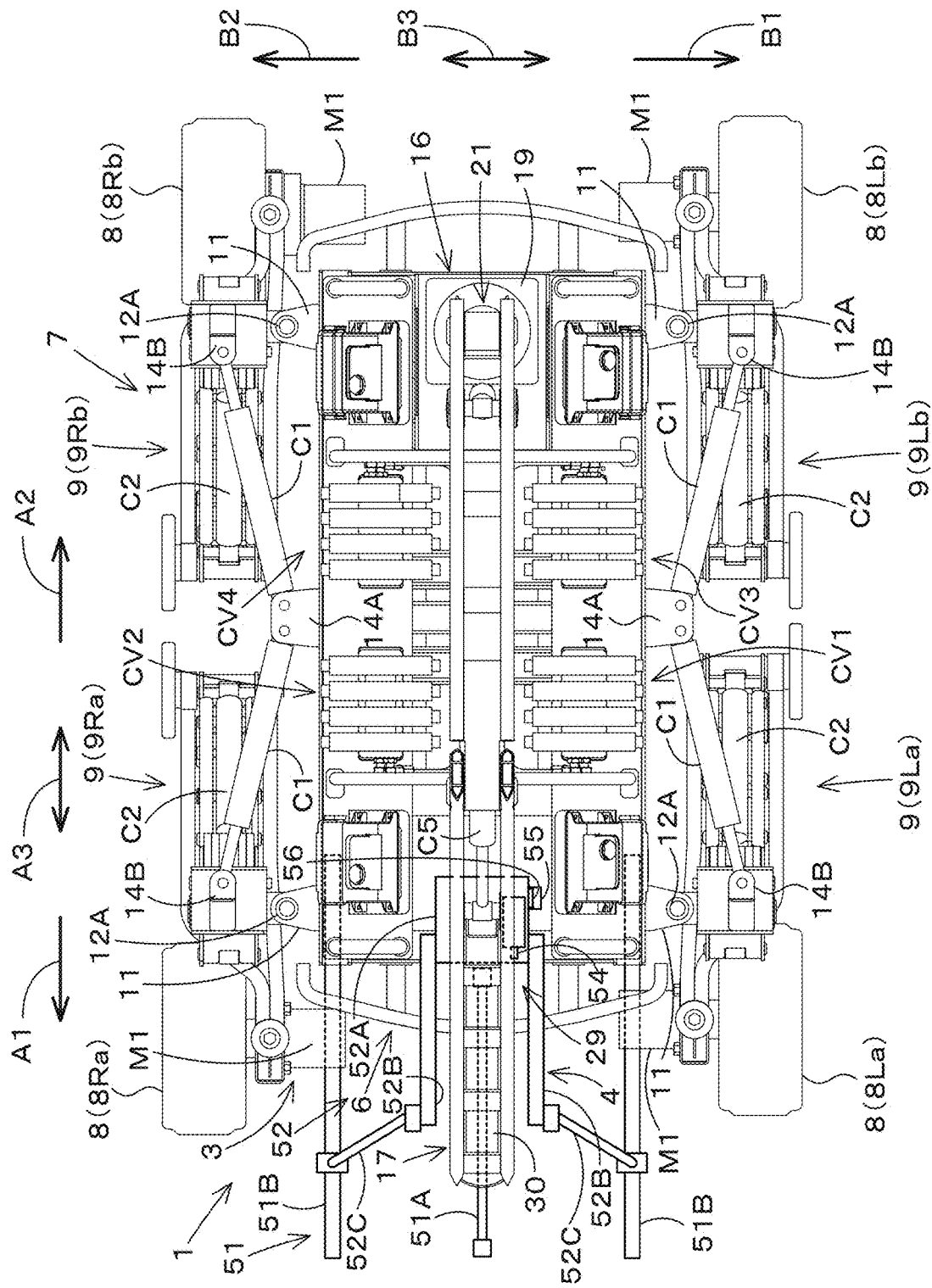
FIG. 36 is a plan view of the agricultural robot.

As illustrated in FIGS. 36 and 37, the agricultural robot 1 includes a linkage mechanism 51 to link a working machine 53 (see FIG. 38) to the agricultural robot 1 such that the working machine 53 can be raised and lowered. The linkage mechanism 51 in the present preferred embodiment includes a three-point linkage including a single top link 51A and two lower links 51B. The linkage mechanism 51 is provided at the front of the agricultural robot 1 (traveling body 3). The top link 51A is disposed higher than the first power take-off shaft 49 and in front of a main frame 6A (machine body 6). Specifically, the top link 51A is disposed in front of a middle portion, in a machine body width direction B3, of an upper front portion of the main frame 6A. A rear portion of the top link 51A is pivoted on a bracket 51*a* provided on the main frame 6A such that the top link 51A is pivotable about an axis extending along the machine body width direction B3. The two lower links 51B are disposed lower than the top link 51A and the first power take-off shaft 49 and in front of the prime mover frame 6B (machine body 6). Specifically, one of the lower links 51B is disposed forward of a left portion of the front frame 6Ba, and the other of the lower links 51B is disposed forward of a right portion of the front frame 6Ba. Each lower link 51B is pivoted on a bracket 51b provided on a lower portion of the front frame 6Ba such that the lower link 51B is pivotable about an axis extending along the machine body width direction B3.

Note that the linkage mechanism 51 may be a two-point linkage or a linkage having some other structure. That is, the linkage mechanism 51 need only be a mechanism capable of linking the working machine 53. The linkage mechanism 51 may be provided at the rear of the agricultural robot 1. Such linkage mechanisms 51 may be provided both at the front and rear of the agricultural robot 1. Note, however, that each linkage mechanism 51 is provided at the same side of the agricultural robot 1 as the first power take-off shaft 49.

As illustrated in FIGS. 36 and 37, the agricultural robot 1 includes a raising/lowering mechanism 52 to raise and lower the lower links 51B. The raising/lowering mechanism 52 includes a hydraulic device 52A, two lift arms 52B, and two lift rods 52C. The hydraulic device 52A is provided at the upper surface side of a front portion of the main frame 6A (machine body 6). The hydraulic device 52A is disposed in a middle portion of the main frame 6A in a machine body width direction B3. The hydraulic device 52A is driven by hydraulic fluid discharged from the hydraulic pump P1. The lift arms 52B are disposed at the left and right of the hydraulic device 52A. Each lift arm 52B has a proximal portion (rear portion) thereof pivotably attached to the hydraulic device 52A, and is driven by the hydraulic device 52A such that the lift arm 52B is swingable up and down. The lift rods 52C are arranged along the machine body width direction B3. The left lift rod 52C connects a front portion of the left lift arm 52B and an intermediate portion of the left lower link 51B, and the right lift rod 52C connects a front portion of the right lift arm 52B and an intermediate portion of the right lower link 51B. The upward or downward swinging movement of the lift arms 52B by the hydraulic device 52A causes the lower links 51B to be raised or lowered via the lift rods 52C. With this, the working machine 53 linked to the linkage mechanism 51 is raised or lowered.

As illustrated in FIG. 37, the agricultural robot 1 includes one or more external takeout ports 54 to take out hydraulic fluid (working fluid) supplied from the hydraulic pump P1 as a fluid pressure source capable of supplying working fluid. Each external takeout port 54 is preferably a port having a shape used in conventional agricultural machines. Each external takeout port 54 may be a port to take out compressed air (working fluid) discharged from an air pump (fluid pressure source).

The agricultural robot 1 includes the first power take-off shaft 49, the linkage mechanism 51, and the external takeout port(s) 54, and therefore it is possible to easily attach an additional hydraulic or mechanical working machine to the agricultural robot 1. Provided that the first power take-off shaft 49, the linkage mechanism 51, and the external takeout port(s) 54 have a shape of a conventional type, a conventional working machine can be used as-is. The additional working machine attached is not limited, and examples would be a rotary cultivator, a fertilizer spreader such as a broadcaster or a lime sower, a management work machine to do the work of managing inter-ridge grooves, and the like.

As illustrated in FIG. 37, the agricultural robot 1 includes a power port 55 to supply electricity from the battery BT outward. The agricultural robot 1 includes the power port 55, and therefore is capable of supplying electricity to electric device(s) mounted on the working machine 53 attached to the agricultural robot 1. That is, an electric working machine 53 can be easily attached additionally to the agricultural robot 1. It is also possible to supply electricity from the power port 55 to electric device(s) and/or the like used in the vicinity of the agricultural robot 1.

As illustrated in FIG. 37, the agricultural robot 1 includes a communication port 56 usable for external communication. The agricultural robot 1 includes the communication port 56, and is therefore capable of allowing communication between the agricultural robot 1 and the working machine 53 attached to the agricultural robot 1. This makes it possible to control the agricultural robot 1 and the working machine 53 in a coordinated manner.

The output shaft Ma of the rotary motor M2 is a power take-off shaft (second power take-off shaft) to take power from a power source differing from the prime mover E1.

Figure 40:
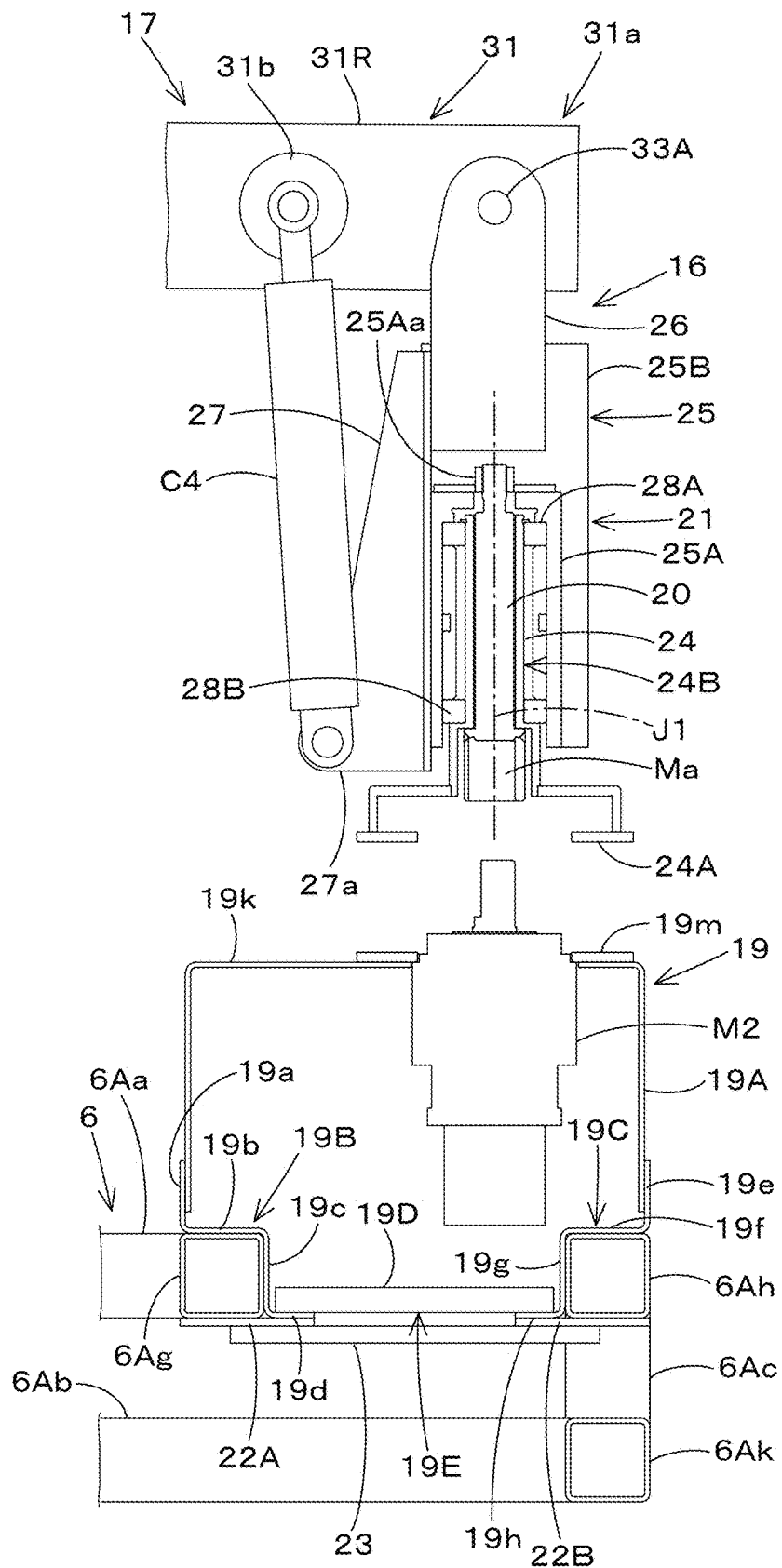
FIG. 40 is a side cross-sectional view of another example of a mount of the manipulator.

As illustrated in FIG. 40, the base portion 24A may be configured to be detachably attached to a mounting plate 19m fixed on the upper wall 19k of the mount 19 with fastener(s) such as bolt(s) and/or nut(s). In other words, the following configuration may be used: the shaft support 24, the rotating shaft 20, and the rotating frame 21 can be detached with the mount 19, having the rotary motor M2 attached thereto, remaining on the machine body 6. This makes it possible, when a working device differing from the manipulator 4 of the present preferred embodiment is attached to the machine body 6, to transmit (supply) power from the second power take-off shaft Ma to the working device.

As illustrated in FIG. 35, the robot hand 18 includes a base member 18A and a plurality of holding nails 18B. A connecting piece 63 is provided at the upper surface side of the base member 18A. The connecting piece 63 is pivoted on a hanger plate 37. That is, the robot hand 18 is hung on the arm 17. The plurality of holding nails 18B are swingably attached to a lower surface side of the base member 18A. The robot hand 18 is capable of holding a crop 2 between the holding nails 18B by the swinging movement of the plurality of holding nails 18B (see FIG. 38), and is also capable of releasing the held crop 2.

Also in this preferred embodiment, the robot hand 18 of the preferred embodiment illustrated in FIG. 16 may be used. Note that, by replacing the robot hand 18 with a robot hand capable of holding a fertilizer bag, it is possible to cause the manipulator 4 to do supplemental work when supplying fertilizer to a fertilizer spreader linked to the linkage mechanism 51.

Figure 39:
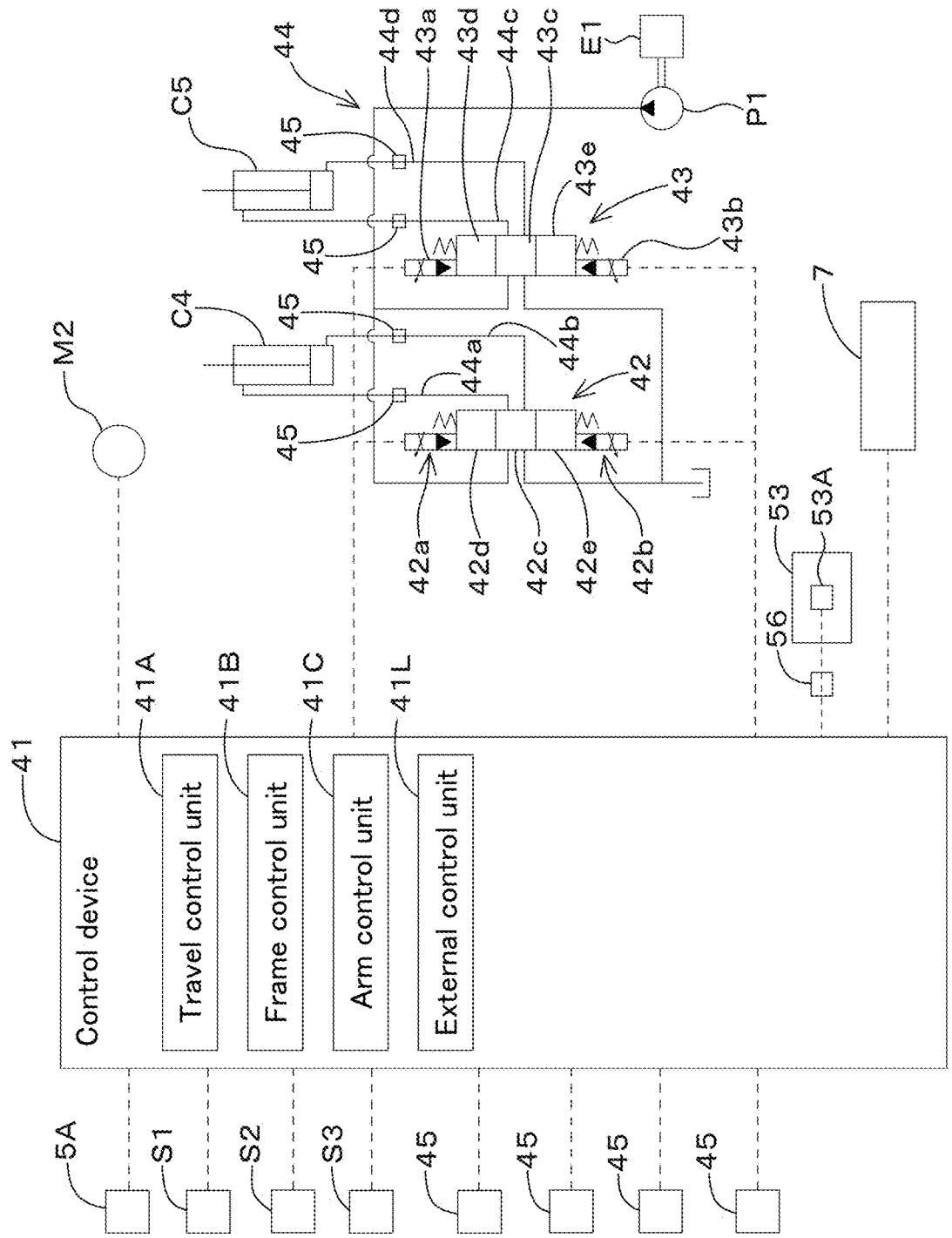
FIG. 39 is a block diagram showing a system configuration.

As illustrated in FIG. 39, the control device 41 has the communication port 56 connected thereto. The communication port 56 can have, connected thereto via connection cable(s) and/or the like, a control unit 53A mounted on a working machine 53 linked to the agricultural robot 1 via the linkage mechanism 51. The control device 41 includes an external control unit 41L to control the control unit 53A. The external control unit 41L controls the agricultural robot 1 and the working machine 53 in a coordinated manner.

The other configurations are substantially the same as those of the preferred embodiments illustrated in FIGS. 1 to 15.

An agricultural robot 1 as has been described includes a machine body 6, a wheeled traveling device 7 to support the machine body 6 such that the machine body 6 is capable of traveling, the traveling device 7 including at least three wheels 8, a manipulator 4 including an arm 17 and a robot hand 18, the arm 17 being attached to the machine body 6, the robot hand 18 being attached to the arm 17 and capable of holding an object (crop 2), and a balance controller 41F to control positions of the at least three wheels 8, respectively, to achieve a balance between the machine body 6 and the manipulator 4.

With the configuration, the positions of the at least three wheels 8 are respectively controlled by the balance control unit 41F, making it possible to achieve a balance between the machine body 6 and the manipulator 4.

The balance controller 41F is configured or programmed to control the positions of the at least three wheels 8, respectively, to control a posture of the machine body 6.

With the configuration, it is possible to balance the machine body 6 with the arm 17 and the robot hand 18 by controlling the posture of the machine body 6.

The at least three wheels of the traveling device 7 include a first wheel 8La at a front left of the machine body 6, a second wheel 8Ra at a front right of the machine body 6, a third wheel 8Lb at a rear left of the machine body 6, and a fourth wheel 8Rb at a rear right of the machine body 6, the first to fourth wheels 8La to 8Rb are supported on the machine body 6 such that each of the first to fourth wheels 8La to 8Rb is independently capable of being raised and lowered, and the balance controller 41F is configured or programmed to control the posture of the machine body 6 by causing one or more of the first to fourth wheels 8La to 8Rb to be raised or lowered.

With the configuration, it is possible to control the posture of the machine body 6 by raising or lowering one or more of the first to fourth wheels 8La to 8Rb.

The manipulator 4 includes a mounting assembly 16 to have the arm 17 attached thereto such that the arm 17 is swingable up and down, and the mounting assembly 16 is detachably attached to the machine body 6.

With the configuration, it is possible to replace the manipulator 4 with a manipulator of another type.

The agricultural robot 1 further includes a controller 41D to control the manipulator 4, wherein the mounting assembly 16 includes a mount 19 detachably attached to the machine body 6, a rotating shaft 20 supported on the mount 19 such that the rotating shaft 20 is rotatable about a vertical axis, a rotary motor M2 to drive the rotating shaft 20 to rotate, and a rotating frame 21 to rotate together with the rotating shaft 20, the arm 17 includes a first arm assembly 31 pivoted on the rotating frame 21 such that the first arm assembly 31 is swingable up and down, and a second arm assembly 32 swingably pivoted on the first arm assembly 31, the arm 17 is capable of being bent by swinging movement of the second arm assembly 32 relative to the first arm assembly 31, the robot hand 18 is attached to a distal portion of the second arm assembly 32, and the controller 41D is configured or programmed to control a position of the robot hand 18 by controlling swinging movement of the first arm unit 31 and the second arm unit 32 and rotation of the rotating frame 21.

With the configuration, it is possible to move the robot hand 18 accurately to the position of the crop 2.

The agricultural robot 1 further includes an imager 5A to acquire information about a surrounding area of the machine body 6 by capturing an image, and a map generator 41G to automatically generate a map 60 of a position and a growth state of at least one individual crop based on the information acquired by the imager before harvesting.

With the configuration, since the position and/or the growth state of each crop 2 are/is identified and a map thereof is prepared in advance, the map can be utilized in subsequent work.

The agricultural robot 1 further includes a determiner 41E to determine, based on the information acquired by the imager 5A, whether the at least one crop is in a proper stage for harvest from a characteristic specific to the type of the at least one crop.

The configuration makes it possible to provide an agricultural robot 1 which is capable of automatically selecting crops 2 to be harvested and harvesting the selected crops 2.

The robot hand 18 includes at least one holding nail 81 capable of holding a crop 2, at least one nail mount 79 to have the at least one holding nail 81 openably and closably attached thereto, the at least one nail mount 79 being capable of being raised and lowered, at least one linked member 86 to move with opening or closing movement of the at least one holding nail 81, and at least one engagement member 72 capable of being engaged with the at least one linked member 86, wherein the at least one holding nail 81 in a closed position is caused to open along a surface of the crop 2 under a reaction force from the crop by lowering the at least one nail mount 79 to press the at least one nail 81 against the crop 2, the at least one engagement member 72 is capable of being raised and lowered, is movable between a disengaged position X2 in which the at least one engagement member 72 is separated below from the at least one linked member 86 to allow opening and closing movement of the at least one holding nail 81 and an engaged position X1 in which the at least one engagement member 72 is engaged with the at least one linked member 86 from below, and ascends while in the engaged position X1 to raise the at least one linked member 86 to move the at least one holding nail 81 to the closed position.

With the configuration, the at least one holding nail 81 in the closed position is caused to open along the surface of the crop 2 under a reaction force from the crop 2 by being pressed against the crop 2, and is caused to close by raising the at least one linked member 86 by causing the at least one engagement member 72 to ascend. This makes it possible to simplify the structure to open and close the at least one holding nail 81.

The agricultural robot 1 further includes a support 73 to support the at least one nail mount 79 such that the at least one nail mount 79 is swingable up and down about a pivot shaft 78, and a driving unit 87 disposed on the support 73, wherein the driving unit 87 includes a power unit 88 and a drive mechanism 89 to cause the at least one nail mount 79 to swing up and down about the pivot shaft 78 using power from the power unit 88 to forcibly open and close the at least one holding nail 81.

With the configuration, it is possible to release the crop 2 from the at least one holding nail 81 whenever desired.

The power unit 88 includes a motor, and the drive mechanism 89 includes a first gear 89A to be driven by the motor to rotate, and at least one second gear 89B which meshes with the first gear 89A and which causes the at least one nail mount 79 to swing up and down about the pivot shaft 78.

With this configuration, it is possible to easily configure the driving unit 87.

The agricultural robot 1 further includes an ascent/descent body 62 which is disposed above the support 73 and which is capable of ascending and descending, and at least one expandable linkage mechanism 76 which is configured to be expandable and contractable along a top-bottom direction and which connects the ascent/descent body 62 and the support 73 such that the ascent/descent body 62 and the support 73 are movable relative to each other, wherein the ascent/descent body 62 is caused to descend toward the support 73 by contraction of the at least one expandable linkage mechanism 76 while the at least one holding nail 81 is in abutment with the crop 2 and the support 73 is restricted from descending, and the at least one nail mount 79 includes an abutment portion 79d on which the ascent/descent body 62 abuts when the ascent/descent body 62 descends toward the support 73.

With the configuration, it is possible to raise and lower the at least one nail mount 79 and the at least one holding nail 81 using the ascent/descent body 62, and possible to cause the at least one holding nail 81 to open along the crop 2 by pressing down the at least one nail mount 79.

The at least one engagement member 72 is disposed on the ascent/descent body 62, ascends and descends together with the ascent/descent body 62, and is in the disengaged position X2 when the ascent/descent body 62 is in abutment with the abutment portion 79d.

With this configuration, it is not necessary to separately perform the action of pressing down the at least one nail mount 79 and the action of moving the at least one engagement member 72 away from the at least one linked member 86, and it is possible to perform the two actions using the ascent/descent body 62.

The at least one nail mount 79 includes a restricting portion 79b which, when the at least one linked member 86 abuts on the restricting portion 79b with the at least one holding nail 81 in the closed position, restricts the at least one holding nail 81 from moving in a direction in which the at least one holding nail 81 closes.

With this configuration, it is possible to prevent the at least one holding nail 81 from moving excessively inward.

The agricultural robot 1 further includes at least one closing spring 85 to bias the at least one holding nail 81 in a direction in which the at least one holding nail 81 closes.

With this configuration, it is possible, when the at least one holding nail 81 opens along the surface of the crop 2, to cause the at least one holding nail 81 to move along the surface of the crop 2 in a suitable manner.

The robot hand can be used in an agricultural robot.

An agricultural robot 1 as described earlier includes a traveling body 3, a rotating frame 21 supported on the traveling body 3 such that the rotating frame 21 is rotatable about a vertical axis, and an arm 17 which is bendable and which is supported on the rotating frame 21 such that the arm 17 is swingable up and down, wherein the rotating frame 21 is disposed at a location offset in one of front-rear directions A3 of the traveling body 3, and the arm 17 is capable of being placed in a work posture W1 in which the arm 17 points in the one of the front-rear directions A3 and a ready-for-storage posture W2 in which the arm 17 is bent and points in the other of the front-rear directions A3.

With the configuration, the rotating frame 21 which supports the arm 17 is disposed at a location offset in one of front-rear directions A3 of the traveling body 3, and work is done in the work posture W1 in which the arm 17 points in the one of the front-rear directions A3, making it possible to achieve a wide work area. Furthermore, the agricultural robot 1 can be made compact by placing the arm 17 in the ready-for-storage posture W2 in which the arm 17 is bent and points in the opposite direction to that of the work posture W1.

The agricultural robot 1 further includes a mount 19 on which the rotating frame 21 is rotatably attached, wherein the mount 19 includes, at a lower portion thereof, an engagement portion 19E which projects downward, the traveling body 3 includes a first mount frame (fourth transverse frame 6Ag) and a second mount frame (fifth transverse frame 6Ah) which are parallel to each other and is capable of holding the mount 19 by insertion of the engagement portion 19E between the first mount frame 6Ag and the second mount frame 6Ah.

With the configuration, it is possible to replace the manipulator 4 including the rotating frame 21, the arm 17, and the mount 19. It is also possible to easily attach and detach the mount 19.

The agricultural robot 1 further includes a control device 41, and a rotation restriction member 38 to restrict the rotating frame 21 from rotating when the arm 17 is in the work posture W1, wherein the control device 41 controls rotation of the rotating frame 21 with reference to a position of the rotating frame 21 restricted by the rotation restriction member 38.

With the configuration, it is possible to control the rotation of the rotating frame 21 even though there is no detection member to detect the rotation of the rotating frame 21.

The agricultural robot 1 further includes a positioning member 39 to position the arm 17 in the ready-for-storage posture W2 by restricting the rotating frame 21 from rotating, wherein the rotating frame 21 is rotatable in a first rotation direction Y3 about a vertical axis and in a second rotation direction Y4 opposite to the first rotation direction Y3, the rotation restriction member 38 restricts the rotating frame 21 from rotating in one of the first and second rotation directions Y3 and Y4, and the positioning member 39 restricts the rotating frame 21 from rotating in the other of the first and second rotation directions Y3 and Y4.

With the configuration, it is possible to quickly and reliably position the arm 17 in the ready-for-storage posture W2 using the positioning member 39. With the rotation restriction member 38 and the positioning member 39 provided to restrict the rotation of the rotating frame 21, it is possible to selectively place the arm 17 in the work posture W1 and the ready-for-storage posture W2 by the rotation of the rotating frame 21.

The agricultural robot 1 further includes a robot hand 18 attached to the arm 17 and capable of holding a crop 2, wherein the arm 17 includes a first arm unit 31 pivoted on the rotating frame 21 such that the first arm unit 31 is swingable up and down, and a second arm unit 32 swingably pivoted on the first arm unit 31, the arm 17 is capable of being bent by swinging movement of the second arm unit 32 relative to the first arm unit 31, and the control device 41 controls a position of the robot hand 18 by controlling swinging movement of the first arm unit 31 and the second arm unit 32 and rotation of the rotating frame 21.

With this configuration, it is possible to move the robot hand 18 accurately to the position of the crop 2.

When the arm 17 is in the work posture W1, a distal portion 31c of the first arm unit 31 is located outward of the traveling body 3 and, when the arm 17 is in the ready-for-storage posture W2, the distal portion 31c of the first arm unit 31 is located above the traveling body 3.

With the configuration, when the arm 17 is in the work posture W1, it is possible to hold a crop 2 distant from the traveling body 3 in a suitable manner, and the agricultural robot 1 can be made compact by placing the arm 17 in the ready-for-storage posture W2.

The arm 17 includes a sub-arm 30 provided such that the sub-arm 30 is capable of extending and retracting relative to the second arm unit 32, and the robot hand 18 is attached to a distal portion of the sub-arm 30.

With this configuration, it is possible to achieve arm dimensions suitable for the position of a crop and/or the manner in which work is done.

The control device 41 is capable of acquiring the degree of extension of the sub-arm 30, and controls the position of the robot hand 18 in consideration of the degree of extension.

With this configuration, it is possible to control the position of the robot hand 18 even though the arm 17 is extendable and retractable.

The agricultural robot 1 further includes a rotary motor M2 to cause the rotating frame 21 to rotate, a first hydraulic cylinder (first arm cylinder C4) to cause the arm 17 to swing up and down, and a second hydraulic cylinder (second arm cylinder C5) to bend the arm 17.

With the configuration, hydraulic cylinders make it possible to easily lift up and carry even heavy crops 2.

An agricultural robot 1 as described earlier includes a traveling body 3, and a manipulator 4 provided on the traveling body 3 and capable of harvesting a crop 2, wherein the manipulator 4 includes a rotating frame 21 capable of rotating about a rotation axis J1 extending in a top-bottom direction and an arm 17 bendable and supported on the rotating frame 21 such that the arm 17 is swingable up and down, the rotating frame 21 is disposed at a location offset in a counter-traveling direction opposite to a traveling direction of the traveling body 3, and the arm 17 does harvesting work in a work posture W1 in which the arm 17 points in the counter-traveling direction within predetermined limits of rotation about the rotation axis J1.

With the configuration, since the manipulator 4 is disposed at a location offset in the counter-traveling direction opposite to the traveling direction of the traveling body 3 and the arm 17 does harvesting work in the work posture W1 in which the arm 17 points in the counter-traveling direction within predetermined limits of rotation of the manipulator 4 about the rotation axis J1, it is possible to achieve a balance between the traveling body 3 and the manipulator 4.

The agricultural robot 1 further includes a first hydraulic cylinder C4 to cause the arm 17 to swing up and down, and a second hydraulic cylinder C5 to bend the arm 17.

With the configuration, heavy vegetables can be easily handled by actuating the arm 17 using hydraulic power.

The arm 17 includes a first arm unit 31 pivoted on the rotating frame 21 such that the first arm unit 31 is swingable up and down, and a second arm unit 32 swingably pivoted on the first arm unit 31, the arm 17 is capable of being bent by swinging movement of the second arm unit 32 relative to the first arm unit 31, the first arm unit 31 is driven by the first hydraulic cylinder C4 to swing, and the second arm unit 32 is driven by the second hydraulic cylinder C5 to swing.

With this configuration, it is possible to easily raise, lower, and bend the manipulator 4 holding a heavy vegetable using hydraulic power.

The agricultural robot 1 further includes a quality detector 49 to acquire quality information of a crop 2 harvested with the manipulator 4, and a grade determining unit 41H to determine, based on the quality information, a grade of the crop 2 harvested, wherein the quality detector 49 includes an imaging device 5B to acquire, by capturing an image, quality information of the crop 2 harvested with the manipulator 4 and a detection sensor 50 to acquire, by sensing, quality information differing from the quality information acquired by the imaging device 5B, wherein the grade determining unit 41H determines the grade of the crop 2 based on the quality information acquired by the imaging device 5B and the quality information acquired by the detection sensor 50.

With the configuration, it is possible to improve the accuracy of determination of the grade of the crop 2.

The agricultural robot 1 further includes a control unit 41 to perform action control to cause the manipulator 4 to perform a harvesting action, and a grade sorting unit 41K to, by actuating the manipulator 4, sort the crop 2 having been subjected to determination by the grade determining unit 41H in one of predetermined positions for respective grades (a first container portion 48a to a fourth container portion 48d) allocated to a harvest container 48A of a truck 48 which travels as the traveling body 3 travels.

With the configuration, it is possible to sort to-be-harvested crops 2 according to grade when harvesting them.

The detection sensor 50 may further include one or more of the following: a weight sensor 50A to acquire a weight of a crop 2, an aroma sensor 50B to acquire an aroma of the crop 2, and a tap sound sensor 50C to acquire a tap sound that the crop 2 makes.

An agricultural robot 1 as described earlier includes a traveling body 3, an imaging device 5 to acquire information about a surrounding area of the traveling body 3, a control device 41 to cause the traveling body 3 to travel in an autonomous manner based on the information acquired by the imaging device 5, a prime mover E1 mounted on the traveling body 3, and a first power take-off shaft 49 to take power from the prime mover E1.

With the configuration, since the first power take-off shaft 49 to take the power from the prime mover E1 is provided, it is possible to supply power from the first power take-off shaft 49 to a working machine 53 attached additionally to the agricultural robot 1 which travels in an autonomous manner.

The agricultural robot 1 further includes a second power take-off shaft (output shaft Ma) to take power from a power source (rotary motor M2) differing from the prime mover E1, wherein the first power take-off shaft 49 is disposed at one of opposite ends of the traveling body 3 in a front-rear direction A3, and the second power take-off shaft Ma is disposed at the other of the opposite ends of the traveling body 3 in the front-rear direction A3.

With the configuration, it is possible to attach a working machine 53 to one of the opposite ends of the traveling body 3 in the front-rear direction A3 and drive the working machine 53 with the first power take-off shaft 49, and possible to attach a working device to the other of the opposite ends of the traveling body 3 in the front-rear direction A3 and drive the working device with the second power take-off shaft Ma. This makes it possible to provide an agricultural robot 1 capable of doing various types of work.

The agricultural robot 1 further includes a rotating frame 21 which is attached to the traveling body 3 and which rotates about a vertical axis by power from the second power take-off shaft Ma, an arm 17 which is bendable and which is supported on the rotating frame 21 such that the arm 17 is swingable up and down, and a robot hand 18 attached to the arm 17.

With the configuration, it is possible to cause the manipulator, which includes the rotating frame 21, the arm 17, and the robot hand 18, to do supplemental work for the working machine 53 attached at the same side as the first power take-off shaft 49.

The agricultural robot 1 further includes a linkage mechanism 51 at the same side of the traveling body 3 as the first power take-off shaft 49, the linkage mechanism 51 being capable of linking a working machine 53.

With the configuration, it is possible to easily link the working machine 53 to the agricultural robot 1.

The agricultural robot 1 further includes a fluid pressure source (hydraulic pump P1) capable of supplying working fluid, and an external takeout port 54 to take out working fluid supplied from the fluid pressure source P1.

With the configuration, it is possible to drive an actuator on the working machine 53 attached to the agricultural robot 1 using the working fluid from the external takeout port 54.

The agricultural robot 1 further includes a power port 55 to supply electricity outward.

With the configuration, it is possible to supply electricity to electric device(s) on a working machine 53 attached to the agricultural robot 1, and possible to easily additionally attach an electric working machine 53.

The agricultural robot 1 further includes a communication port 56 usable for external communication.

With this configuration, it is possible to achieve communication between the agricultural robot 1 and a working machine 53 attached to the agricultural robot 1, and thus possible to control the agricultural robot 1 and the working machine 53 in a coordinated manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural robot comprising:
    a machine body;
    a wheeled traveling device to support the machine body such that the machine body is capable of traveling, the traveling device including four wheels;
    a manipulator including an arm and a robot hand, the arm being attached to the machine body, the robot hand being attached to the arm and capable of holding an object; and
    a balance controller to control positions of the four wheels, respectively, to achieve a balance between the machine body and the manipulator; wherein
    the four wheels include:
        a first wheel at a front left of the machine body;
        a second wheel at a front right of the machine body;
        a third wheel at a rear left of the machine body; and
        a fourth wheel at a rear right of the machine body;
    the first to fourth wheels are supported on the machine body such that each of the first to fourth wheels is independently capable of being raised and lowered;
    the balance controller is configured or programmed to, when the arm is positioned on one of opposite sides of the machine body in a machine body width direction which is a horizontal direction orthogonal to a front-rear direction and the robot hand is positioned outward in the machine body width direction of one or more of the first to fourth wheels that are located on the one of the opposite sides of the machine body in the machine body width direction to harvest a crop which is the object, cause one or more of the first to fourth wheels that are located on the other of the opposite sides of the machine body in the machine body width direction to be raised relative to the machine body;
    the manipulator includes a mounting assembly to have the arm attached thereto such that the arm is swingable up and down;
    the mounting assembly includes a mount detachably attached to the machine body;
    the mount includes an engagement portion which projects downward at a bottom of the mount; and
    the machine body includes a first mount frame and a second mount frame which are parallel to each other and is capable of holding the mount by insertion of the engagement portion between the first mount frame and the second mount frame.

2. The agricultural robot according to claim 1, further comprising a controller to control the manipulator, wherein the mounting assembly includes:
    a rotating shaft supported on the mount such that the rotating shaft is rotatable about a vertical axis;
    a rotary motor to drive the rotating shaft to rotate; and
    a rotating frame to rotate together with the rotating shaft;
    the arm includes:
        a first arm assembly pivoted on the rotating frame such that the first arm assembly is swingable up and down; and
        a second arm assembly swingably pivoted on the first arm assembly;
    the arm is capable of being bent by swinging movement of the second arm assembly relative to the first arm assembly;
    the robot hand is attached to a distal portion of the second arm assembly; and
    the controller is configured or programmed to control a position of the robot hand by controlling swinging movement of the first arm assembly and the second arm assembly and rotation of the rotating frame.

3. The agricultural robot according to claim 1, further comprising:
    an imager to acquire information about a surrounding area of the machine body by capturing an image; and
    a map generator to automatically generate a map of a position and a growth state of at least one crop based on the information acquired by the imager before harvesting.

4. The agricultural robot according to claim 3, further comprising:
    a determiner to determine, based on the information acquired by the imager, whether the at least one crop is in a proper stage for harvest from a characteristic specific to a type of the at least one crop.

5. The agricultural robot according to claim 1, wherein:
    the traveling device includes wheel supports to support the respective wheels;
    each of the wheel supports includes:
        a main support supported on the machine body;
        a swing frame supported on the main support such that the swing frame is swingable up and down;
        a wheel frame which is supported on the swing frame such that the wheel frame is swingable up and down and which supports a corresponding one of the wheels;
        a first lift cylinder to cause the swing frame to swing up and down; and
        a second lift cylinder to cause the wheel frame to swing up and down.

6. The agricultural robot according to claim 5, wherein a combination of upward or downward swinging movement of the swing frame caused by the first lift cylinder and upward or downward swinging movement of the wheel frame caused by the second lift cylinder allows a corresponding one of the wheels to be raised and lowered independently in a parallel manner.

7. The agricultural robot according to claim 5, wherein each of the wheel supports includes a steering cylinder between the machine body and the main support;

the main support is supported on the machine body such that the main support is rotatable about a vertical axis; and rotation of the main support about the vertical axis caused by extension or retraction of the steering cylinder allows orientation of a corresponding one of the wheels to be independently changed.

8. The agricultural robot according to claim 1, further comprising:

a rotating frame supported on the machine body such that the rotating frame is rotatable about an axis extending along a top-bottom direction in a first rotation direction and in a second rotation direction opposite to the first rotation direction;

a rotation restriction member to restrict the rotating frame from rotating in one of the first rotation direction or the second rotation direction; and a frame controller to control a rotation of the rotating frame; wherein the arm is supported on the rotating frame; and the frame controller is configured or programmed to calculate a rotational position of the rotating frame based on a position of the rotating frame restricted by the rotation restriction member.

9. The agricultural robot according to claim 8, further comprising:

a positioning member to restrict the rotation of the rotating frame, the positioning member being different from the rotation restriction member; wherein the rotating frame is:
  disposed at a location offset in one direction along the front-rear direction of the machine body;
  capable of rotating in the first rotation direction and the second rotation direction from a position in which the arm is oriented in the one direction along the front-rear direction; and
  is restricted by the rotation restriction member from rotating in one of the first rotation direction or the second rotation direction; and the positioning member is configured to restrict the rotating frame from rotating in the other of the first rotation direction or the second rotation direction when the arm is oriented in a direction opposite to the one direction along the front-rear direction.

10. An agricultural robot comprising:

a machine body;

a wheeled traveling device to support the machine body such that the machine body is capable of traveling, the traveling device including four wheels;

a manipulator including an arm and a robot hand, the arm being attached to the machine body, the robot hand being attached to the arm and capable of holding an object; and a balance controller to control positions of the four wheels, respectively, to achieve a balance between the machine body and the manipulator; wherein the four wheels include:
  a first wheel at a front left of the machine body;
  a second wheel at a front right of the machine body;
  a third wheel at a rear left of the machine body; and
  a fourth wheel at a rear right of the machine body;

the first to fourth wheels are supported on the machine body such that each of the first to fourth wheels is independently capable of being raised and lowered;

the balance controller is configured or programmed to, when the arm is extended diagonally forward between a front-rear direction and a machine body width direction which is a horizontal direction orthogonal to the front-rear direction or extended diagonally rearward between the front-rear direction and the machine body width direction and the robot hand is positioned outward in the horizontal direction of one of the first to fourth wheels that is closest to the arm to harvest a crop which is the object, cause the one of the first to fourth wheels that is closest to the arm to be lowered relative to the machine body and cause another of the first to fourth wheels that is diagonally opposite the lowered one of the first to fourth wheels to be raised relative to the machine body;

the manipulator includes a mounting assembly to have the arm attached thereto such that the arm is swingable up and down;

the mounting assembly includes a mount detachably attached to the machine body;

the mount includes an engagement portion which projects downward at a bottom of the mount; and the machine body includes a first mount frame and a second mount frame which are parallel to each other and is capable of holding the mount by insertion of the engagement portion between the first mount frame and the second mount frame.

* * * * *